US012762392B2

(12) United States Patent
Cao et al.

(10) Patent No.: US 12,762,392 B2
(45) Date of Patent: Oct. 13, 2026

(54) METHODS FOR TRAINING MACHINE LEARNING MODEL FOR COMPUTATION LITHOGRAPHY

(71) Applicant: ASML NETHERLANDS B.V., Veldhoven (NL)

(72) Inventors: Yu Cao, Saratoga, CA (US); Ya Luo, Saratoga, CA (US); Yen-Wen Lu, Saratoga, CA (US); Been-Der Chen, Milpitas, CA (US); Rafael C. Howell, Santa Clara, CA (US); Yi Zou, Foster City, CA (US); Jing Su, Fremont, CA (US); Dezheng Sun, Palo Alto, CA (US)

(73) Assignee: ASML NETHERLANDS, Veldhoven (NL)

( * ) Notice: Subject to any disclaimer, the term of this patent is extended or adjusted under 35 U.S.C. 154(b) by 577 days.

(21) Appl. No.: 16/970,648

(22) PCT Filed: Feb. 20, 2019

(86) PCT No.: PCT/EP2019/054246

§ 371 (c)(1),
(2) Date: Aug. 18, 2020

(87) PCT Pub. No.: WO2019/162346

PCT Pub. Date: Aug. 29, 2019

(65) Prior Publication Data

US 2020/0380362 A1 Dec. 3, 2020

Related U.S. Application Data

(60) Provisional application No. 62/634,523, filed on Feb. 23, 2018.

(51) Int. Cl.
*G03F 1/70* (2012.01)
*G06N 3/04* (2023.01)
(Continued)

(52) U.S. Cl.
CPC ................ *G06N 3/08* (2013.01); *G06N 3/04* (2013.01)

(58) Field of Classification Search
CPC G06N 3/08; G06N 3/04; G06N 3/045; G06N 20/00; G06N 3/084; G06N 20/20; G06F 30/20; G03F 1/36
See application file for complete search history.

(56) References Cited

U.S. PATENT DOCUMENTS

| | | | |
|---|---|---|---|
| 5,229,872 | A | 7/1993 | Mumola |
| 6,046,792 | A | 4/2000 | Van Der Werf et al. |

(Continued)

FOREIGN PATENT DOCUMENTS

| | | |
|---|---|---|
| CN | 102057329 | 5/2011 |
| CN | 105593984 | 5/2016 |

OTHER PUBLICATIONS

Title—ML Glossary—Gradient Descent Author—Brendan Fortuner Date—Nov. 28, 2017 Publisher—Github & Sphinx (Year: 2017).*

(Continued)

*Primary Examiner* — Brandon S Cole
(74) *Attorney, Agent, or Firm* — Pillsbury Winthrop Shaw Pittman LLP

(57) ABSTRACT

Methods of training machine learning models related to a patterning process, including a method for training a machine learning model configured to predict a mask pattern. The method including obtaining (i) a process model of a patterning process configured to predict a pattern on a substrate, wherein the process model comprises one or more trained machine learning models, and (ii) a target pattern, and training the machine learning model configured to predict a mask pattern based on the process model and a cost function that determines a difference between the predicted pattern and the target pattern.

20 Claims, 28 Drawing Sheets

(51) Int. Cl.
*G06N 3/0455* (2023.01)
*G06N 3/047* (2023.01)
*G06N 3/08* (2023.01)

(56) References Cited

U.S. PATENT DOCUMENTS

| | | | | |
|---|---|---|---|---|
| 6,291,113 | B1* | 9/2001 | Spence | G03F 1/36<br>716/55 |
| 7,703,069 | B1 | 4/2010 | Liu et al. | |
| 7,941,768 | B1* | 5/2011 | Wei | G03F 7/705<br>716/54 |
| 8,584,056 | B2 | 11/2013 | Chen et al. | |
| 10,137,643 | B2 | 11/2018 | Cao et al. | |
| 11,061,373 | B1* | 7/2021 | Khaira | G05B 13/042 |
| 2006/0271907 | A1* | 11/2006 | Izuha | G06F 30/3312<br>716/55 |
| 2007/0263190 | A1* | 11/2007 | De Boeij | G03F 7/70425<br>355/75 |
| 2009/0157360 | A1 | 6/2009 | Ye et al. | |
| 2009/0300573 | A1* | 12/2009 | Cao | G06F 30/00<br>716/50 |
| 2009/0307649 | A1 | 12/2009 | Pramanik et al. | |
| 2010/0005440 | A1* | 1/2010 | Viswanathan | G03F 1/68<br>716/53 |
| 2012/0117522 | A1 | 5/2012 | Feng et al. | |
| 2013/0283219 | A1* | 10/2013 | Fujimura | G03F 1/36<br>716/53 |
| 2015/0149970 | A1* | 5/2015 | Kuboi | H01L 22/20<br>716/54 |
| 2017/0132528 | A1 | 5/2017 | Aslan et al. | |
| 2018/0121592 | A1* | 5/2018 | Watanabe | G03F 7/7065 |
| 2018/0275523 | A1* | 9/2018 | Biafore | G03F 7/7065 |
| 2018/0341173 | A1* | 11/2018 | Li | G03F 1/36 |
| 2019/0197213 | A1* | 6/2019 | Ungar | G03F 1/36 |
| 2019/0378012 | A1* | 12/2019 | Tripodi | G06N 3/0455 |
| 2020/0004921 | A1* | 1/2020 | Baidya | G06N 5/022 |
| 2020/0012196 | A1 | 1/2020 | Liu et al. | |
| 2020/0026196 | A1 | 1/2020 | Luo et al. | |
| 2021/0048753 | A1* | 2/2021 | Zhang | G03F 1/36 |

OTHER PUBLICATIONS

Title—Accurate lithography hotspot detection using deep convolutional neural networks Author—Moojoon Shin, Jee-Hyong Lee Date—Nov. 18, 2016 Publisher—Journal of micro/nanolithography (Year: 2016).*

Title—ASAP7: A 7-nm finFET predictive process design kit Author—Lawrence T. Clark, Vinay Vashishtha, Lucian Shifren, Aditya Gujja, Saurabh Sinha, Brian Cline, Chandarasekaran Ramamurthy, Greg Yeric Publisher—Elsevier (Year: 2016).*

Korean Office Action issued in corresponding Korean Patent Application No. 10-2020-7024322, dated Dec. 26, 2021.

International Search Report and Written Opinion issued in corresponding PCT Patent Application No. PCT/EP2019/054246, dated May 16, 2019.

Spence, C.: "Full-Chip Lithography Simulation and Design Analysis—How OPC Is Changing IC Design," Proc. SPIE, vol. 5751, pp. 1-14 (2005).

Spence, C. et al.: "Manufacturing Challenges for Curvilinear Masks" Proc. of SPIE, vol. 10451, Oct. 16, 2017.

Luo, R.: "Optical proximity correction using a multilayer perceptron neural network", Journal of Optics, vol. 15, No. 7, p. 75708, Jun. 4, 2013.

Office Action issued in corresponding Chinese Patent Application No. 201980015018.X, dated Jul. 24, 2024.

* cited by examiner

1208

METHODS FOR TRAINING MACHINE LEARNING MODEL FOR COMPUTATION LITHOGRAPHY

CROSS-REFERENCE TO RELATED APPLICATIONS

This application is the U.S. national phase entry of PCT patent application no. PCT/EP2019/054246, which was filed on Feb. 20, 2019, which claims the benefit of priority of U.S. patent application No. 62/634,523 which was filed on Feb. 23, 2018, and which is incorporated herein in its entirety by reference.

TECHNICAL FIELD

The description herein relates generally to apparatus and methods of a patterning process and determining patterns of patterning device corresponding to a design layout.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1\times\lambda/NA$, where 2 is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

According to an embodiment, there is provided a method for training a machine learning model configured to predict a mask pattern. The method includes obtaining (i) a process model of a patterning process configured to predict a pattern on a substrate, and (ii) a target pattern, and training, by a hardware computer system, the machine learning model configured to predict a mask pattern based on the process model and a cost function that determines a difference between the predicted pattern and the target pattern.

Furthermore, according to an embodiment, there is provided a method for training a process model of a patterning process to predict a pattern on a substrate. The method includes obtaining (i) a first trained machine learning model to predict a mask transmission of the patterning process, and/or (ii) a second trained machine learning model to predict an optical behavior of an apparatus used in the patterning process, and/or (iii) a third trained machine learning model to predict a resist process of the patterning process, and (iv) a printed pattern, connecting the first trained model, the second trained model, and/or the third trained model to generate the process model, and training, by a hardware computer system, the process model configured to predict a pattern on a substrate based on a cost function that determines a difference between the predicted pattern and the printed pattern.

Furthermore, according to an embodiment, there is provided a method for determining optical proximity corrections corresponding to a target pattern. The method including obtaining (i) a trained machine learning model configured to predict optical proximity corrections, and (ii) a target pattern to be printed on a substrate via a patterning process, and determining, by a hardware computer system, optical proximity corrections based on the trained machine learning model configured to predict optical proximity corrections corresponding to the target pattern.

Furthermore, according to an embodiment, there is provided a method for training a machine learning model configured to predict a mask pattern based on defects. The method including obtaining (i) a process model of a patterning process configured to predict a pattern on a substrate, wherein the process model comprises one or more trained machine learning models, (ii) a trained manufacturability model configured to predict defects based on a predicted pattern on the substrate, and (iii) a target pattern, and training, by a hardware computer system, the machine learning model configured to predict the mask pattern based on the process model, the trained manufacturability model, and a cost function, wherein the cost function is a difference between the target pattern and the predicted pattern.

Furthermore, according to an embodiment, there is provided a method for training a machine learning model configured to predict a mask pattern based on manufacturing violation probability of a mask. The method including obtaining (i) a process model of a patterning process configured to predict a pattern on a substrate, wherein the process model comprises one or more trained machine learning models, (ii) a trained mask rule check model configured to predict a manufacturing violation probability of a mask pattern, and (iii) a target pattern, and training, by a hardware computer system, the machine learning model configured to predict the mask pattern based on the trained process model, the trained mask rule check model, and a cost function based on the manufacturing violation probability predicted by the mask rule check model.

Furthermore, according to an embodiment, there is provided a method for determining optical proximity corrections corresponding to a target patterning. The method including obtaining (i) a trained machine learning model configured to predict optical proximity corrections based on manufacturing violation probability of a mask and/or based on defects on a substrate, and (ii) the target pattern to be printed on a substrate via a patterning process, and determining, by a hardware computer system, optical proximity corrections based on the trained machine learning model and the target pattern.

Furthermore, according to an embodiment, there is provided a method for training a machine learning model configured to predict a mask pattern. The method including obtaining (i) a set of benchmark images, and (ii) a mask image corresponding to a target pattern, and training, by a hardware computer system, the machine learning model configured to predict the mask pattern based on the benchmark images and a cost function that determines a difference between the predicted mask pattern and the benchmark images.

Furthermore, according to an embodiment, there is provided a method for training a machine learning model configured to predict defects on a substrate. The method including obtaining (i) a resist image or an etch image, and/or (ii) a target pattern, and training, by a hardware computer system, the machine learning model configured to predict a defect metric based on the resist image or the etch image, the target pattern, and a cost function, wherein the cost function is a difference between the predicted defect metric and a truth defect metric.

Furthermore, according to an embodiment, there is provided a method for training a machine learning model configured to predict mask rule check violations of a mask pattern. The method including obtaining (i) a set of mask rule check, (ii) a set of mask patterns, and training, by a hardware computer system, the machine learning model configured to predict mask rule check violations based on the set of mask rule check, the set of mask patterns, and a cost function based on a mask rule check metric, wherein the cost function is a difference between the predicted mask rule check metric and a truth mask rule check metric.

Furthermore, according to an embodiment, there is provided a method for determining a mask pattern. The method including obtaining (i) an initial image corresponding to a target pattern, (ii) a process model of a patterning process configured to predict a pattern on a substrate and (ii) a trained defect model configured to predict defects based on the pattern predicted by the process model, and determining, by a hardware computer system, a mask pattern from the initial image based on the process model, the trained defect model, and a cost function comprising a defect metric.

Furthermore, according to an embodiment, there is provided a method for training a machine learning model configured to predict a mask pattern. The method including obtaining (i) a target pattern, (ii) an initial mask pattern corresponding to the target pattern, (iii) a resist image corresponding to the initial mask pattern, and (iv) a set of benchmark images, and training, by a hardware computer system, the machine learning model configured to predict the mask pattern based on the target pattern, the initial mask pattern, the resist image, the set of benchmark images, and a cost function that determines a difference between the predicted mask pattern and the benchmark image.

Furthermore, according to an embodiment, there is provided a method for training a machine learning model configured to predict a resist image. The method including obtaining (i) a process model of a patterning process configured to predict an etch image from a resist image, and (ii) an etch target, and training, by a hardware computer system, the machine learning model configured to predict the resist image based on the etch model and a cost function that determines a difference between the etch image and the etch target.

Furthermore, according to an embodiment, there is provided computer program product comprising a non-transitory computer readable medium having instructions recorded thereon, the instructions when executed by a computer implementing any of the methods above.

DETAILED DESCRIPTION

Figure 1:
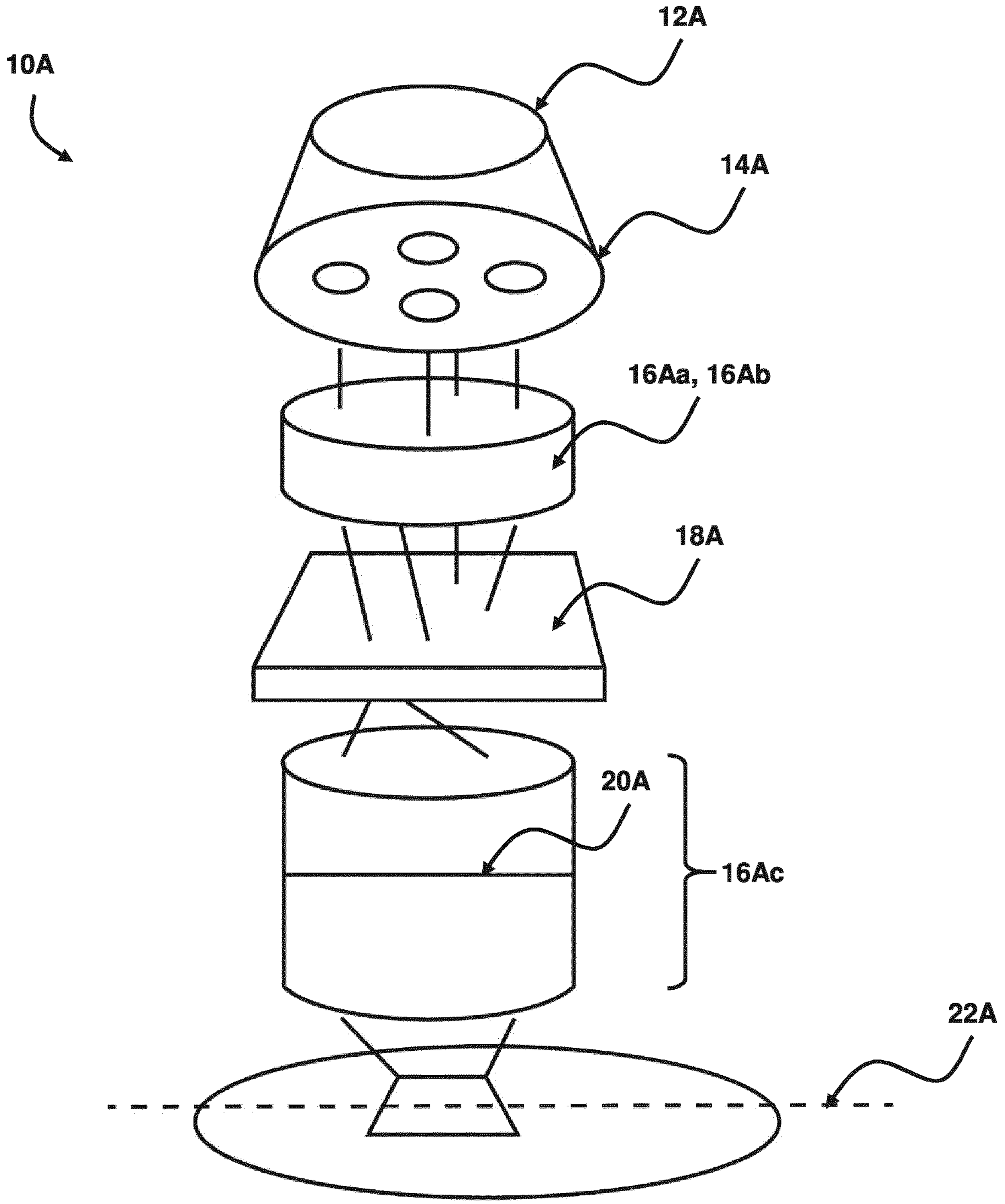
FIG. 1 shows a block diagram of various subsystems of a lithography system.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms “reticle”, “wafer” or “die” in this text should be considered as interchangeable with the more general terms “mask”, “substrate” and “target portion”, respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The pattern layout design may include, as an example, application of resolution enhancement techniques, such as optical proximity corrections (OPC). OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, the term "mask," "patterning device" and "design layout" can be used interchangeably, as in the context of RET, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another or non-geometrical optical effects such as diffraction and interference. Similarly, proximity effects may arise from diffusion and other chemical effects during post-exposure bake (PEB), resist development, and etching that generally follow lithography.

In order to increase the chance that the projected image of the design layout is in accordance with requirements of a given target circuit design, proximity effects may be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

One of the simplest forms of OPC is selective bias. Given a CD vs. pitch curve, all of the different pitches could be forced to produce the same CD, at least at best focus and exposure, by changing the CD at the patterning device level. Thus, if a feature prints too small at the substrate level, the patterning device level feature would be biased to be slightly larger than nominal, and vice versa. Since the pattern transfer process from patterning device level to substrate level is non-linear, the amount of bias is not simply the measured CD error at best focus and exposure times the reduction ratio, but with modeling and experimentation an appropriate bias can be determined. Selective bias is an incomplete solution to the problem of proximity effects, particularly if it is only applied at the nominal process condition. Even though such bias could, in principle, be applied to give uniform CD vs. pitch curves at best focus and exposure, once the exposure process varies from the nominal condition, each biased pitch curve will respond differently, resulting in different process windows for the different features. A process window being a range of values of two or more process parameters (e.g., focus and radiation dose in the lithographic apparatus) under which a feature is sufficiently properly created (e.g., the CD of the feature is within a certain range such as ±10% or ±5%). Therefore, the "best" bias to give identical CD vs. pitch may even have a negative impact on the overall process window, reducing rather than enlarging the focus and exposure range within which all of the target features print on the substrate within the desired process tolerance.

Other more complex OPC techniques have been developed for application beyond the one-dimensional bias example above. A two-dimensional proximity effect is line end shortening. Line ends have a tendency to "pull back" from their desired end point location as a function of exposure and focus. In many cases, the degree of end shortening of a long line end can be several times larger than the corresponding line narrowing. This type of line end pull back can result in catastrophic failure of the devices being manufactured if the line end fails to completely cross over the underlying layer it was intended to cover, such as a polysilicon gate layer over a source-drain region. Since this type of pattern is highly sensitive to focus and exposure, simply biasing the line end to be longer than the design length is inadequate because the line at best focus and exposure, or in an underexposed condition, would be excessively long, resulting either in short circuits as the extended line end touches neighboring structures, or unnecessarily large circuit sizes if more space is added between individual features in the circuit. Since one of the goals of integrated circuit design and manufacturing is to maximize the number of functional elements while minimizing the area required per chip, adding excess spacing is an undesirable solution.

Two-dimensional OPC approaches may help solve the line end pull back problem. Extra structures (also known as "assist features") such as "hammerheads" or "serifs" may be added to line ends to effectively anchor them in place and provide reduced pull back over the entire process window. Even at best focus and exposure these extra structures are not resolved but they alter the appearance of the main feature without being fully resolved on their own. A "main feature" as used herein means a feature intended to print on a substrate under some or all conditions in the process window. Assist features can take on much more aggressive forms than simple hammerheads added to line ends, to the extent the pattern on the patterning device is no longer simply the desired substrate pattern upsized by the reduction ratio. Assist features such as serifs can be applied for many more situations than simply reducing line end pull back. Inner or outer serifs can be applied to any edge, especially two dimensional edges, to reduce corner rounding or edge extrusions. With enough selective biasing and assist features of all sizes and polarities, the features on the patterning device bear less and less of a resemblance to the final pattern desired at the substrate level. In general, the patterning device pattern becomes a pre-distorted version of the substrate-level pattern, where the distortion is intended to counteract or reverse the pattern deformation that will occur during the manufacturing process to produce a pattern on the substrate that is as close to the one intended by the designer as possible.

Another OPC technique involves using completely independent and non-resolvable assist features, instead of or in addition to those assist features (e.g., serifs) connected to the main features. The term "independent" here means that edges of these assist features are not connected to edges of the main features. These independent assist features are not intended or desired to print as features on the substrate, but rather are intended to modify the aerial image of a nearby main feature to enhance the printability and process tolerance of that main feature. These assist features (often referred to as "scattering bars" or "SBAR") can include sub-resolution assist features (SRAF) which are features outside edges of the main features and sub-resolution inverse features (SRIF) which are features scooped out from inside the edges of the main features. The presence of a SBAR adds yet another layer of complexity to a patterning device pattern. A simple example of a use of scattering bars is where a regular array of non-resolvable scattering bars is drawn on both sides of an isolated line feature, which has the effect of making the isolated line appear, from an aerial image standpoint, to be more representative of a single line within an array of dense lines, resulting in a process window much closer in focus and exposure tolerance to that of a dense pattern. The common process window between such a decorated isolated feature and a dense pattern will have a larger common tolerance to focus and exposure variations than that of a feature drawn as isolated at the patterning device level.

An assist feature may be viewed as a difference between features on a patterning device and features in the design layout. The terms "main feature" and "assist feature" do not imply that a particular feature on a patterning device must be labeled as one or the other.

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

- a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

- a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin ($\Theta_{max}$), wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. An example CTM flow and its details may be found in commonly assigned U.S. Pat. No. 8,584,056, the disclosure of which is hereby incorporated by reference in its entirety.

According to an embodiment, the design layout may be optimized as a continuous transmission mask ("CTM optimization"). In this optimization, the transmission at all the locations of the design layout is not restricted to a number of discrete values. Instead, the transmission may assume any value within an upper bound and a lower bound. More details may be found in commonly assigned U.S. Pat. No. 8,584,056, the disclosure of which is hereby incorporated by reference in its entirety. A continuous transmission mask is very difficult, if not impossible, to implement on the patterning device. However, it is a useful tool because not restricting the transmission to a number of discrete values makes the optimization much faster. In an EUV lithographic projection apparatus, the patterning device may be reflective. The principle of CTM optimization is also applicable to a design layout to be produced on a reflective patterning device, where the reflectivity at all the locations of the design layout is not restricted to a number of discrete values. Therefore, as used herein, the term "continuous transmission mask" may refer to a design layout to be produced on a reflective patterning device or a transmissive patterning device. The CTM optimization may be based on a three-dimensional mask model that takes in account thick-mask effects. The thick-mask effects arise from the vector nature of light and may be significant when feature sizes on the design layout are smaller than the wavelength of light used in the lithographic process. The thick-mask effects include polarization dependence due to the different boundary conditions for the electric and magnetic fields, transmission, reflectance and phase error in small openings, edge diffraction (or scattering) effects or electromagnetic coupling. More details of a three-dimensional mask model may be found in commonly assigned U.S. Pat. No. 7,703,069, the disclosure of which is hereby incorporated by reference in its entirety.

In an embodiment, assist features (sub resolution assist features and/or printable resolution assist features) may be placed into the design layout based on the design layout optimized as a continuous transmission mask. This allows identification and design of the assist feature from the continuous transmission mask.

In an embodiment, the thin-mask approximation, also called the Kirchhoff boundary condition, is widely used to simplify the determination of the interaction of the radiation and the patterning device. The thin-mask approximation assumes that the thickness of the structures on the patterning device is very small compared with the wavelength and that the widths of the structures on the mask are very large compared with the wavelength. Therefore, the thin-mask approximation assumes the electromagnetic field after the patterning device is the multiplication of the incident electromagnetic field with the mask transmission function. However, as lithographic processes use radiation of shorter and shorter wavelengths, and the structures on the patterning device become smaller and smaller, the assumption of the thin-mask approximation can break down. For example, interaction of the radiation with the structures (e.g., edges between the top surface and a sidewall) because of their finite thicknesses ("mask 3D effect" or "M3D") may become significant. Encompassing this scattering in the mask transmission function may enable the mask transmission function to better capture the interaction of the radiation with the patterning device. A mask transmission function under the thin-mask approximation may be referred to as a thin-mask transmission function. A mask transmission function encompassing M3D may be referred to as a M3D mask transmission function.

Figure 2:
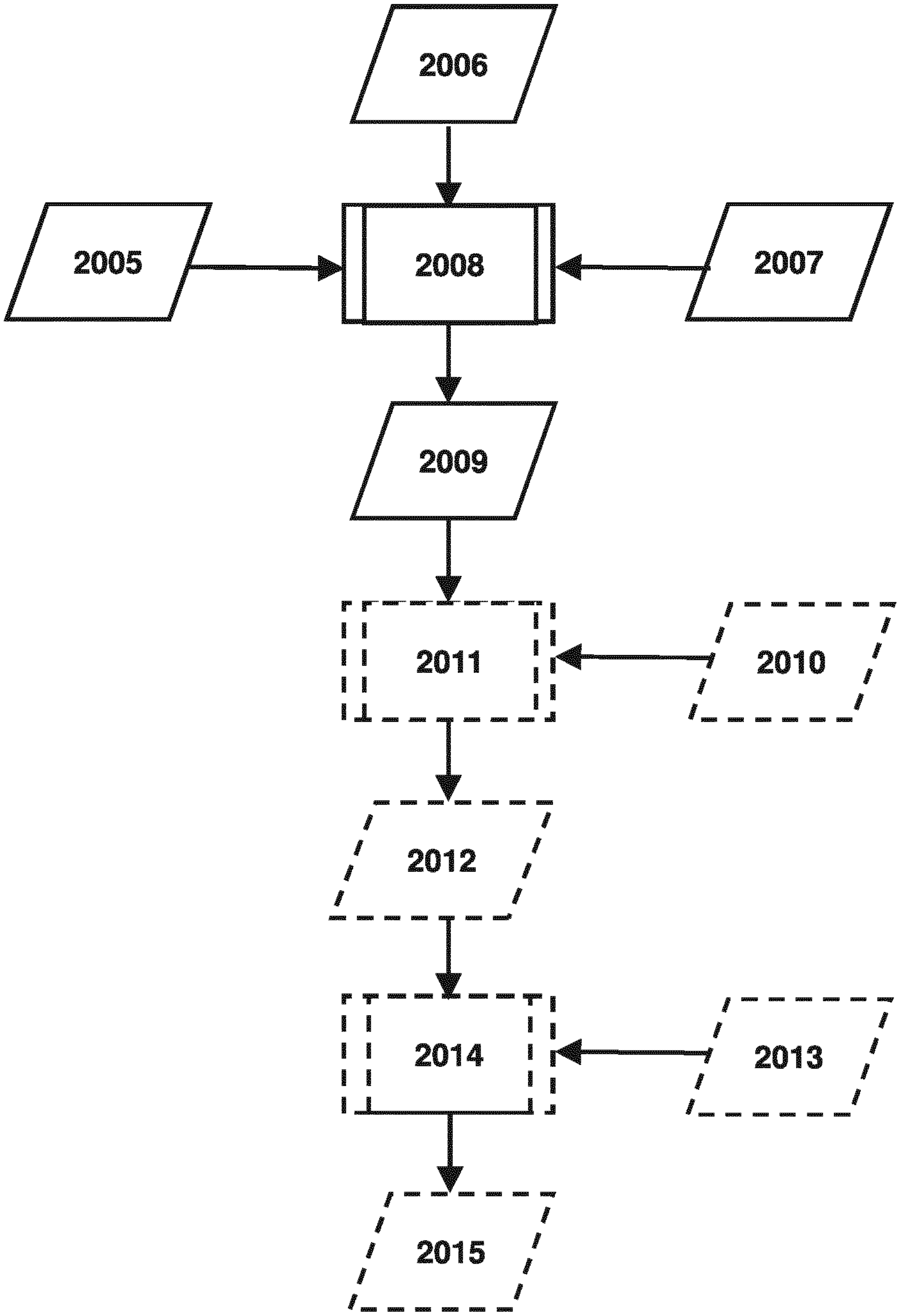
FIG. 2 shows a flowchart of a method for simulation of an image where M3D is taken into account, according to an embodiment.

FIG. 2 is a flowchart of a method for determining an image (e.g., aerial image, resist image, or etch image) that is a product of a patterning process involving a lithographic process, where M3D is taken into account, according to an embodiment. In procedure 2008, a M3D mask transmission function 2006 of a patterning device, an illumination source model 2005, and a projection optics model 2007 are used to determine (e.g., simulate) an aerial image 2009. The aerial image 2009 and a resist model 2010 may be used in optional procedure 2011 to determine (e.g., simulate) a resist image 2012. The resist image 2012 and an etch model 2013 may be used in optional procedure 2014 to determine (e.g., simulate) an etch image 2015. The etch image can be defined as a spatial distribution of the amount of etching in the substrate after the substrate is etched using the developed resist thereon as an etch mask.

As noted above, the mask transmission function (e.g., a thin-mask or M3D mask transmission function) of a patterning device is a function that determines the electromagnetic field of the radiation after it interacts with the patterning device based on the electromagnetic field of the radiation before it interacts with the patterning device. As described above, the mask transmission function can describe the interaction for a transmissive patterning device, or a reflective patterning device.

Figure 3:
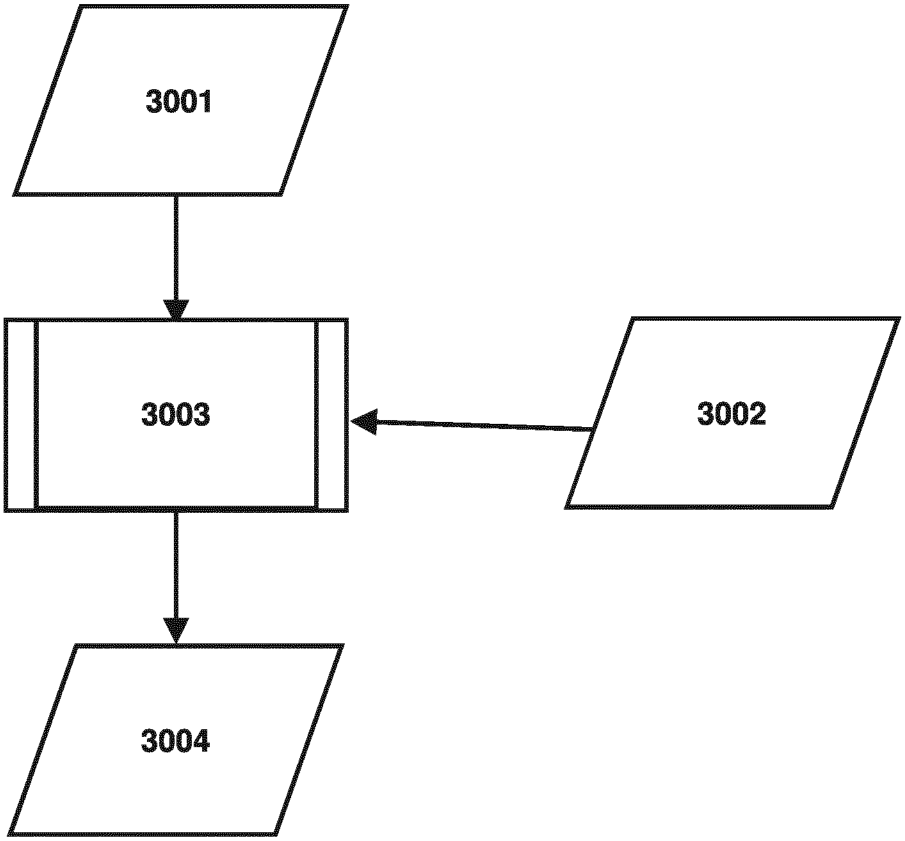
FIG. 3 schematically shows a flow chart for using a mask transmission function, according to an embodiment.

FIG. 3 schematically shows a flow chart for using the mask transmission function. The electromagnetic field 3001 of the radiation before it interacts with the patterning device and the mask transmission function 3002 are used in procedure 3003 to determine the electromagnetic field 3004 of the radiation after it interacts with the patterning device. The mask transmission function 3002 may be a thin-mask transmission function. The mask transmission function 3002 may be a M3D mask transmission function. In a generic mathematical form, the relationship between the electromagnetic field 3001 and the electromagnetic field 3004 may be expressed in a formula as $E_a(r)=T(E_b(r))$, wherein $E_a(r)$ is the electric component of the electromagnetic field 3004; $E_b(r)$ is the electric component of the electromagnetic field 3001; and T is the mask transmission function.

M3D (e.g., as represented by one or more parameters of the M3D mask transmission function) of structures on a patterning device may be determined by a computational or an empirical model. In an example, a computational model may involve rigorous simulation (e.g., using a Finite-Discrete-Time-Domain (FDTD) algorithm or a Rigorous-Coupled Waveguide Analysis (RCWA) algorithm) of M3D of all the structures on the patterning device. In another example, a computational model may involve rigorous simulation of M3D of certain portions of the structures that tend to have large M3D, and adding M3D of these portions to a thin-mask transmission function of all the structures on the patterning device. However, rigorous simulation tends to be computationally expensive.

An empirical model, in contrast, would not simulate M3D; instead, the empirical model determines M3D based on correlations between the input (e.g., one or more characteristics of the design layout comprised or formed by the patterning device, one or more characteristics of the patterning device such as its structures and material composition, and one or more characteristics of the illumination used in the lithographic process such as the wavelength) to the empirical model and M3D.

An example of an empirical model is a neural network. A neural network, also referred to as an artificial neural network (ANN), is "a computing system made up of a number of simple, highly interconnected processing elements, which process information by their dynamic state response to external inputs." *Neural Network Primer: Part I*, Maureen Caudill, AI Expert, February 1989. Neural networks are processing devices (algorithms or actual hardware) that are loosely modeled after the neuronal structure of the mammalian cerebral cortex but on much smaller scales. A neural network might have hundreds or thousands of processor units, whereas a mammalian brain has billions of neurons with a corresponding increase in magnitude of their overall interaction and emergent behavior.

A neural network may be trained (i.e., whose parameters are determined) using a set of training data. The training data may comprise or consist of a set of training samples. Each sample may be a pair comprising or consisting of an input object (typically a vector, which may be called a feature vector) and a desired output value (also called the supervisory signal). A training algorithm analyzes the training data and adjusts the behavior of the neural network by adjusting the parameters (e.g., weights of one or more layers) of the neural network based on the training data. The neural network after training can be used for mapping new samples.

In the context of determining M3D, the feature vector may include one or more characteristics (e.g., shape, arrangement, size, etc.) of the design layout comprised or formed by the patterning device, one or more characteristics (e.g., one or more physical properties such as a dimension, a refractive index, material composition, etc.) of the patterning device, and one or more characteristics (e.g., the wavelength) of the illumination used in the lithographic process. The supervisory signal may include one or more characteristics of the M3D (e.g., one or more parameters of the M3D mask transmission function).

Given a set of N training samples of the form $\{(x_1, y_1), (x_2, y_2), \ldots, (x_N, y_N)\}$ such that $x_1$ is the feature vector of the i-th example and $y_i$ is its supervisory signal, a training algorithm seeks a neural network g: X→Y, where X is the input space and Y is the output space. A feature vector is an n-dimensional vector of numerical features that represent some object. The vector space associated with these vectors is often called the feature space. It is sometimes convenient to represent g using a scoring function f: $X \times Y \rightarrow \mathbb{R}$ such that g is defined as returning the y value that gives the highest score:

$$g(x) = \underset{y}{\operatorname{argmax}}\ f(x, y).$$

Let F denote the space of scoring functions.

The neural network may be probabilistic where g takes the form of a conditional probability model g(x)=P(y|x), or f takes the form of a joint probability model f(x,y)=P(x,y).

There are two basic approaches to choosing f or g: empirical risk minimization and structural risk minimization. Empirical risk minimization seeks the neural network that best fits the training data. Structural risk minimization includes a penalty function that controls the bias/variance tradeoff. For example, in an embodiment, the penalty function may be based on a cost function, which may be a squared error, number of defects, EPE, etc. The functions (or weights within the function) may be modified so that the variance is reduced or minimized.

In both cases, it is assumed that the training set comprises or consists of one or more samples of independent and identically distributed pairs $(x_i, y_i)$. In order to measure how well a function fits the training data, a loss function L: $Y \times Y \rightarrow \mathbb{R}^{\geq 0}$ is defined. For training sample $(x_i, y_i)$, the loss of predicting the value $\hat{y}$ is $L(y_i, \hat{y})$.

The risk R(g) of function g is defined as the expected loss of g. This can be estimated from the training data as $$R_{emp}(g) = \frac{1}{N}\sum_i L(y_i, g(x_i)).$$

Figure 4:
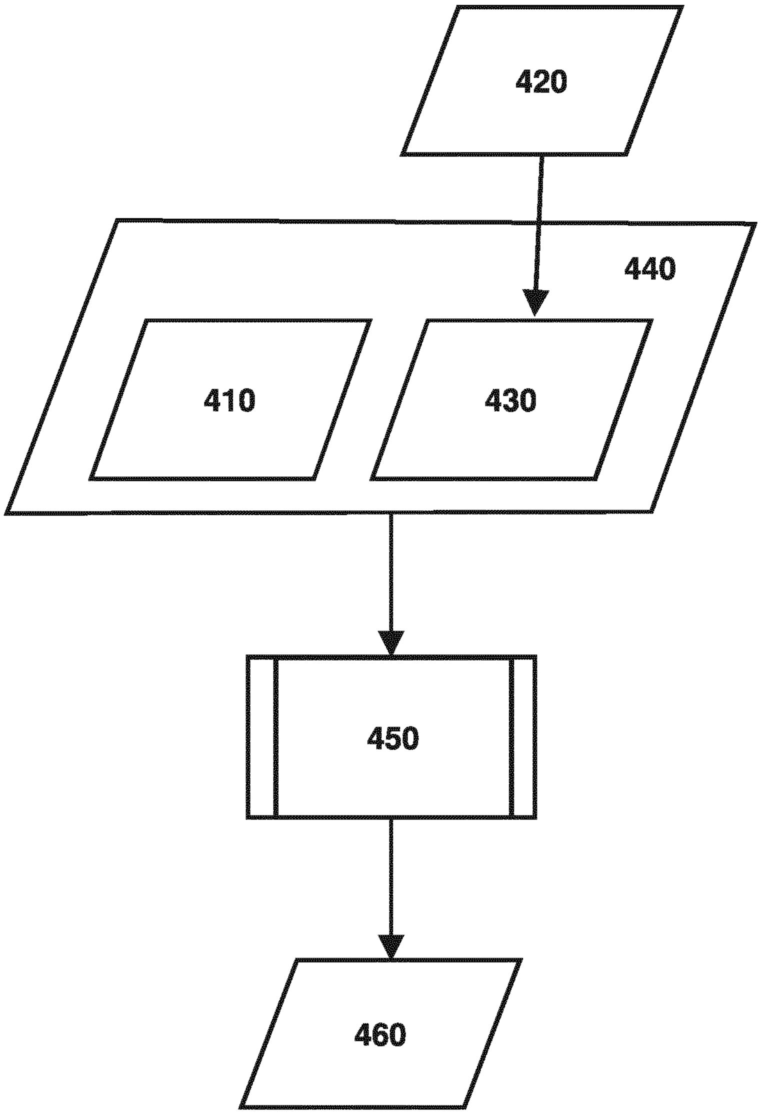
FIG. 4 schematically shows a flowchart for a method of training a neural network that determines M3D of structures on a patterning device, according to an embodiment.

FIG. 4 schematically shows a flowchart for a method of training a neural network that determines M3D (e.g., as represented by one or more parameters of the M3D mask transmission function) of one or more structures on a patterning device, according to an embodiment. Values of one or more characteristics 410 of a portion of a design layout are obtained. The design layout may be a binary design layout, a continuous tone design layout (e.g., rendered from a binary design layout), or a design layout of another suitable form. The one or more characteristics 410 may include one or more geometrical characteristics (e.g., absolute location, relative location, and/or shape) of one or more patterns in the portion. The one or more characteristics 410 may include a statistical characteristic of the one or more patterns in the portion. The one or more characteristics 410 may include parameterization of the portion (e.g., values of a function of the one or more patterns in the portion), such as projection on a certain basis function. The one or more characteristics 410 may include an image (pixelated, binary, or continuous tone) derived from the portion. Values of one or more characteristics 430 of M3D of a patterning device comprising or forming the portion are determined using any suitable method. The values of one or more characteristics 430 of M3D may be determined based on the portion or the one or more characteristics 410 thereof. For example, the one or more characteristics 430 of the M3D may be determined using a computational model. For example, the one or more characteristics 430 may include one or more parameters of the M3D mask transmission function of the patterning device. The values of one or more characteristics 430 of M3D may be derived from a result 420 of the patterning process that uses the patterning device. The result 420 may be an image (e.g., aerial image, resist image, and/or etch image) formed on a substrate by the patterning process, or a characteristic (e.g., CD, mask error enhancement factor (MEEF), process window, yield, etc.) thereof. The values of the one or more characteristics 410 of the portion of the design layout and the one or more characteristics 430 of M3D are included in training data 440 as one or more samples. The one or more characteristics 410 are the feature vector of the sample and the one or more characteristics 430 are the supervisory signal of the sample. In procedure 450, a neural network 460 is trained using the training data 440.

Figure 5:
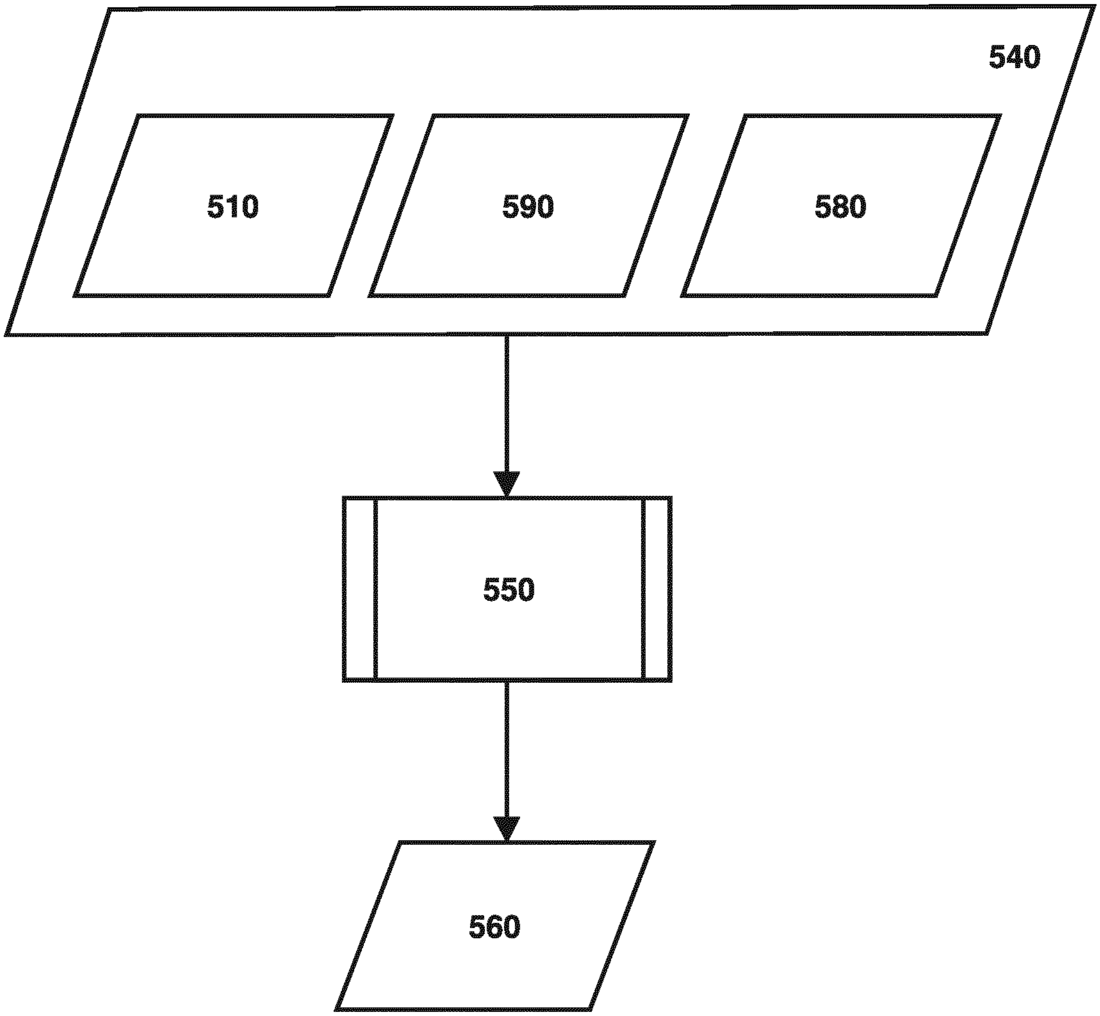
FIG. 5 schematically shows a flowchart for a method of training a neural network that determines M3D of structures on a patterning device, according to an embodiment.

FIG. 5 schematically shows a flowchart for a method of training a neural network that determines M3D (e.g., as represented by one or more parameters of the M3D mask transmission function) of one or more structures on a patterning device, according to an embodiment. Values of one or more characteristics 510 of a portion of a design layout are obtained. The design layout may be a binary design layout, a continuous tone design layout (e.g., rendered from a binary design layout), or a design layout of another suitable form. The one or more characteristics 510 may include one or more geometrical characteristics (e.g., absolute location, relative location, and/or shape) of one or more patterns in the portion. The one or more characteristics 510 may include one or more statistical characteristics of the one or more patterns in the portion. The one or more characteristics 510 may include parameterization of the portion (i.e., values of one or more functions of one or more patterns in the portion), such as projection on a certain basis function. The one or more characteristics 510 may include an image (pixelated, binary, or continuous tone) derived from the portion. Values of one or more characteristics 590 of the patterning process are also obtained. The one or more characteristics 590 of the patterning process may include one or more characteristics of the illumination source of the lithographic apparatus used in the lithographic process, one or more characteristics of the projection optics of the lithographic apparatus used in the lithographic process, one or more characteristics of a post-exposure procedure (e.g., resist development, post exposure bake, etching, etc.), or a combination selected therefrom. Values of one or more characteristics 580 of a result of the patterning process that uses a patterning device comprising or forming the portion are determined. The values of the one or more characteristics 580 of the result may be determined based on the portion and the patterning process. The result may be an image (e.g., aerial image, resist image, and/or etch image) formed on a substrate by the patterning process. The one or more characteristics 580 may be CD, mask error enhancement factor (MEEF), a process window, or a yield. The one or more characteristics 580 of the result may be determined using a computational model. The values of the one or more characteristics 510 of the portion of the design layout, the one or more characteristics 590 of the patterning process, and the one or more characteristics 580 of the result are included in training data 540 as one or more samples. The one or more characteristics 510 and the one or more characteristics 590 are the feature vector of the sample and the one or more characteristics 580 are the supervisory signal of the sample. In procedure 550, a neural network 560 is trained using the training data 540.

Figure 6:
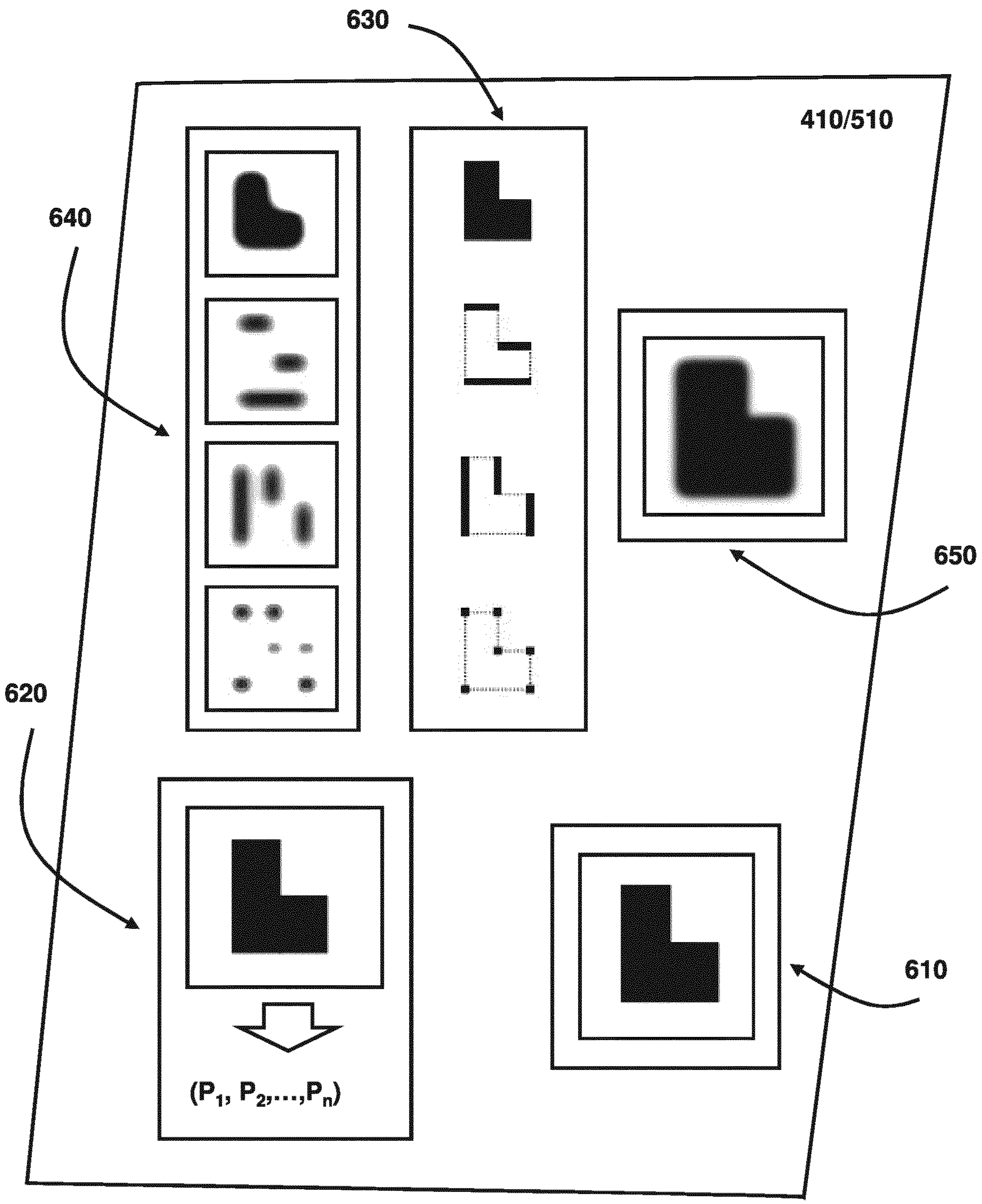
FIG. 6 schematically shows examples of the characteristics of a portion of a design layout used in the methods of FIG. 4 or FIG. 5.

FIG. 6 schematically shows that examples of the one or more characteristics 410 and 510 may include the portion 610 of the design layout, parameterization 620 of the portion, one or more geometric components 630 (e.g., one or more areas, one or more corners, one or more edges, etc.) of the portion, a continuous tone rendering 640 of the one or more geometric components, and/or a continuous tone rendering 650 of the portion.

Figure 7A:
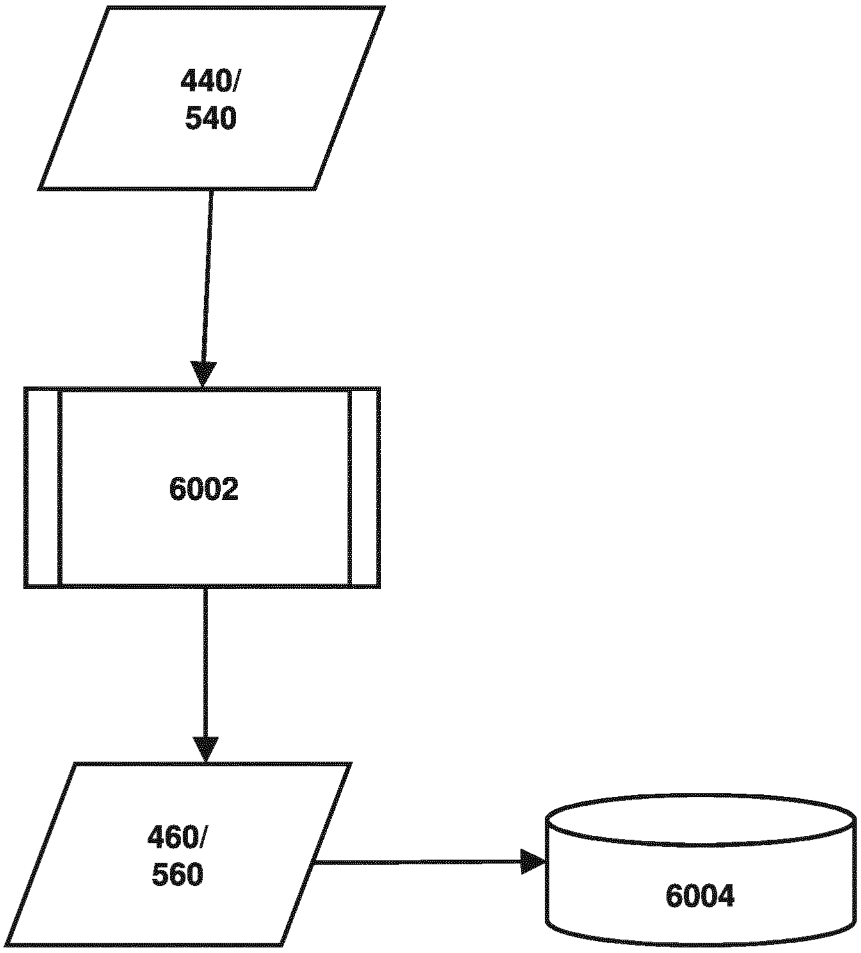
FIG. 7A schematically shows a flow chart where M3D models may be derived for a number of patterning processes and stored in a database for future use, according to an embodiment.

FIG. 7A schematically shows a flow chart of one or more M3D models being derived for a number of patterning processes and stored in a database for future use. One or more characteristics of a patterning process 6001 (see FIG. 7B) are used to derive a M3D model 6003 (see FIG. 7B) for the patterning process 6001 in procedure 6002. The M3D model 6003 may be obtained by simulation. The M3D model 6003 is stored in a database 6004.

Figure 7B:
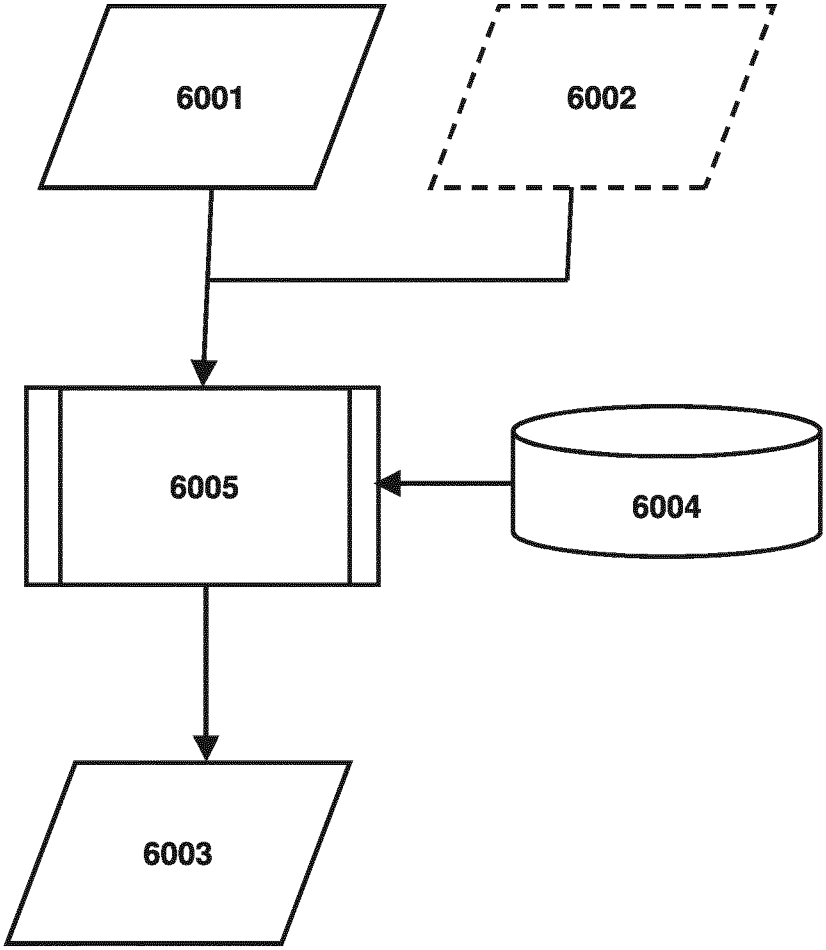
FIG. 7B schematically shows a flow chart where a M3D model may be retrieved from a database based on the patterning process, according to an embodiment.

FIG. 7B schematically shows a flow chart of a M3D model being retrieved from a database based on the patterning process. In procedure 6005, one or more characteristics of a patterning process 6001 are used to query the database 6004 and retrieve a M3D model 6003 for the patterning process 6001.

In an embodiment, an optics model may be used that represents optical characteristics (including changes to the radiation intensity distribution and/or the phase distribution caused by the projection optics) of projection optics of a lithographic apparatus. The projection optics model can represent the optical characteristics of the projection optics, including aberration, distortion, one or more refractive indexes, one or more physical sizes, one or more physical dimensions, etc.

In an embodiment, a machine learning model (e.g., a CNN) may be trained to represent a resist process. In an example, a resist CNN may be trained based using a cost function that represents deviations of the output of the resist CNN from the simulated values (e.g., obtained from physics based resist model an example of which can be found in U.S. Patent Application Publication No. US 2009-0157360). Such resist CNN may predict a resist image based on the aerial image predicted by the optics model discussed above. Typically, a resist layer on a substrate is exposed by the aerial image and the aerial image is transferred to the resist layer as a latent "resist image" (RI) therein. The resist image (RI) can be defined as a spatial distribution of solubility of the resist in the resist layer. A resist image can be obtained from the aerial image using the resist CNN. The resist CNN can be used to predict the resist image from the aerial image, an example of training method can be found in U.S. Patent Application No. U.S. 62/463,560, the disclosure of which is hereby incorporated by reference in its entirety. The resist CNN may predict the effects of chemical processes which occur during resist exposure, post exposure bake (PEB) and development, in order to predict, for example, contours of resist features formed on the substrate and so it typically related only to such properties of the resist layer (e.g., effects of chemical processes which occur during exposure, post-exposure bake and development). In an embodiment, the optical properties of the resist layer, e.g., refractive index, film thickness, propagation and polarization effects—may be captured as part of the optics model.

So, in general, the connection between the optical and the resist model is a predicted aerial image intensity within the resist layer, which arises from the projection of radiation onto the substrate, refraction at the resist interface and multiple reflections in the resist film stack. The radiation intensity distribution (aerial image intensity) is turned into a latent "resist image" by absorption of incident energy, which is further modified by diffusion processes and various loading effects. Efficient models and training methods that are fast enough for full-chip applications may predict a realistic 3-dimensional intensity distribution in the resist stack.

In an embodiment, the resist image can be used an input to a post-pattern transfer process model module. The post-pattern transfer process model may be another CNN configured to predict a performance of one or more post-resist development processes (e.g., etch, development, etc.).

Training of different machine learning models of the patterning process can, for example, predict contours, CDs, edge placement (e.g., edge placement error), etc. in the resist and/or etched image. Thus, the objective of the training is to enable accurate prediction of, for example, edge placement, and/or aerial image intensity slope, and/or CD, etc. of the printed pattern. These values can be compared against an intended design to, e.g., correct the patterning process, identify where a defect is predicted to occur, etc. The intended design (e.g., a target pattern to be printed on a substrate) is generally defined as a pre-OPC design layout which can be provided in a standardized digital file format such as GDSII or OASIS or other file format.

Modeling of the patterning process is an important part of computational lithography applications. The modeling of patterning process typically involves building several models corresponding to different aspects of the patterning processes including mask diffraction, optical imaging, resist development, an etch process, etc. The models are typically a mixture of physical and empirical models, with varying degrees of rigor or approximations. The models are fitted based on various substrate measurement data, typically collected using scanning electron microscope (SEM) or other lithography related measurement tools (e.g., HMI, YieldStar, etc.). The model fitting is a regression process, where the model parameters are adjusted so that the discrepancy between the model output and the measurements is minimized.

Such models raise challenges related to runtime of the models, and accuracy and consistency of results obtained from the models. Because of the large amount of data that needs to be processed (e.g., related to billions of transistors on a chip), the runtime requirement imposes severe constraints on the complexity of algorithms implemented within the models. Meanwhile the accuracy requirements become tighter as size of the patterns to be printed become smaller (e.g., less than 20 nm or even single digits nm) in size. Once such problem include an inverse function computations, where models use non-linear optimization algorithms (such as Broyden-Fletcher-Goldfarb-Shanno (BFGS)) which typically requires calculation of gradients (i.e., derivative of a cost function at a substrate level relative to variables corresponding to a mask). Such algorithms are typically computationally intensive, and may be suitable for a clip level applications only. A chip level refers to a portion of a substrate on which a selected pattern is printed; the substrate may have thousands or millions of such dies. As such, not only faster models are needed, but also model that can produce more accurate result than existing models are needed to enable printing of features and patterns of smaller sizes (e.g., less than 20 nm to single-digit nm) on the substrate. On the other hand, the machine learning based process model or mask optimization model, according to present disclosure, provide (i) a better fitting compared to the physics based or empirical model due to higher fitting power (i.e., relatively more number parameters such as weights and bias may be adjusted) of the machine leaning model, and (ii) simpler gradient computation compared to the traditional physics based or empirical models. Furthermore, the trained machine learning model (e.g., CTM model LMC model (also referred manufacturability model), MRC model, other similar models, or a combination thereof discussed later in the disclosure), according to the present disclosure, may provide benefits such as (i) improved accuracy of prediction of, for example, a mask pattern or a substrate pattern, (ii) substantially reduced runtime (e.g., by more than 10×, 100×, etc.) for any design layout for which a mask layout may be determined, and (iii) simpler gradient computation compared to physics based model, which may also improve the computation time of the computer(s) used in the patterning process.

According to the present disclosure machine learning models such as a deep convolutional neural network may be trained to model different aspects of the patterning process. Such trained machine learning models may offer a significant speed improvement over the non-linear optimization algorithms (typically used in the inverse lithography process (e.g., iOPC) for determining mask pattern), and thus enable simulation or prediction of a full-chip applications.

Several models based on deep learning with convolutional neural networks (CNN) are proposed in U.S. Applications 62/462,337 and 62/463,560. Such models are typically targeted at individual aspects of the lithographic process (e.g., 3D mask diffraction or resist process). As a result, a mixture of physical models, empirical or quasi-physical models, and machine learning models may be obtained. The present disclosure provides a unified model architecture and training method for machine learning based modeling that enables additional accuracy gain for potentially the entire patterning process.

In an embodiment, the existing analytical models (e.g. physics based or empirical models) related to mask optimization process (or source-mask optimization (SMO) in general) such as optical proximity corrections may be replaced with the machine learning models generated according to the present disclosure that may provide faster time to market as well as better yield compared to existing analytical models. For example, the OPC determination based on physics based or empirical models involves an inverse algorithm (e.g., in inverse OPC (iOPC) and SMO), which solves for an optimal mask layout given the model and a substrate target, namely, the calculation of the gradient (which is highly complex and resource intensive with high runtime). The machine learning models, according to the present disclosure, provides a simpler gradient calculations (compared to, for example, iOPC based method), thus reducing the computational complexity and runtime of the process model and/or the mask optimization related models.

Figure 8:
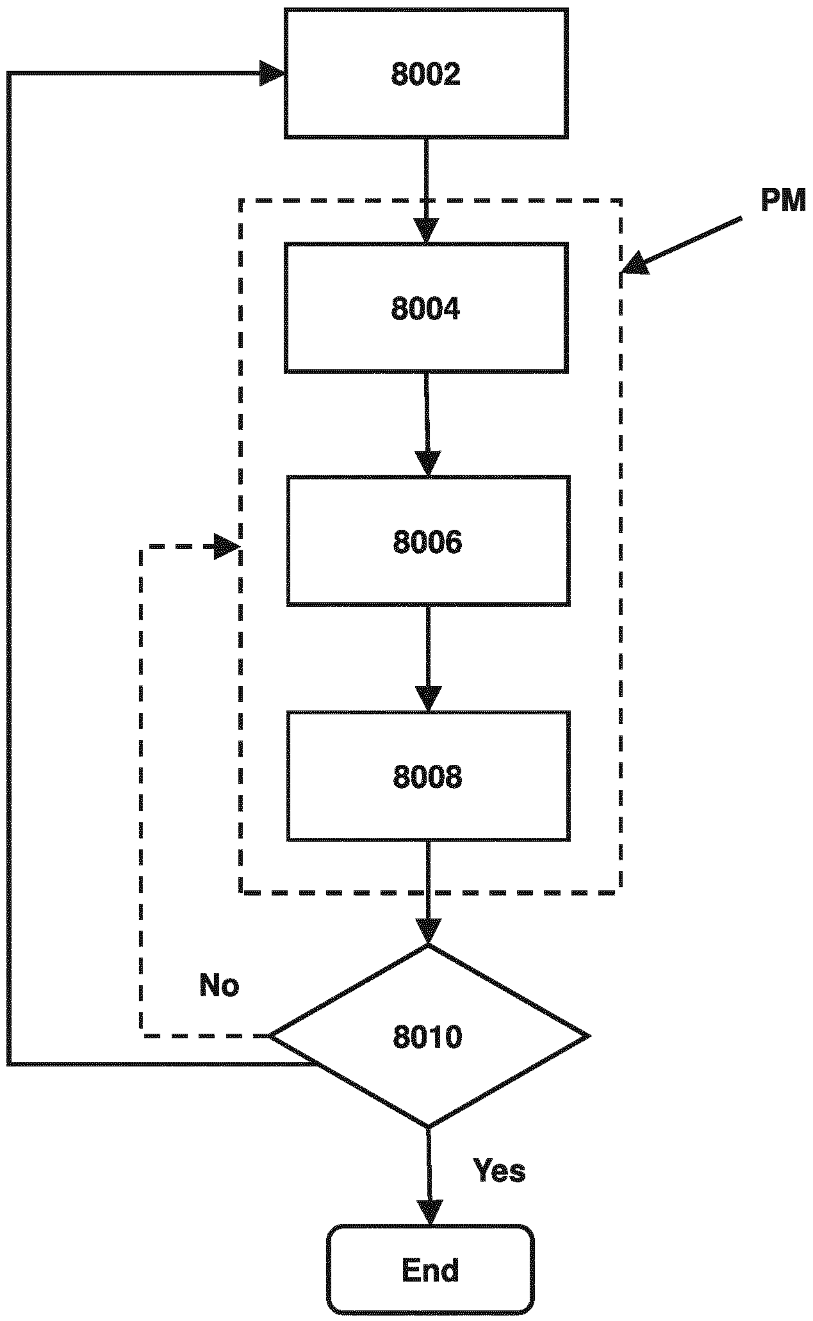
FIG. 8 is a block diagram of a machine learning based architecture of a patterning process, according to an embodiment.

FIG. 8 is a block diagram of a machine learning based architecture of a patterning process. The block diagram illustrates different elements of the machine learning based architecture including (i) a set of trained machine learning models (e.g., 8004, 8006, 8008) representing, for example, a lithographic process, (ii) a machine learning model (e.g., 8002) representing or configured to predict mask patterns (e.g., a CTM image or OPC), and (iii) a cost function 8010 (e.g., a first cost function and a second cost function) used to trained different machine learning models according to the present disclosure. A mask pattern is a pattern of a pattern device, which when used in a pattern process results in a target pattern to the printed on the substrate. The mask pattern may be represented as an image. During a process of determining a mask pattern several related images such as CTM image, binary image, OPC image etc. may be generated. Such related images are also generally referred as a mask pattern.

In an embodiment, the machine learning architecture may be divided into several parts: (i) training of individual process model (e.g., 8004, 8006, and 8008), further discussed later in the disclosure, (ii) coupling the individual process models and further training and/or fine-tuning the trained process models based on a first training data set (e.g., printed patterns) and a first cost function (e.g., difference between printed patterns and predicted patterns), further discussed in FIG. 9, and (iii) using the trained process models to train another machine learning model (e.g., 8002) configured to predict mask pattern (e.g., including OPC) based on a second training data set (e.g., a target pattern) and a second cost function (e.g., EPE between the target pattern and the predicted pattern), further discussed in FIG. 10A. The training of the process models may be considered as a supervised learning method, where the prediction of patterns are compared with experimental data (e.g., printed substrate). On the other hand, training of, for example, the CTM model, using the trained process model may be considered as an unsupervised learning, where target patterns are compared with the predicted patterns based on a cost function such as EPE.

In an embodiment, the patterning process may include the lithographic process which may be represented by one or more machine learning models such as convolutional neural networks (CNNs) or deep CNN. Each machine learning model (e.g., a deep CNN) may be individually pre-trained to predict an outcome of an aspect or process (e.g., mask diffraction, optics, resist, etching, etc.) of the patterning process. Each such pre-trained machine learning model of the patterning process may be coupled together to represent the entire patterning process. For example, in FIG. 8, a first trained machine learning model 8004 may be coupled to a second trained machine learning model 8006 and the second trained machine learning model 8006 may be further coupled to a third trained machine learning model 8008 such that the coupled models represent a lithographic process model. Furthermore, in an embodiment, a fourth trained model (not illustrated) configured to predict an etching process may be coupled to the third trained model 8008, thus further extending the lithographic process model.

However, simply coupling individual models may not generate accurate predictions of the lithographic process, even though each model is optimized to accurately predict individual aspect or process output. Hence, coupled models may be further fine-tuned to improve the prediction of the coupled models at a substrate-level rather than a particular aspect (e.g., diffraction or optics) of the lithographic process. Within such fine-tuned model, the individual trained models may have modified weights thus rendering the individual models non-optimized, but resulting in a relatively more accurate overall coupled model compared to individual trained models. The coupled models may be fine-tuned by adjusting the weights of one or more of the first trained model 8004, the trained second model 8006, and/or the third trained model 8008 based on a cost function.

The cost function (e.g., the first cost function) may be defined based on a difference between the experimental data (i.e., printed patterns on a substrate) and the output of the third model 8008. For example, the cost function may be a metric (e.g., RMS, MSE, MXE etc.) based on a parameter (e.g., CD, overlay) of the patterning process determined based on the output of the third trained model, for example, a trained resist CNN model that predicts an outcome of the resist process. In an embodiment, the cost function may be an edge placement error, which can be determined based on a contour of predicted patterns obtained from the third trained model 8008 and the printed patterns on the substrate. During, the fine-tuning process, the training may involve modifying the parameters (e.g., weights, bias, etc.) of the process models so that the first cost function (e.g., the RMS) is reduced, in an embodiment, minimized. Consequently, the training and/or fine-tuning of the coupled models may generate a relatively more accurate model of the lithographic process compared to a non-fine-tuned model that is obtained by simply coupling individual trained models of different processes/aspects of the pattering process.

In an embodiment, the first trained model 8004 may be a trained mask 3D CNN and/or a trained thin mask CNN model configured to predict a diffraction effect/behavior of a mask during the patterning process. The mask may include a target pattern corrected for optical proximity corrections (e.g., SRAFs, Serifs, etc.) to enable printing of the target pattern on a substrate via the patterning process. The first trained model 8004 may receive, for example, a continuous transmission mask (CTM) in the form of a pixelated image. Based on the CTM image, the first trained model 8004 may predict a mask image (e.g., 640 in FIG. 6). The mask image may also be a pixelated image which may be further represented in a vector form, matrix form, tensor form, etc. for further processing by other trained models. In an embodiment a deep convolutional neural network may be generated or a pre-trained model may be obtained. For example, the first trained model 8004 to predict 3D mask diffraction may be trained as discussed earlier with respect to FIGS. 2-6. The trained 3D CNN may then generate a mask image which can be sent to the second trained model 8006.

In an embodiment, the second trained model 8006 may be a trained CNN model configured to predict a behavior of projection optics (e.g., including an optical system) of a lithographic apparatus (also commonly referred as a scanner or a patterning apparatus). For example, the second trained model may receive the mask image predicted by the first trained model 8004 and may predict an optical image or an aerial image. In an embodiment, a second CNN model may be trained based on training data including a plurality of aerial images corresponding to a plurality of mask images, where each mask image may correspond to a selected pattern printed on the substrate. In an embodiment, the aerial images of the training data may obtained from simulation of optical model. Based on the training data, the weights of the second CNN model may be iteratively adjusted such that a cost function is reduced, in an embodiment, minimized. After several iterations, the cost function may converge (i.e., no further improvement in predicted aerial image is observed) at which point the second CNN model may be considered as the second trained model 8006.

In an embodiment, the second trained model 8006 may be a non-machine learning model (e.g., physics based optics model, as discussed in earlier) such as Abbe or Hopkins (extended usually by an intermediate term, the Transfer Cross Coefficient (TCC)) formulation. In both Abbe and Hopkins formulation, the mask image or near field is convolved with a series of kernels, then squared and summed, to obtain the optical or aerial image. The convolution kernels may be carried over directly to other CNN models. Within such optics model, the square operation may correspond to the activation function in the CNN. Accordingly, such optics model may be directly compatible with the other CNN models and thus may be coupled with other CNN models.

In an embodiment, the third trained model 8008 may be a CNN model configured to predict a behavior of a resist process, as discussed earlier. In an embodiment, the training of a machine learning model (e.g., a ML-resist model) is based on (i) an aerial image(s), for example, predicted by an aerial image model (e.g., a machine learning based model or physics based model), and/or (ii) a target pattern (e.g., a mask image rendered from target layout). Further, the training process may involve reducing (in an embodiment, minimize), a cost function that describes the difference between a predicted resist image and an experimentally measured resist image (SEM image). The cost function can be based on image pixel intensity difference, contour to contour difference, or CD difference, etc. After the training, the ML-resist model can predict a resist image from an input image, for example, an aerial image.

The present disclosure is not limited to the trained models discussed above. For example, in an embodiment, the third trained model 8008 may be a combined resist and etching process, or the third model 8008 may be further coupled to the fourth trained model representing the etching process. The output (e.g., an etch image) of such fourth model may be used for training the coupled models. For example, the parameters (e.g., EPE, overlay, etc.) of the patterning process may be determined based on the etch image.

Further, the lithographic model (i.e., the fine-tuned coupled models discussed above), may be used to train another machine learning model 8002 configured to predict optical proximity corrections. In other words, the machine learning model (e.g., CNN) for OPC prediction may be trained by forward simulation of the lithographic model where a cost function (e.g., EPE) is computed based on a pattern at a substrate-level. Furthermore, the training may involve an optimization process based on gradient-based method where a local (or partial) derivative is taken by back propagation through different layers of the CNN (which is similar to computing partial derivative of an inverse function). The training process may continue till the cost function (e.g., EPE) is reduced, in an embodiment, minimized. In an embodiment, the CNN for OPC prediction may include a CNN for predicting a continuous transmission mask. For example, a CTM-CNN model 8002 may be configured to predict a CTM image, which is further used to determine structures corresponding to the optical proximity corrections for a target pattern. As such, the machine learning model may carry out the optical proximity corrections predictions based on a target pattern that will be printed on the substrate thus accounting for several aspects of the patterning process (e.g., mask diffraction, optical behavior, resist process, etc.).

On the other hand, a typical OPC or a typical inverse OPC method is based on updating mask image variables (e.g., pixel values of a CTM image) based on a gradient-based method. The gradient-based method involves generation of a gradient maps based on a derivative of a cost function with respect to the mask variables. Furthermore, the optimization process may involve several iterations where such cost function is computed till a mean squared error (MSE) or EPE is reduce, in an embodiment, minimized. For example, a gradient may be computed as dcost/dvar, where "cost" may be square of EPE (i.e., $EPE^2$) and var may be the pixel values of CTM image. In an embodiment, a variable may be defined as var=var−alpha*gradient, where alpha may be a hyper-parameter used to tune the training process, such var may be used to update CTM until cost is minimized.

Thus, using the machine learning based lithographic model enables the substrate-level cost function to be defined such that the cost function is easily differentiable compared to that in physics based or empirical models. For example, a CNN having a plurality of layers (e.g, 5, 10, 20, 50, etc. layers) involves simpler activation functions (e.g., a linear form such as ax+b) which are convolved several times to form the CNN. Determining gradients of such functions of the CNN is computationally inexpensive compared to computing gradients in a physics based models. Furthermore, the number of variables (e.g., mask related variables) in a physics based models are limited compared to number of weights and layers of the CNN. Thus, CNN enables higher order fine-tuning of models thereby achieving more accurate predictions compared to the physics based models having limited number of variables. Hence, the methods based on the machine learning based architecture, according to the present disclosure, has several advantages, for example, the accuracy of the predictions is improved compared to the traditional approaches that employ, for example, physics based process models.

Figure 9:
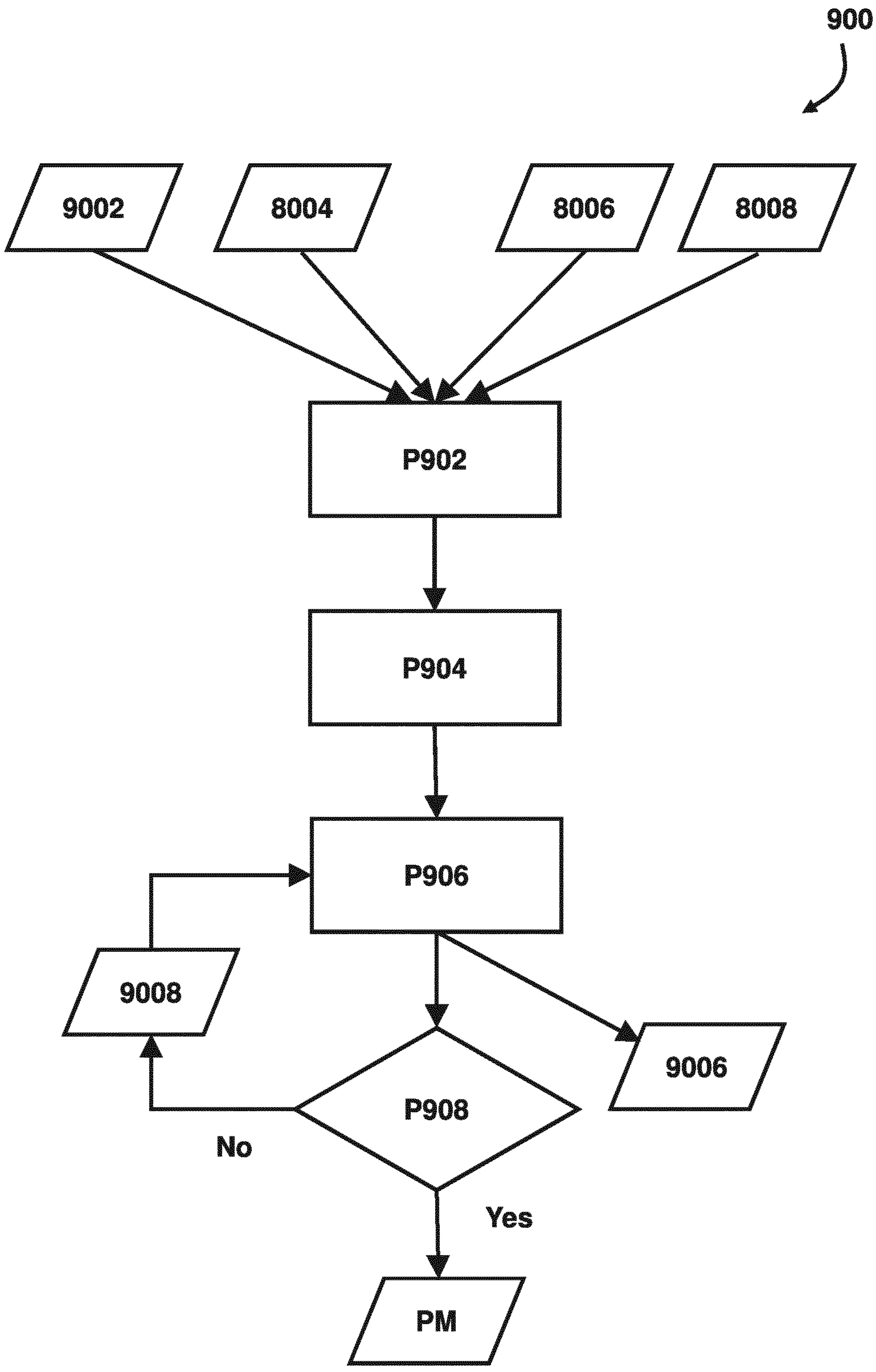
FIG. 9 schematically shows a flowchart of a method for training a process model of a patterning process to predict a pattern on a substrate, according to an embodiment.

FIG. 9 is a flowchart of a method 900 for training a process model of a patterning process to predict a pattern on a substrate, as discussed earlier. The method 900 illustrates the steps involved in training/fine-tuning/re-training the models of different aspects of the patterning process, discussed above. According to an embodiment, the process model PM trained in this method 900 may be used not only for training additional model (e.g., the machine learning model 8002) but also for some other applications. For example, in a CTM-based mask optimization approach involving a forward lithographic simulation and a gradient-based update of the mask variable until the process converges, and/or any other application that requires forward lithographic simulation like LMC, and/or MRC, which are discussed later in the disclosure.

The training process 900 involves, in process P902, obtaining and/or generating a plurality of machine learning model and/or a plurality of trained machine learning model (as discussed in earlier) and training data. In an embodiment, the machine learning models may be (i) the first trained machine learning model 8004 to predict a mask transmission of the patterning process, (ii) the second trained machine learning model 8006 to predict an optical behavior of an apparatus used in the patterning process, (iii) a third trained machine learning model to predict a resist process of the patterning process. In an embodiment, the first trained model 8004, the second trained model 8006, and/or the third trained model 8008 is a convolutional neural network that is trained to individually optimize one or more aspect of the patterning process, as discussed earlier in the disclosure.

The training data may include a printed pattern 9002 obtained from, for example, a printed substrate. In an embodiment, a plurality of printed patterns may be selected from the printed substrate. For example, the printed pattern may be a pattern (e.g., including bars, contact holes, etc.) corresponding to a die of the printed substrate after being subjected to the patterning process. In an embodiment, the printed pattern 9002 may be a portion of an entire design pattern printed on the substrate. For example, a most representative pattern, a user selected pattern, etc. may be used as the printed pattern.

In process P904, the training method involves connecting the first trained model 8004, the second trained model 8006, and/or the third trained model 8008 to generate an initial process model. In an embodiment, the connecting refers to sequentially connecting the first trained model 8004 to the second trained model 8006 and the second trained model 8006 to the third trained model 8008. Such sequentially connecting includes providing a first output of the first trained model 8004 as a second input to the second trained model 8004 and providing a second output of the second trained model 8006 as a third input to the third trained model 8008. Such connection and related inputs and outputs of each model are discussed earlier in the disclosure. For example, in an embodiment, the inputs and outputs may be pixelated images such as the first output may be a mask transmission image, the second output may an aerial image, and the third output may be a resist image. Accordingly, the sequential chaining of the models 8004, 8006, and 8008 results in the initial process model, which is further trained or fine-tuned to generate a trained process model.

In process P906, the training method involves training the initial process model (i.e., comprising the coupled models or connected models) configured to predict a pattern 9006 on a substrate based on a cost function (e.g., the first cost function) that determines a difference between the printed pattern 9002 and the predicted pattern 9006. In an embodiment, the first cost function corresponds to determination of a metric based on information at the substrate-level, e.g., based on the third output (e.g., resist image). In an embodiment, the first cost function may be a RMS, MSE, or other metric defining a difference between the printed pattern and the predicted pattern.

The training involves iteratively determining one or more weights corresponding to the first trained model, the second trained model, and/or the third trained model based on the first cost function. The training may involve a gradient-based method that determines a derivative of the first cost function with respect to different mask related variables or weights of the CNN model 8004, resist process related variables or weights of the CNN model 8008, optics related variables or weights of the CNN model 8006 or other appropriate variables, as discussed earlier. Further, based on the derivative of the first cost function, a gradient map is generated which provides a recommendation about increasing or decreasing the weights or parameters associated with variables such that value of the first cost function is reduced, in an embodiment, minimized. In an embodiment, the first cost function may be an error between the predicted pattern and the printed pattern. For example, an edge placement error between the printed pattern and the predicted pattern, a mean squared error, or other appropriate measure to quantify a difference between a printed pattern and the predicted pattern.

Furthermore, in process P908, a determination is made whether the cost function is reduced, in an embodiment, minimized. Minimized cost function indicates that the training process is converged. In other words, additional training using one or more printed pattern does not result in further improvements in the predicted pattern. If the cost function is, for example, minimized, then the process model is considered trained. In an embodiment, the training may be stopped after a predetermined number of iterations (e.g., 50,000 or 100,000 iterations). Such trained process model PM has unique weights that enable the trained process model to predict pattern on a substrate with higher accuracy than a simply coupled or connected model with no training or fine-tuning of the weights, as mentioned earlier.

In an embodiment, if the cost function is not minimized a gradient map 9008 may be generated in the process P908. In an embodiment, the gradient map 9008 may be a partial derivative of the cost function (e.g., RMS) with respect to parameters of the machine learning model. For example, the parameters may be bias and/or the weights of one or more models 8004, 8006, and 8008. The partial derivative may be determined during a back propagation through the models 8008, 8006, and/or 8004, in that order. As the models 8004, 8006, and 8008 are based on CNNs, the partial derivative computation, which is easier to compute compared to that for physics based process models, as mentioned earlier. The gradient map 9008 may then provide how to modify the weights of the models 8008, 8006, and/or 8004, so that the cost function is reduced or minimized. After several iterations, when the cost function is minimized or converges, the fine-tuned process model PM is said to be generated.

In an embodiment, one or more machine learning models may be trained to predict CTM images, which may be further used to predict a mask pattern or a mask image including the mask pattern, depending on a type of a training data set and the cost function used. For example, the present disclosure discusses three different method, in FIGS. 10A, 10B and 10C that train a first machine learning model (referred as CTM1 model, hereinafter), a second machine learning model (referred as CTM2 model, hereinafter), and a third machine learning model (referred as CTM3 model, hereinafter), respectively. For example, the CTM1 model may be trained using a target pattern (e.g, a design layout to be printed on a substrate, a rendering of the design layout, etc.), a resist image (e.g., obtained from the trained process model of FIG. 9 or models configured to predict a resist image) and a cost function (e.g., EPE). The CTM2 model may be trained using CTM benchmark images (or ground truth images) (e.g., generated by the SMO/iOPC) and a cost function (e.g., root mean squared error (RMS) between the CTM benchmark images (or ground truth images) and predicted CTM images). The CTM3 model may be trained using mask images (e.g., obtained from CTM1 model or other models configured to predict mask images), simulated resist images (e.g., obtained from physics-based or empirical models configured to predict a resist image), a target pattern (e.g, a design layout to be printed on a substrate), and a cost function (e.g., EPE or a pixel-based). In an embodiment, the simulated resist images are obtained via simulation using the mask images. Training methods for the CTM1 model, CTM2 models and the CTM3 models is discussed next with respect to FIGS. 10A, 10B, and 10C, respectively.

Figure 10A:
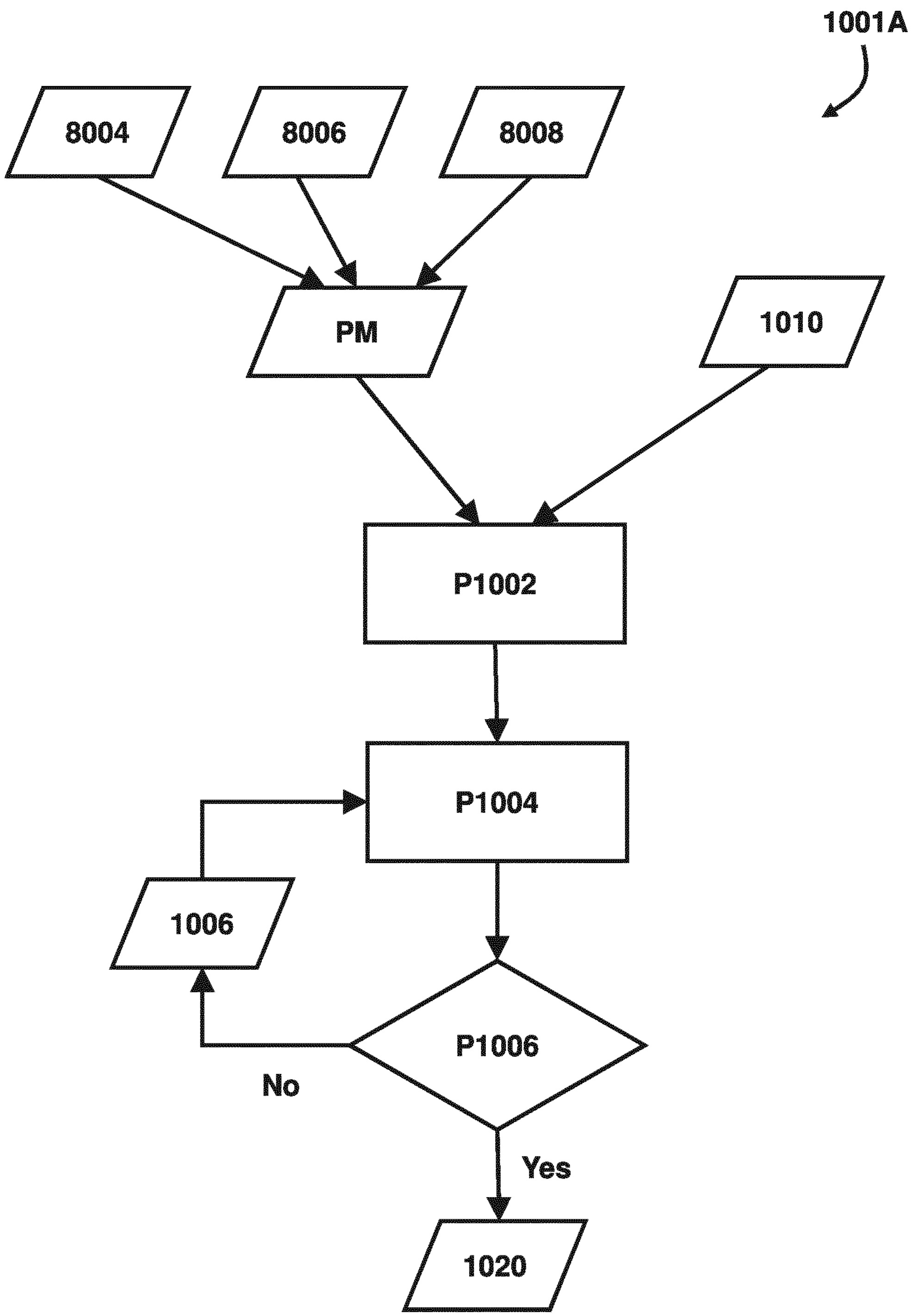
FIG. 10A schematically shows a flow chart of a method for training a machine learning model configured to predict a mask pattern for a mask used in a patterning process, according to an embodiment.

FIG. 10A is a flow chart for a method 1001A for training a machine learning model 1010 configured to predict CTM images or a mask pattern (e.g., via CTM images) including, for example, optical proximity corrections for a mask used in a patterning process. In an embodiment, the machine learning model 1010 may be a convolutional neural network (CNN). In an embodiment, the CNN 1010 may be configured to predict a continuous transmission mask (CTM), accordingly the CNN may be referred as CTM-CNN. The machine learning model 1010 is referred as CTM1 model 1010, hereinafter without limiting scope of the present disclosure.

The training method 1001A involves, in a process P1002, obtaining (i) a trained process model PM (e.g., trained process model PM generated by method 900 discussed above) of the patterning process configured to predict a pattern on a substrate, wherein the trained process model includes one or more trained machine learning models (e.g., 8004, 8006, and 8008), and (ii) a target pattern to be printed on a substrate. Typically, in the OPC process, a mask having a pattern corresponding to the target pattern is generated based on the target pattern. The OPC based mask pattern includes additional structures (e.g., SRAFs) and modifications to the edges of the target pattern (e.g., Serifs) so that when the mask is used in the patterning process, the patterning process eventually produces a target pattern on the substrate.

In an embodiment, the one or more trained machine learning models includes: the first trained model (e.g., model 8004) configured to predict a mask diffraction of the patterning process; the second trained model (e.g., model 8006) coupled to the first trained model (e.g., 8004) and configured to predict an optical behavior of an apparatus used in the patterning process; and a third trained model (e.g., 8008) coupled to the second trained model and configured to predict a resist process of the patterning process. Each of these models may be a CNN including a plurality of layers, each layer including a set of weights and activation functions that are trained/assigned particular weights via a training process, for example as discussed in FIG. 9.

In an embodiment, the first trained model 8004 includes a CNN configured to predict a two dimensional mask diffraction or a three dimensional mask diffraction of the patterning process. In an embodiment, the first trained machine learning model receives the CTM in the form of an image and predicts a two dimensional mask diffraction image and/or a three dimensional mask diffraction image corresponding to the CTM. During a first pass of the training method, the continuous transmission mask may be predicted by an initial or untrained CTM1 model 1010 configured to predict CTM, for example, as a part of an OPC process. Since, the CTM1 model 1010 is untrained, the predictions may potentially be non-optimal resulting in a relatively high error with respect to the target pattern desired to be printed on the substrate. However, progressively the error will reduce, in an embodiment, be minimized after several iterations of the training process of the CTM1 model 1010.

The second trained model may receive the predicted mask transmission image as input, for example, the three dimensional mask diffraction image from the first trained model and predict an aerial image corresponding to the CTM. Further, the third trained may receive the predicted aerial image and predict a resist image corresponding to the CTM.

Such resist image includes the predicted pattern that may be printed on the substrate during the patterning process. As indicated earlier, in the first pass, since the initial CTM predicted by the CTM1 model 1010 may be non-optimal or inaccurate, the resulting pattern on the resist image may be different from the target pattern, where the difference (e.g., measured in terms of EPE) between the predicted pattern and the target pattern will be high compared to a difference after several iterations of training of the CTM-CNN.

The training method, in process P1004, involves training the machine learning model 1010 (e.g., CTM1 model 1010) configured to predict CTM and/or further predict OPC based on the trained process model and a cost function that determines a difference between the predicted pattern and the target pattern. The training of the machine learning model 1010 (e.g., CTM1 model 1010) involves iteratively modifying weights of the machine learning model 1010 based on the gradient values such that the cost function is reduced, in an embodiment, minimized. In an embodiment, the cost function may be an edge placement error between the target pattern and the predicted pattern. For example, the cost function may be expressed as: cost=$f$(PM-CNN(CTM-CNN(input, ctm_parameter), pm_parameter), target), where the cost may be EPE (or $EPE^2$ or other appropriate EPE based metric), the function $f$ determines the difference between predicted image and target. For example, the function $f$ can first derive contours from a predict image and then calculate the EPE with respect to the target. Furthermore, PM-CNN represents the trained process model and the CTM-CNN represented the trained CTM model. The pm_parameter are parameters of the PM-CNN determined during the PM-CNN model training stage. The ctm_parameter are optimized parameters determined during the CTM-CNN training using gradient based method. In an embodiment, the parameters may be weights and bias of the CNN. Further, a gradient corresponding to the cost function may be dcost/dparameter, where the parameter may be updated based on equation (e.g., parameter=parameter+leaming_rate*gradient). In an embodiment, the parameter may be the weight and/or bias of the machine learning model (e.g., CNN), and learning_rate may be a hyper-parameter used to tune the training process and may be selected by a user or a computer to improve convergence (e.g., faster convergence) of the training process.

Upon several iterations of the training process, the trained machine learning model 1020 (which is an example of the model 8002 discussed earlier) may be obtained which is configured to predict the CTM image directly from a target pattern to be printed on the substrate. Furthermore, the trained model 1020 may be configured to predict OPC. In an embodiment, the OPC may include placement of assist features based on the CTM image. The OPC may be in the form of images and the training may be based on the images or pixel data of the images.

In process P1006 a determination may be made whether the cost function is reduced, in an embodiment, minimized. Minimized cost function indicates that the training process is converged. In other words, additional training using one or more target pattern does not result in further improvements in the predicted pattern. If the cost function is, for example, minimized, then the machine learning model 1020 is considered trained. In an embodiment, the training may be stopped after a predetermined number of iterations (e.g., 50,000 or 100,000 iterations). Such trained model 1020 has unique weights that enable the trained model 1020 (e.g., CTM-CNN) to predict mask image (e.g., CTM image) from a target pattern with higher accuracy and speed, as mentioned earlier.

In an embodiment, if the cost function is not minimized a gradient map 1006 may be generated in the process P1006. In an embodiment, the gradient map 1006 may be representation of a partial derivative of the cost function (e.g., EPE) with respect to the weights of the machine learning model 1010. The gradient map 1006 may then provide how to modify the weights of the model 1010, so that the cost function is reduced or minimized. After several iterations, when the cost function is minimized or converges, the model 1010 is considered as the trained model 1020.

In an embodiment, the trained model 1020 (which is an example of the model 8002 discussed earlier) may be obtained and further used to determine optical proximity corrections directly for a target pattern. Further, a mask may be manufactured including the structures (e.g., SRAFs, Serifs) corresponding to the OPC. Such mask based on the predictions from the machine learning model may be highly accurate, at least in terms of the edge placement error, since the OPC accounts for several aspects of the patterning process via trained models such as 8004, 8006, 8008, and 8002. In other words, the mask when used during the patterning process will generate desired patterns on the substrate with minimum errors in e.g., EPE, CD, overlay, etc.

Figure 10B:
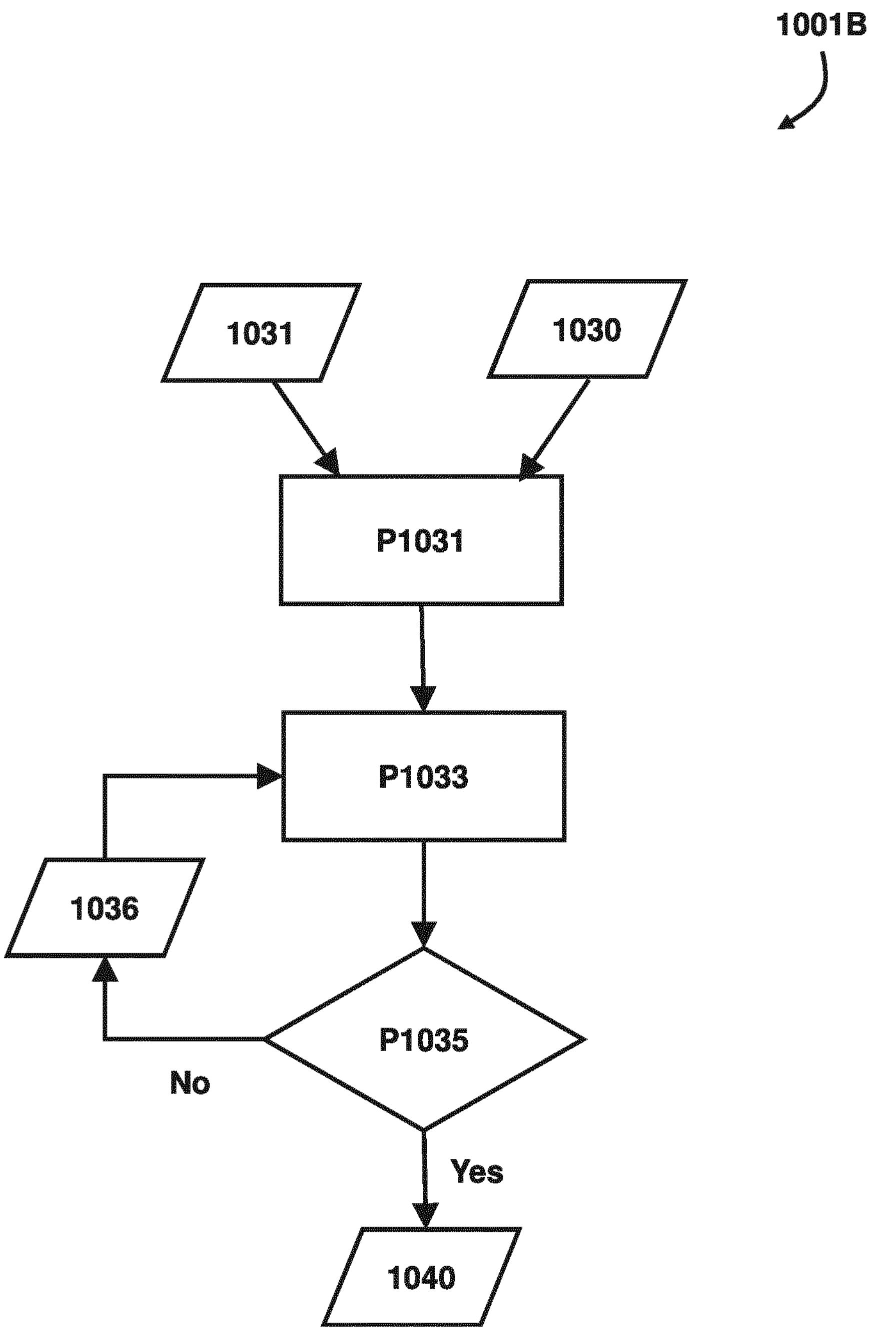
FIG. 10B schematically shows a flow chart of another method for training a machine learning model configured to predict a mask pattern for a mask used in a patterning process based on benchmark images, according to an embodiment.

FIG. 10B is a flow chart for a method 1001B for training a machine learning model 1030 (also referred as CTM2 model 1030) configured to predict CTM images. According to an embodiment, the training may be based on benchmark images (or ground truth images) generated, for example, by executing SMO/iOPC to pre-generate CTM truth images. The machine learning model may be further optimized based on a cost function that determines a difference between the benchmark CTM images and the predicted CTM images. For example, the cost function may be a root mean squared error (RMS) that may be reduced by employing a gradient-based method (similar to that discussed before).

The training method 1001B, in a process P1031, obtaining a set of benchmark CTM images 1031 and an untrained CTM2 model 1030 configured to predict CTM image. In an embodiment, the benchmark CTM images 1031 may be generated by SMO/iOPC based simulation (e.g, using Tachyon software). In an embodiment, the simulation may involve spatially shifting a mask image (e.g., CTM images) during the simulation process to generate a set of benchmark CTM images 1031 corresponding to a mask pattern.

Further, in process P1033, the method involves training the CTM2 model 1030 to predict a CTM image, based on the set of benchmark CTM images 1031 and evaluation of a cost function (e.g., RMS). The training process involves adjusting the parameters of the machine learning model (e.g., weights and bias) so that the associated cost function is minimized (or maximized depending on the metric used). In each iteration of the training process, a gradient map 1036 of the cost function is calculated and the gradient map is further used to guide the direction of the optimization (e.g., modification of weights of CTM2 model 1030).

For example, in process P1035, the cost function (e.g., RMS) is evaluated and a determination is made whether the cost function is minimized/maximized. In an embodiment, if the cost function is not reduced (in an embodiment, minimized), then a gradient map 1036 is generated by taking derivative of the cost function with respect to the parameters of the CTM2 model 1030. Upon several iterations, in an embodiment, if the cost function is minimized, then a trained CTM2 model 1040 may be obtained, where the CTM2 model 1040 have unique weights determined according to this training process.

Figure 10C:
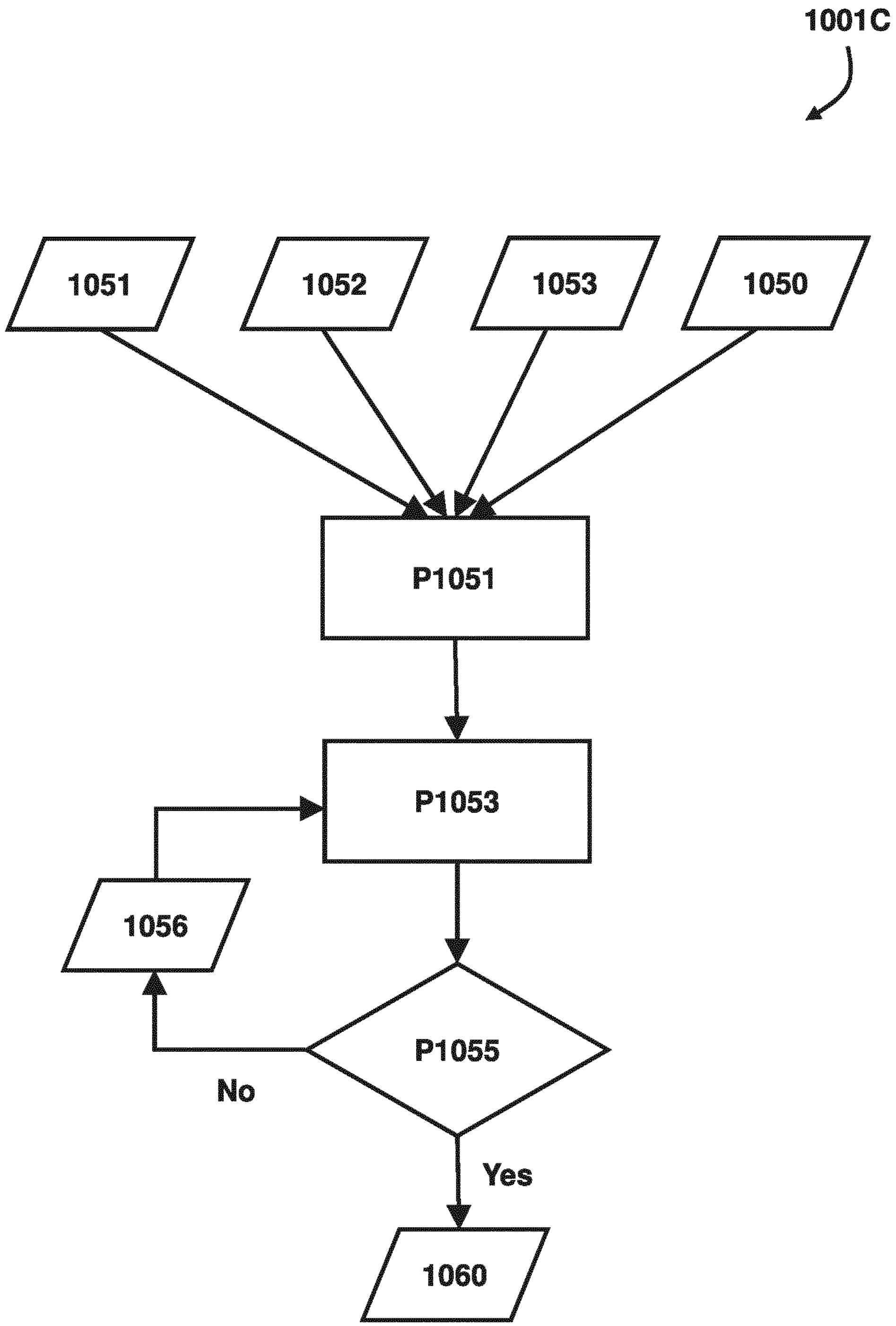
FIG. 10C schematically shows a flow chart of another method for training a machine learning model configured to predict a mask pattern for a mask used in a patterning process, according to an embodiment.

FIG. 10C is a flow chart for a method 1001C for training a machine learning model 1050 (also referred as CTM3 model 1050) configured to predict CTM images. According to an embodiment, the training may be based on another training data set and a cost function (e.g., EPE or RMS). The training data may include a mask image (e.g., a CTM image obtained from the CTM1 model 1010 or CTM2 model 1030) corresponding to a target pattern, a simulated process image (e.g., a resist image, an aerial image, an etch image, etc.) corresponding to the mask images, benchmark images (or ground truth images) generated, for example, by executing SMO/iOPC to pre-generate CTM truth images, and a target pattern. The machine learning model may be further optimized based on a cost function that determines a difference between the benchmark CTM images and the predicted CTM images. For example, the cost function may be a mean squared error (MSE), a higher order error (MXE), a root mean squared error (RMS), or other appropriate statistical metric that may be reduced by employing a gradient-based method (similar to that discussed before). The machine learning model may be further optimized based on a cost function that determines a difference between the target pattern and the pattern extracted from the resist image. For example, the cost function may be an EPE that may be reduced by employing a gradient-based method (similar to that discussed before). It can be understood by a person of ordinary skill in the art that a plurality of set of training data may be used corresponding to different target pattern to train the machine learning models, described herein.

The training method 1001C, in a process P1051, obtaining a training data including (i) a mask image 1052 (e.g., a CTM image obtained from the CTM1 model 1010 or CTM2 model 1030), (ii) a simulated process image 1051 (e.g., a resist image, an aerial image, an etch image, etc.) corresponding to the mask image 1052, (iii) a target pattern 1053, and (iv) a set of benchmark CTM images 1054, and an untrained CTM3 model 1050 configured to predict CTM image. In an embodiment, a simulated resist image may be obtained in different ways, for example, based on simulation of a physics based resist model, machine learning based resist model, or other model discussed in the present disclosure to generate the simulated resist image.

Further, in process P1053, the method involves training the CTM3 model 1050 to predict a CTM image, based on training data and evaluation of a cost function (e.g., EPE, pixel-based values, or RMS), similar to that of the process P1033 discussed earlier. However, because the method uses additional inputs includes the simulated process image (e.g., resist image) as input, the mask pattern (or mask image) obtained from the method will predict substrate contours that match more closely (e.g., more than 99% match) the target pattern compared to other methods.

The training of the CTM3 model involves adjusting the parameters of the machine learning model (e.g., weights and bias) so that the associated cost function is minimized/maximized. In each iteration of the training process, a gradient map 1056 of the cost function is calculated and the gradient map is further used to guide the direction of the optimization (e.g., modification of weights of CTM3 model 1050).

For example, in process P1055, the cost function (e.g., RMS) is evaluated and a determination is made whether the cost function is minimized/maximized. In an embodiment, if the cost function is not reduced (in an embodiment, minimized), then a gradient map 1056 is generated by taking derivative of the cost function with respect to the parameters of the CTM3 model 1050. Upon several iterations, in an embodiment, if the cost function is minimized, then a trained CTM3 model 1060 may be obtained, where the CTM3 model 1060 have unique weights determined according to this training process.

In an embodiment, the above methods may be further extended to train one or more machine learning models (e.g., a CTM4 model, a CTM5 model, etc.) to predict mask patterns, mask optimization and/or optical proximity corrections (e.g., via CTM images) based on defects (e.g., footing, necking, bridging, no contact holes, buckling of a bar, etc.) observed in a patterned substrate, and/or based on manufacturability aspect of the mask with OPC. For example, a defect based model (generally referred as LMC model in the present disclosure) may be trained using methods in FIGS. 14A. The LMC model may be further used to train a machine learning model (e.g., CTM4 model) using different methods as discusses with respect to FIGS. 14B, and another CTM generation process discussed with respect to FIG. 14C. Furthermore, a mask manufacturability based model (generally referred as MRC model in the present disclosure) may be trained using a training method in FIG. 16A. The MRC model may be further used to train a machine learning model (e.g., CTM5 model) discussed with respect to 16B, or another CTM generation process discussed with respect to FIG. 16C. In other words, the above discussed machine learning models (or new machine learning models) may also be configured to predict, for example, mask patterns (e.g., via CTM images) based on LMC models and/or MRC models.

In an embodiment, the manufacturability aspect may refer to manufacturability (i.e., printing or patterning) of the pattern on the substrate via the patterning process (e.g., using the lithographic apparatus) with minimum to no defects. In other words, a machine learning model (e.g., the CTM4 model) may be trained to predict, for example, OPC (e.g., via CTM images) such that the defects on the substrate are reduced, in an embodiment, minimized.

In an embodiment, the manufacturability aspect may refer to ability to manufacture a mask itself (e.g., with OPC). A mask manufacturing process (e.g., using an e-beam writer) may have limitations that restricts fabrication of certain shapes and/or sizes of a pattern on a mask substrate. For example, during the mask optimization process, the OPC may generate a mask pattern having, for example, Manhattan pattern or a curvilinear pattern (the corresponding mask is referred as a curvilinear mask). In an embodiment, the mask pattern having the Manhattan pattern typically includes straight lines (e.g., modified edges of the target pattern) and SRAFs laid around the target pattern in a vertical or horizontal fashion (e.g., OPC corrected mask 1108 in FIG. 11). Such Manhattan patterns may be relatively easier to manufacture compared to a curvilinear pattern of a curvilinear mask.

A curvilinear mask refers to a mask having patterns where the edges of the target pattern are modified during OPC to form curved (e.g., polygon shapes) edges and/or curved SRAFs. Such curvilinear mask may produce more accurate and consistent patterns (compared to Manhattan patterned mask) on the substrate during the patterning process due to a larger process window. However, the curvilinear mask has several manufacturing limitations related to the geometry of the polygons, e.g., radius of curvature, size, curvature of at a corner, etc. that can be fabricated to produce the curvilinear mask. Furthermore, the manufacturing or fabrication process of the curvilinear mask may involve a "Manhattanization" process which may include fracturing or breaking shapes into smaller rectangles and triangles and force fitting the shapes to mimic the curvilinear pattern. Such Manhattanization process may be time intensive, while producing less accurate mask compared to the curvilinear masks. As such, a design-to-mask fabrication time increases, while the accuracy may decrease. Hence, manufacturing limitation of the mask should be considered to improve the accuracy as well as reduce the time from design to manufacture; eventually resulting in an increased yield of patterned substrate during the patterning process.

The machine learning model based method for OPC determination according to the present disclosure (e.g., in FIG. 16B) may address such defect related and mask manufacturability issues. For example, in an embodiment, a machine learning model (e.g., the CTM5 model) may be trained and configured to predict OPC (e.g., via CTM images) using a defect based cost function. In an embodiment, another machine learning model (e.g., the CTM5 model) may be trained and configured to predict OPC (e.g., via CTM images) using a cost function, which is based on a parameter (e.g., EPE) of the patterning process as well as a mask manufacturability (e.g., mask rule check or manufacturing requirements violation probability). A mask rule check is defined as a set of rules or checks based on manufacturability of a mask, such mask rule checks may be evaluated to determine whether a mask pattern (e.g., a curvilinear pattern including OPC) may be manufactured.

In an embodiment, the curvilinear mask may be fabricated without the Manhattanization process, using for example, multi beam mask writer; however, the ability to fabricate the curves or polygon shapes may be limited. As such, such manufacturing restriction or violations thereof need to be accounted for during a mask design process to enable fabrication of accurate masks.

Conventional methods of OPC determination based on physics based process models may further account for defects and/or manufacturing violation probability checks. However, such methods require determination of a gradient which can be computationally time intensive. Furthermore, determining gradients based on defects or mask rule check (MRC) violations may not be feasible, since defect detection and manufacturability violation checks may be in a form of an algorithm (e.g., including if-then-else condition checks), which may not be differentiable. Hence, gradient calculation may not be feasible, as such OPC (e.g., via CTM images) may not be accurately determined.

Figure 11:
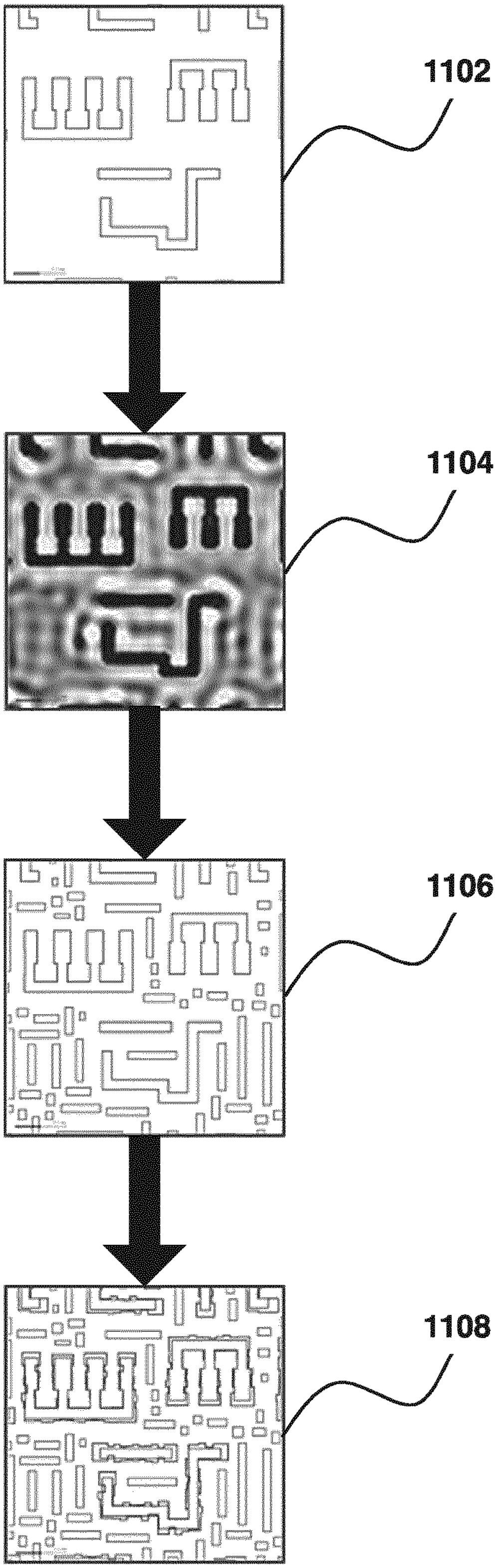
FIG. 11 illustrates a mask image with OPC generated from a target pattern, according to an embodiment.

FIG. 11 illustrates an example OPC process for mask manufacturing from a target pattern, according to an embodiment. The process involves obtaining a target pattern 1102, generating a CTM image 1104 (or a binary image) from the target pattern 1102 for placement of SRAFs around the target pattern 1102, generating a binary image 1106 having SRAFs from the CTM image 1104, and determining corrections to the edges of the target pattern 1102, thereby generating a mask 1108 with OPC (e.g., having SRAFs and Serifs). Further, a conventional mask optimization may be performed which involves complex gradient calculations based on physics based model, as discussed throughout the present disclosure.

In an embodiment, the target pattern 1102 may be a portion of a pattern desired to be printed on a substrate, a plurality of portion of a pattern desired to be printed on a substrate, or an entire pattern to be printed on the substrate. The target pattern 1102 is typically provided by a designer.

In an embodiment, the CTM image 1104 may be generated by a machine learning model trained (e.g., CTM-CNN) according to an embodiment of the present disclosure. For example, based on a fine-tuned process model (discussed earlier), using an EPE based cost function, a defect based cost function, and/or a manufacturability violation based cost function. Each such machine learning model may be different based on the cost function employed to train a machine learning model. The trained machine learning model (e.g., CTM-CNN) may also differ based on additional process models (e.g., etch model, defect model, etc.) included in the process model PM and/or coupled to the process model PM.

In an embodiment, the machine learning model may be configured to generate a mask with OPC such as the final mask 1108 directly from the target image 1102. One or more training methods of the present disclosure may be employed to generate such machine learning models. Accordingly, one or more machine learning models (e.g., CNNs) may be developed or generated, each model (e.g., CNN) configured to predict OPC (or CTM image) in a different manner based on a training process, process models used in the training process, and/or training data used in the training process. The process model may refer to a model of one or more aspect of the patterning process, as discussed throughout the present disclosure.

Figure 12:
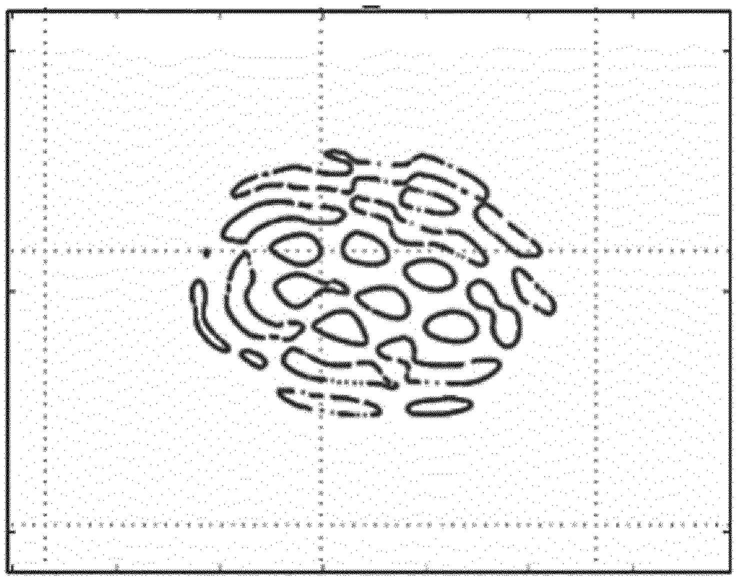
FIG. 12 illustrates a curvilinear mask image with OPC generated from a target pattern, according to an embodiment.

In an embodiment, a CTM+ process, which may considered as an extension of a CTM process, may involve a curvilinear mask function (also known as phi function or level set function) which determines polygon based modifications to a contour of a pattern, thus enabling generation of a curvilinear mask image 1208 as illustrated in FIG. 12, according to an embodiment. A curvilinear mask image includes patterns that have polygonal shape, as opposed to that in Manhattan patterns. Such curvilinear mask may produce more accurate patterns on a substrate compared to the final mask image 1108 (e.g., of a Manhattan pattern), as discussed earlier. In an embodiment, such CTM+ process may be a part of the mask optimization and OPC process. However, the geometry of curvilinear SRAFs, their locations with respect to the target patterns, or other related parameters may create manufacturing restrictions, since such curvilinear shapes may not be feasible to manufacture. Hence, such restrictions may be considered by a designer during the mask design process. A detailed discussion on the limitation and challenges in manufacturing a curvilinear mask are discussed in "*Manufacturing Challenges for Curvilinear Masks*" by Spence, et al., Proceeding of SPIE Volume 10451, Photomask Technology, 1045104 (16 Oct. 2017); doi: 10.1117/12.2280470, herein incorporated by reference.

Figure 13:
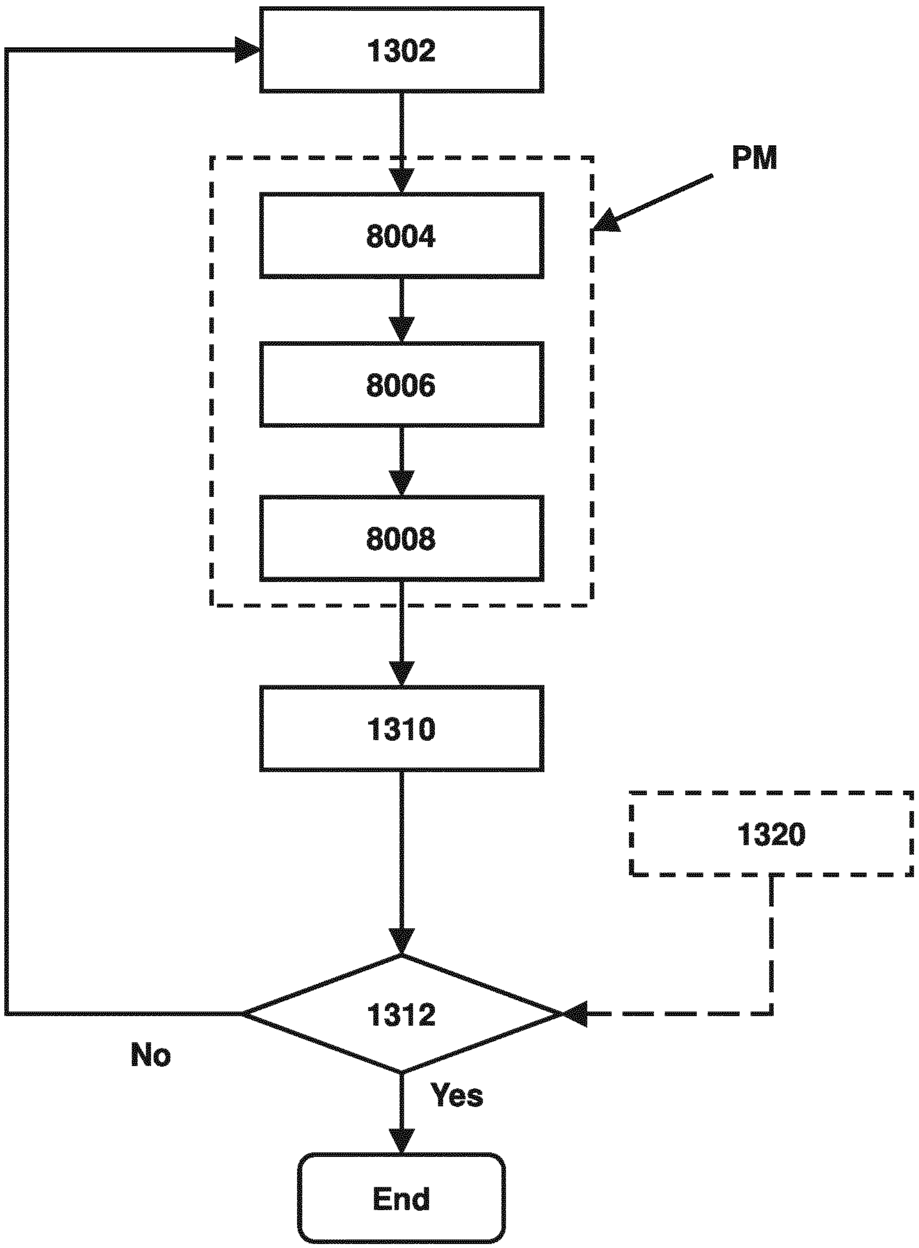
FIG. 13 is a block diagram of a machine learning based architecture of a patterning process, according to an embodiment.

FIG. 13 is a block diagram of a machine learning based architecture of a patterning process for defect based and/or mask manufacturability based training methods, according to an embodiment. The architecture includes a machine learning model 1302 (e.g., CTM-CNN or CTM+ CNN) configured to predict OPC (or CTM/CTM+ images) form a target pattern. The architecture further includes the trained process model PM, which is configured and trained as discussed with respect to FIGS. 8 and 9 earlier. In addition, another trained machine learning model 1310 (e.g., trained using method of FIG. 14A discussed later) configured to predict defects on a substrate may be coupled to the trained process model PM. Further, the defects predicted by the machine learning model may be used as a cost function metric to further train the model 1302 (e.g., training methods of FIGS. 14B and 14C). The trained machine learning model 1310 is referred as a lithographic manufacturability check (LMC) model 1310 for better readability hereinafter, and does not limit the scope of the present disclosure. The LMC model may also be generally interpreted as a manufacturability model associated with a substrate, for example, defects on the substrate.

In an embodiment, another trained machine learning model 1320 (e.g., trained using method of FIG. 16A discussed later) configured to predict MRC violation probability from a curvilinear mask image (e.g., generated by 1302) may be include in the training process. The trained machine learning model 1320 is referred as a MRC model 1320 for better readability hereinafter, and does not limited the scope of the present disclosure. Further, the MRC violation predicted by the machine learning model 1320 may be used as a cost function metric to further train the model 1302 (e.g., training methods of FIGS. 16B and 16C). In an embodiment, the MRC model 1320 may not be coupled to the process model PM, but predictions of the MRC model 1320 may be used to supplement a cost function (e.g., cost function 1312). For example, the cost function may include two condition checks including (i) EPE based and (ii) number of MRC violations (or MRC violation probability). The cost function may then be used to compute the gradient map to modify the weights of the CTM+ CNN model to reduce (in an embodiment, minimize) the cost function. Accordingly, training the CTM+ CNN model enables to overcome several of the challenges including providing a model that is easier to take derivative and compute gradients or gradient map used to optimize the CTM+ CNN images generated by the CTM+ CNN model.

In an embodiment, the machine learning architecture of FIG. 13 may be broadly divided into two parts: (i) training of a machine learning model (e.g., 1302 such as CTM4 model in FIG. 14B) using the trained process model PM (discussed earlier), the LMC model 1310 and a defect based cost function and/or other cost functions (e.g., EPE), and (ii) training of another machine learning model (e.g., 1302' such as CTM5 model in FIG. 16B) using the trained process model PM (discussed earlier), the trained MRC model 1320 and a MRC based cost function and/or other cost functions (e.g., EPE). In an embodiment, a machine learning model configured to predict CTM image may be trained using both the LMC model 1310 and MRC model 1320 simultaneously along with the respective cost functions. In an embodiment, each of the LMC model and the MRC models may be further used to train different machine learning model (e.g., CTM4 and CTM5 models) in conjunction with non-machine learning process models (e.g., physics based models).

Figure 14A:
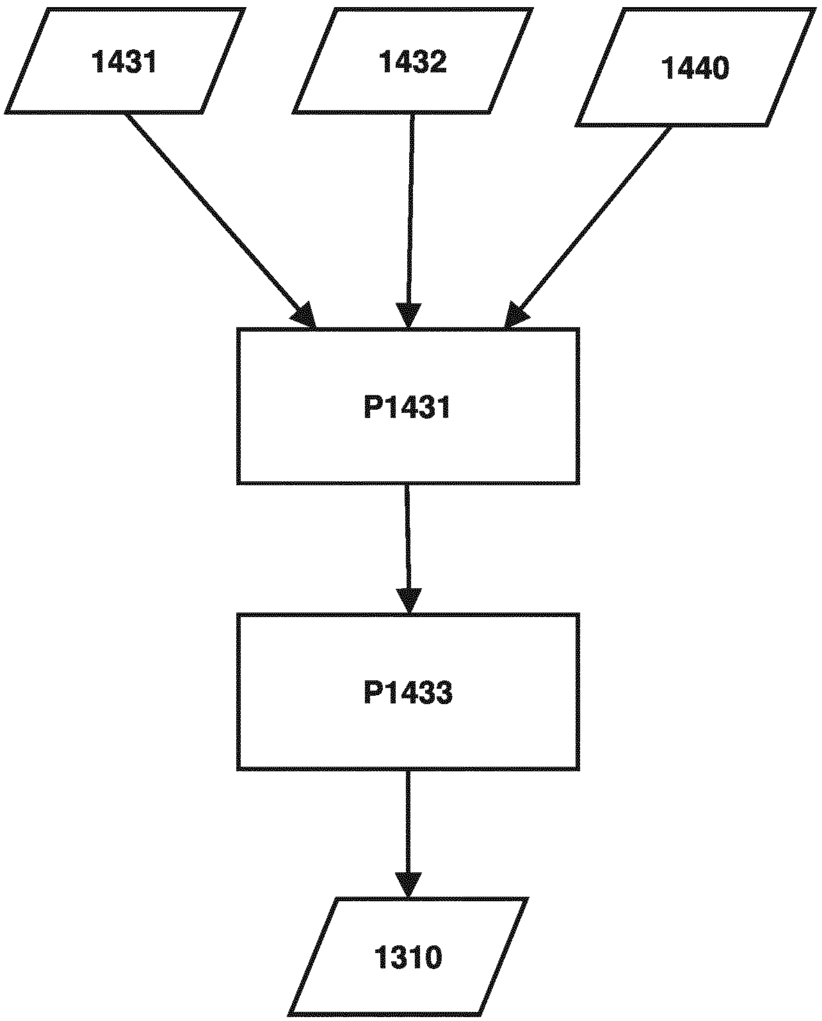
FIG. 14A schematically shows a flow chart of a method for training a machine learning model configured to predict defect data, according to an embodiment.

FIG. 14A is a flow chart for training a machine learning model 1440 (e.g., LMC model) configured to predict defects (e.g., type of defects, number of defects, or other defect related metric) within an input image, for example, a resist image obtained from simulation of a process model (e.g., PM). The training is based on training data including (i) defect data or a truth defect metric (e.g., obtained from printed substrate), (ii) a resist image corresponding to a target pattern, and (iii) a target pattern (optional), and a defect based cost function. For example, the target pattern may be used in case, where resist contour may be compared with the target, for example, depending on the defect type and/or detectors (e.g., a CD variation detector) used to detect a defect. The defect data may include a set of defects on a printed substrate. At the end of the training, the machine learning model 1440 evolves into the trained machine learning model 1310 (i.e., LMC model 1310).

Figure 15A:
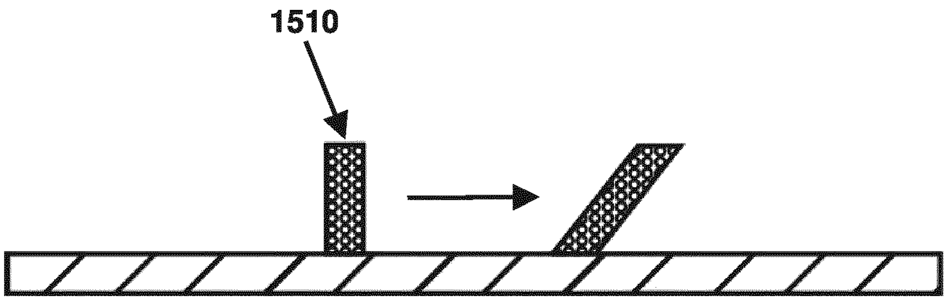
FIGS. 15A, 15B, and 15C illustrate example defects on a substrate, according to an embodiment.
Figure 15B:
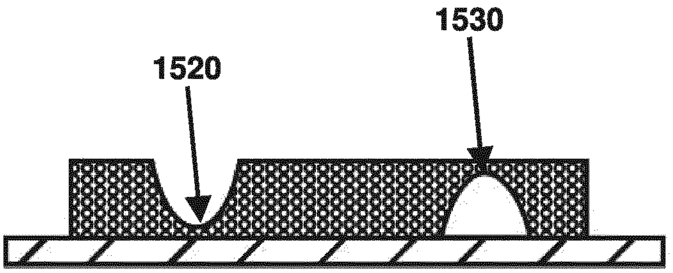
Figure 15C:
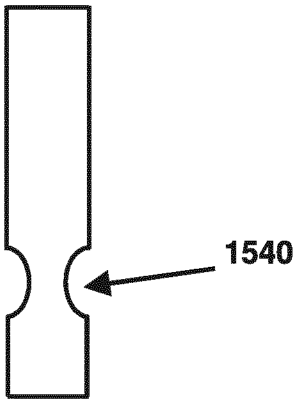

The training method, in process P1431, involves obtaining training data including the defect data 1432, a resist image 1431 (or etch image), and optionally a target pattern 1433. The defect data 1432 may include different types of defect that may be observed on a printed substrate. For example, FIGS. 15A, 15B, and 15C illustrate defects such as buckling of a bar 1510, footing 1520, bridging 1530, and necking 1540. Such defects may be determined, for example, using simulation (e.g., via Tachyon LMC product), using experimental data (e.g., printed substrate data), SEM images or other defect detection tools. Typically, SEM images may be input to a defect detection algorithm which is configured to identify different types of defect that may be observed in a pattern printed on a substrate (also referred as a patterned substrate). The defect detection algorithm may include several if-then-else conditions or other appropriate syntax with defect conditions encoded within the syntax that are checked/evaluated when the algorithm is executed (e.g., by a processor, hardware computer system, etc.). When one or more such defect condition is evaluated to be true, then a defect may be detected. The defect conditions may be based on one or more parameters (e.g., CD, overlay, etc.) related to the substrate of the patterning process. For example, a necking (e.g., see 1540 in FIG. 15C) may be said to be detected along a length of a bar where the CD (e.g., 10 nm) is less than 50% of the total CD or desired CD (e.g., 25 nm). Similarly, other geometric properties or other appropriate defect related parameters may be evaluated. Such conventional algorithms may not be differentiable, as such may not be used within a gradient based mask optimization process. According to the present disclosure, the trained LMC model 1310 (e.g., LMC-CNN) may provide a model for which derivatives may be determined, hence enabling OPC optimization or mask optimization process based on defects.

In an embodiment, the training data may comprise a target pattern (e.g., 1102 in FIG. 11), a corresponding resist image 1431 (or etch image or contours thereof) having defects, and defect data (e.g., pixelated images of one or more patterned substrates with defects). In an embodiment, for a given resist image and/or target pattern, the defect data can have different formats: 1) defect numbers in the resist image, 2) binary variable i.e., defect free or not (yes or no), 3) a defect probability, 4) a defect size, 5) a defect type, etc. The defect data may include different types of defects occurring on a patterned substrate subjected to the patterning process. For example, the defects may be a necking defect (e.g. 1540 in FIG. 15C), a footing defect (e.g. 1520 in FIG. 15B), a bridging defect (e.g. 1530 in FIG. 15B), and a buckling defect (e.g. 1510 in FIG. 15A). The necking defect refers to a reduced CD (e.g., less than 50% the desired CD) at one or more locations along a length of a feature (e.g., a bar) compared to a desired CD of the feature. The footing defect (e.g., see 1520 FIG. 15B) may refer to blocking, by the resist layer, a bottom (i.e., at the substrate) of a cavity or a contact hole where a through cavity or a contact hole should be present. The bridging defect (e.g., see 1530 in FIG. 15B) may refer to blocking of a top surface of a cavity or a contact hole, thus preventing a through cavity or contact hole being formed from top of the resist layer to a substrate. A buckling defect may refer to buckling, for example, of a bar (e.g., see 1510 of FIG. 15A) in the resist layer due to, for example, relatively greater height with respect to the width. In an embodiment, the bar 1510 may buckle due to weight of another patterned layer formed on top of the bar.

Furthermore, in process P1433, the method involves training the machine learning model 1440 based on the training data (e.g., 1431 and 1432). Further, the training data may be used for modifying weights (or bias or other relevant parameters) of the model 1440 based on a defect based cost function. The cost function may be a defect metric (e.g., defect free or not, defect probability, defect size, and other defect related metric). For each defect metric, a different types of cost function may be defined, for example, if for defect size, the cost function can be a function of difference between the predicted defect size and a true defect size. During the training, the cost function may be iteratively reduced (in an embodiment, minimized). In an embodiment, the trained LMC model 1310 may predict a defect metric defined as, for example, a defect size, number of defects, a binary variable indicate defect free or not, a defect type, and/or other appropriate defect related metric. During the training, the metric may be computed and monitored until most defects (in an embodiment, all the defects) within the defect data may be predicted by the model 1440. In an embodiment, computation of the metric of the cost function may involve segmentation of the images (e.g., resist or etch images) to identify different features and identifying defects (or defect probability) based on such segmented images. Thus, the LMC model 1310 may establish a relationship between a target pattern and defects (or defect probability). Such LMC model 1310 may now be coupled to the trained process model PM and further used to train the model 1302 to predict OPC (e.g. including CTM images). In an embodiment, gradient-method may be used to during the training process to adjust the parameters of the model 1440. In such gradient-method, the gradient (e.g., dcost/dvar) may be computed with respect to variables to optimize, for example, the variables are parameters of the LMC model 1310.

At the end of the training process, the trained LMC model 1310 may be obtained that may predict defects based on the resist image (or etch image) obtained from, for example, simulation of process model (e.g., PM).

Figure 14B:
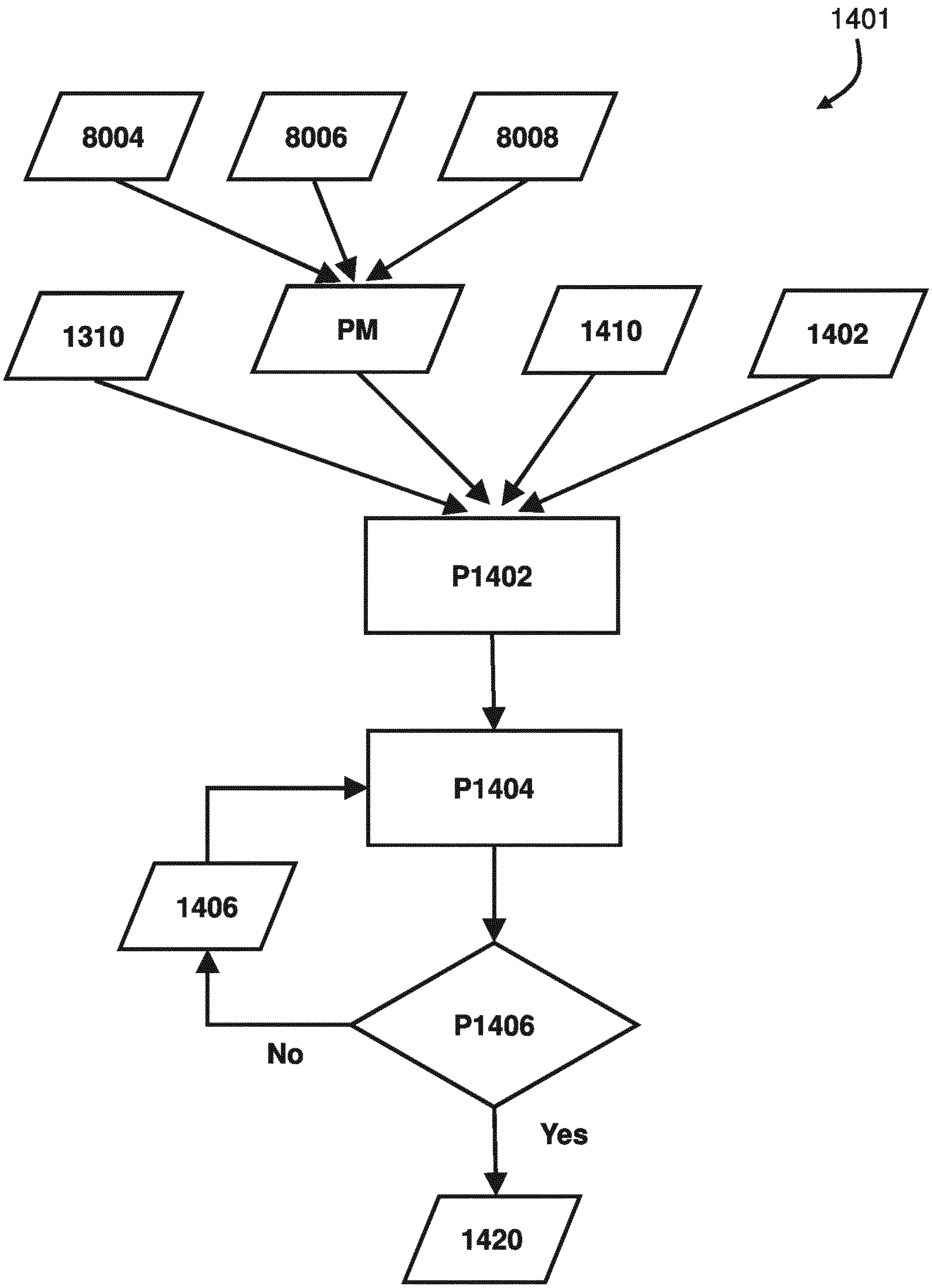
FIG. 14B schematically shows a flow chart of a method for training a machine learning model configured to predict a mask pattern based on predicted defects on a substrate, according to an embodiment.

FIG. 14B schematically shows a flow chart of a method 1401 for training a machine learning model 1410 configured to predict mask patterns (e.g., including OPC or CTM images) based on defects on a substrate subjected to a patterning process, according to an embodiment. In an embodiment, the OPC prediction may involve generation of CTM images. The machine learning model 1410 may be a convolutional neural network (CNN) configured to predict a continuous transmission mask (CTM) and corresponding CNN may be referred as CTM-CNN. The model 1410 is referred as the CTM-CNN 1410 as an example model to clearly explain the training process and does not limit the scope of the present disclosure. The training method, also partly discussed earlier with respect to FIG. 13, is further elaborated below. According to the training method 1401, the CTM-CNN 1410 may be trained to determine a mask pattern corresponding to the target pattern such that the mask pattern includes structures (e.g., SRAFs) around the target pattern and modifications to the edges of the target pattern (e.g., Serifs) so that when such mask is used in the patterning process, the patterning process eventually produces a target pattern on the substrate.

The training method 1401 involves, in a process P1402, obtaining (i) a trained process model PM (e.g., trained process model PM generated by method 900 discussed above) of the patterning process configured to predict a pattern on a substrate, (ii) a trained LMC model 1310 configured to predict defect on a substrate subjected to the patterning process, and (iii) a target pattern 1402 (e.g., the target pattern 1102).

In an embodiment, the trained process model PM may include one or more trained machine learning models (e.g., 8004, 8006, and 8008, as discussed with respect to FIGS. 8 and 9. For example, the first trained model (e.g., model 8004) may be configured to predict a mask diffraction of the patterning process. The second trained model (e.g., model 8006) coupled to the first trained model (e.g., 8004) and configured to predict an optical behavior of an apparatus used in the patterning process. The third trained model (e.g., model 8008) coupled to the second trained model 8006 and configured to predict a resist process of the patterning process.

The training method, in process P1404, involves training the CTM-CNN 1410 configured to predict CTM image and/or further predict OPC based on the trained process model. In a first iteration or a first pass of the training method, an initial or untrained CTM-CNN 1410 may predict a CTM image from the target pattern 1402. Since, the CTM-CNN 1410 may be untrained, the predictions may potentially be non-optimal resulting in a relatively high error (e.g., in terms of EPE, overlay, number of defects, etc.) with respect to the target pattern 1402 desired to be printed on the substrate. However, progressively the error will reduce, in an embodiment, be minimized after several iterations of the training process of the CTM-CNN 1410. The CTM image is then received by the process model PM (the internal working of PM is discussed earlier with respect to FIGS. 8 and 9), which may predict a resist image or an etch image. Furthermore, contours of the pattern in the predicted resist image or the etch image may be derived that are further used to determine a parameter of the patterning process and a corresponding cost function (e.g., EPE) may be evaluated.

The prediction of the process model PM may be received by the trained LMC model 1310, which is configured to predict defects within the resist (or etch) image. As indicated earlier, in the first iteration, the initial CTM predicted by the CTM-CNN may be non-optimal or inaccurate, hence the resulting pattern on the resist image may be different from the target pattern. The difference (e.g., measured in terms of EPE or number of defects) between the predicted pattern and the target pattern will be high compared to a difference after several iterations of training of the CTM-CNN. After several iterations of the training process, the CTM-CNN 1410 may generate a mask pattern which will produce reduced number of defects on the substrate subjected to the patterning process, thus achieving a desired yield rate corresponding to the target pattern.

Furthermore, the training method, in process P1404, may involve a cost function that determines a difference between the predicted pattern and the target pattern. The training of the CTM-CNN 1410 involves iteratively modifying weights of the CTM-CNN 1410 based on a gradient map 1406 such that the cost function is reduced, in an embodiment, minimized. In an embodiment, the cost function may be number of defects on a substrate or an edge placement error between the target pattern and the predicted pattern. In an embodiment, the number of defects may be total number of defects (e.g., sum total of necking defects, footing defects, buckling defects, etc.) predicted by the trained LMC model 1310. In an embodiment, the number of defects may be a set of individual defects (e.g., a set containing footing defects, necking defects, buckling defects, etc.) and the training method may be configured to reduce (in an embodiment, minimize) one or more of the individual set of defect (e.g., minimize only footing defects)

Upon several iterations of the training process, a trained CTM-CNN 1420 (which is an example of the model 1302 discussed earlier) is said to be generated which is configured to predict the CTM image directly from a target pattern 1402 to be printed on the substrate. Furthermore, the trained model 1420 may be configured to predict OPC. In an embodiment, the OPC may include placement of assist features and/or Serifs based on the CTM image. The OPC may be in the form of images and the training may be based on the images or pixel data of the images.

In process P1406, a determination may be made whether the cost function is reduced, in an embodiment, minimized. A minimized cost function indicates that the training process has converged. In other words, additional training using one or more target pattern does not result in further improvements in the predicted pattern. If the cost function is, for example, minimized, then the machine learning model 1420 is considered trained. In an embodiment, the training may be stopped after a predetermined number of iterations (e.g., 50,000 or 100,000 iterations). Such trained model 1420 has unique weights that enable the trained model 1420 (e.g., CTM-CNN) to predict mask pattern that will generate minimum defects on the substrate when subjected to the patterning process, as mentioned earlier.

In an embodiment, if the cost function is not minimized a gradient map 1406 may be generated in the process P1406. In an embodiment, the gradient map 1406 may be representation of a partial derivative of the cost function (e.g., EPE, number of defects) with respect to the weights of the CTM-CNN 1410. The partial derivative may be determined during a back propagation through different layers of the LMC CNN model 1310, the process model PM, and/or the CTM-CNN 1410, in that order. As the models 1310, PM and 1410 are based on CNNs, the partial derivative computation during back propagation may involve taking inverse of the functions representing the different layers of the CNN with respect to the respective weights of the layer, which is easier to compute compared to that involving inverse of physics based functions, as mentioned earlier. The gradient map 1406 may then provide a guidance for how to modify the weights of the model 1410, so that the cost function is reduced or minimized. After several iterations, when the cost function is minimized or converged, the model 1410 is considered as the trained model 1420.

In an embodiment, the trained model 1420 (which is an example of the model 1302 discussed earlier) may be obtained and further used to determine optical proximity corrections directly for a target pattern. Further, a mask may be manufactured including the structures (e.g., SRAFs, Serifs) corresponding to the OPC. Such mask based on the predictions from the machine learning model may be highly accurate, at least in terms of the number of defects on a substrate (or yield), since the OPC accounts for several aspects of the patterning process via trained models such as 8004, 8006, 8008, 1302, and 1310. In other words, the mask when used during the patterning process will generate desired patterns on the substrate with minimum defects.

In an embodiment, the cost function 1406 may include one or more conditions that may be simultaneously reduced (in an embodiment, minimized). For example, in addition to the number of defects, EPE, overlay, CD or other parameter may be included. Accordingly, one or more gradient map may be generated based such cost function and the weights of the CTM-CNN may be modified based on such gradient map. Thus, the resulting pattern on the substrate will not only produce high yield (e.g., minimum defects) but also have high accuracy in terms of, for example, EPE or overlay.

Figure 14C:
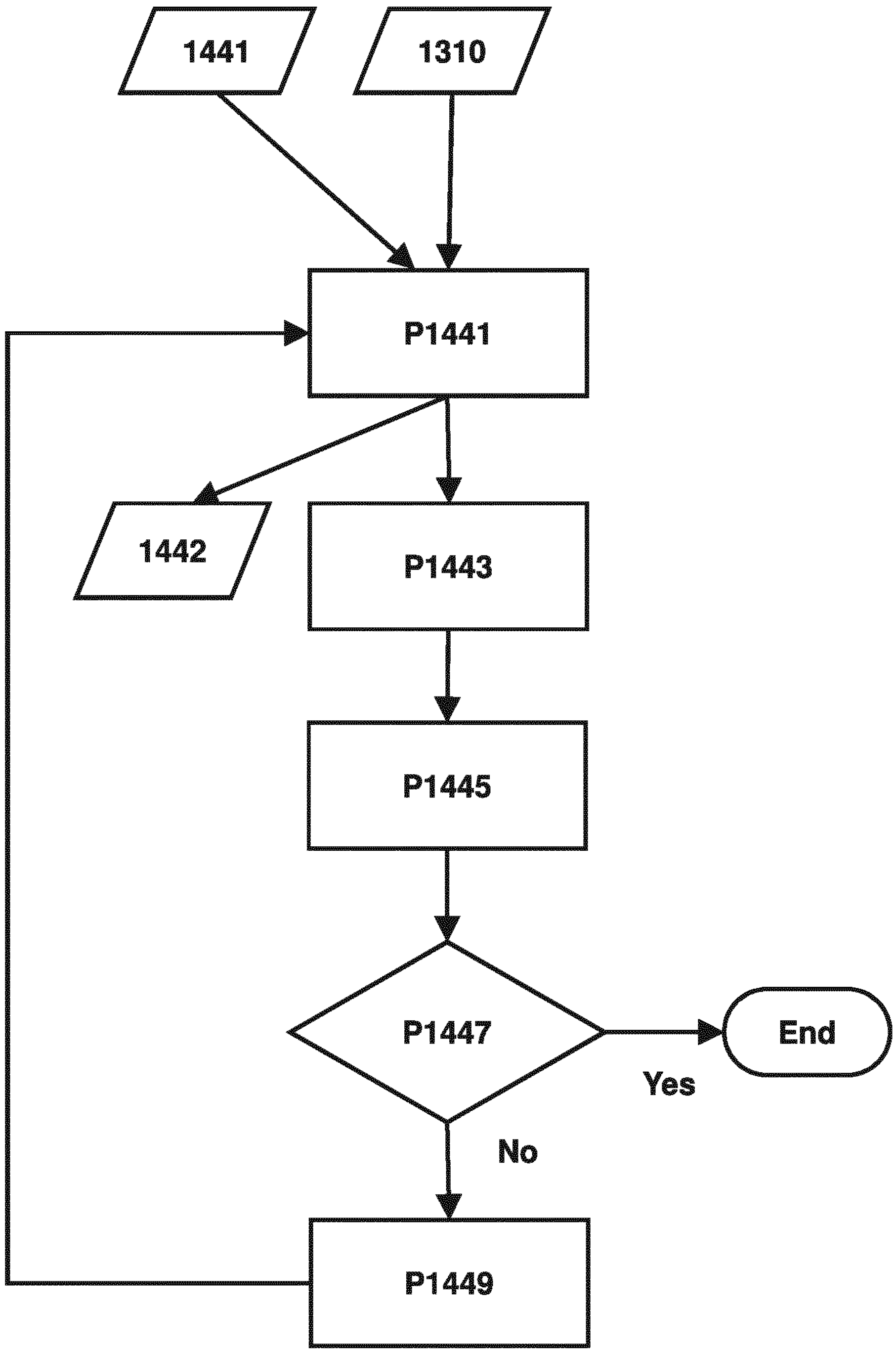
FIG. 14C schematically shows a flow chart of another method for training a machine learning model configured to predict a mask pattern based on predicted defects on a substrate, according to an embodiment.

FIG. 14C is flow chart of another method for predicting OPC (or CTM/CTM+ images) based on the LMC model 1310. The method is an iterative process, where a model (which may be a machine learning model or a non-machine learning model) is configured to generate the CTM images (or CTM+ images) based on the defect related cost function predicted by the LMC model 1310. The inputs to the method may be an initial image 1441 (e.g., a target pattern or mask image i.e., a rendering of the target pattern), which is used to generate an optimized CTM image or OPC patterns.

The method involves, in process P1441, involves generating a CTM image 1442 based on the initial image (e.g., a binary mask image or an initial CTM image). In an embodiment, the CTM image 1441 may be generated, for example via simulation of a mask model (e.g., a mask layout model, a thin-mask, and/or a M3D model discussed above).

Further, in process P1443, the process model may receive the CTM image 1442 and predict a process image (e.g., a resist image). As discussed earlier, the process model may be a combination of an optics model, a resist model and/or a etch model. In an embodiment, the process model may be non-machine learning models (e.g., physics based models).

Further, in process P1445, the process image (e.g., the resist image) may be passed to the LMC model 1310 to predict defects within the process image (e.g., the resist image). Further, the process P1445 may be configured to evaluate a cost function based on the defects predicted by the LMC model. For example, the cost function may be a defect metric defined as a defect size, number of defects, a binary variable indicate defect free or not, a defect type, or other appropriate defect related metric.

In process P1447, a determination may be made whether the cost function is reduced (in an embodiment, minimized). In an embodiment, if the cost function is not minimized, the value of the cost function may be gradually reduced (in an iterative manner) by using a gradient-based method (similar to that used throughout the disclosure).

For example, in process, P1449, a gradient map may be generated based on the cost function which is further used to determine values to the mask variables corresponding to the initial image (e.g., pixel values of the mask image) such that the cost function is reduced.

Upon several iteration, the cost function may be minimized, and the CTM image (e.g., a modified version of the CTM image 1442 or 1441) generated by the process P1441 may be considered as an optimized CTM image. Further, masks may be manufactured using such optimized CTM images may exhibit reduced defects.

Figure 16A:
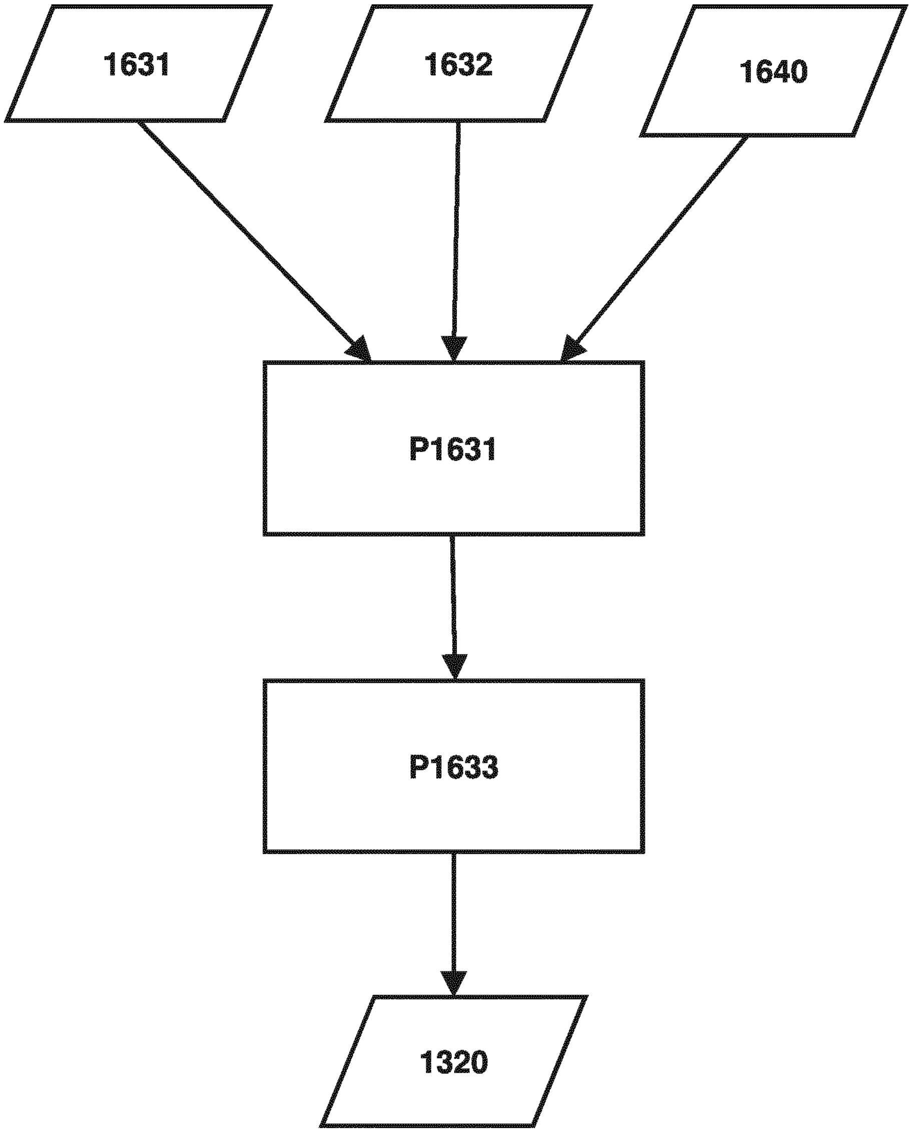
FIG. 16A schematically shows a flow chart of a method for training a machine learning model configured to predict mask manufacturability of a mask pattern used in a patterning process, according to an embodiment.

FIG. 16A is a flow chart of a method for training a machine learning model 1640 configured to predict (from a curvilinear mask image) a probability of violation of mask manufacturing limitation, also referred as mask rule check. In an embodiment, the training may be based on training data including an input image 1631 (e.g. a curvilinear mask), MRC 1632 (e.g., a set of mask rule checks), and a cost function based on the MRC violation probability. At the end of the training, the machine learning model 1640 evolves into the trained machine learning model 1320 (i.e., MRC model 1320). The probability of violation may be determined based on total number of violations for a particular feature of the mask pattern with respect to total violations.

The training method, in process P1631, involves obtaining training data including the MRC 1632 (e.g., MRC violation probability, number of MRC violations, etc.) and a mask image 1631 (e.g., a mask image having curvilinear pattern). In an embodiment, a curvilinear mask image may generated via simulation of a CTM+ process (discussed earlier).

Furthermore, in process P1633, the method involves training the machine learning model 1640 based on the training data (e.g., 1631 and 1632). Further, the training data may be used for modifying weights (or bias or other relevant parameters) of the model 1640 based on a defect based cost function. The cost function may be a MRC metric such as number of MRC violations, a binary variable indicating a MRC violation or no MRC violation, a MRC violation probability, or other appropriate MRC related metric. During the training, the MRC metric may be computed and monitored until most MRC violations (in an embodiment, all MRC violations) may be predicted by the model 1640. In an embodiment, computation of the metric of the cost function may involve evaluation of MRC 1632 for the image 1631 to identify different features with MRC violations.

In an embodiment, a gradient-method may be used to during the training process to adjust the parameters of the model 1640. In such gradient-method, the gradient (dcost/dvar) may be computed with respect to the variable to be optimized, for example, parameters of the MRC model 1320. Thus, the MRC model 1320 may establish a relationship between a curvilinear mask image and MRC violations or MRC violation probability. Such MRC model 1320 may now be used to train the model 1302 to predict OPC (e.g. including CTM images). At the end of the training process, the trained MRC model 1320 may be obtained that may predict MRC violations based on, for example, a curvilinear mask image.

Figure 16B:
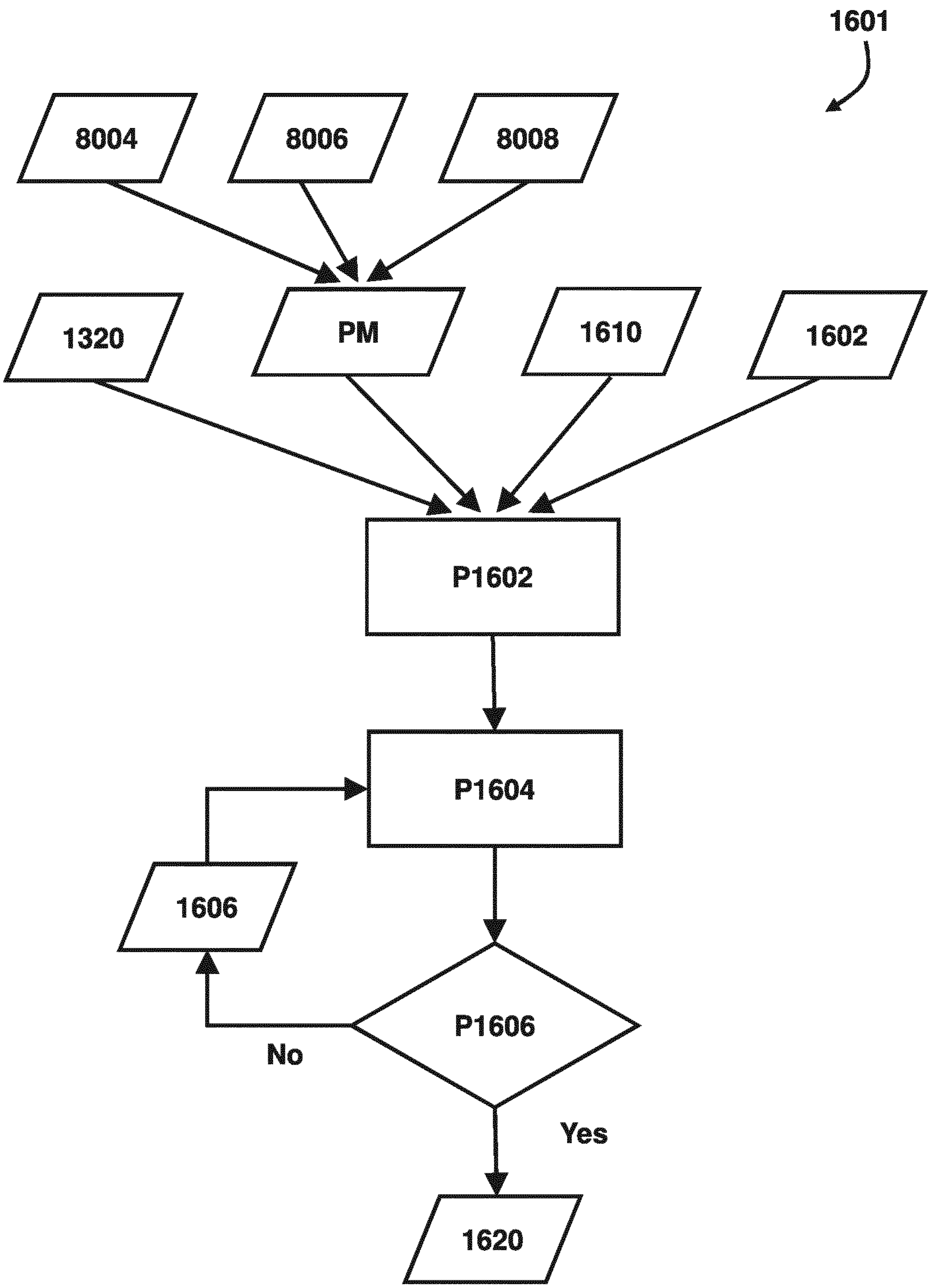
FIG. 16B schematically shows a flow chart of another method for training a machine learning model configured to predict mask pattern based on mask manufacturability, according to an embodiment.

FIG. 16B schematically shows a flow chart of a method 1601 for training a machine learning model 1610 configured to predict OPC based on manufacturability of a curvilinear mask used in a patterning process, according to an embodiment. However, present disclosure is not limited to curvilinear mask and the method 1601 may also be adopted for a Manhattan type of mask. The machine learning model 1610 may be a convolutional neural network (CNN) configured to predict the curvilinear mask image. As discussed earlier, in an embodiment, the CTM+ process (an extension of CTM process) may be used to generate curvilinear mask image. Accordingly, the machine learning model 1610, is referred as CTM+ CNN model 1610, as an example, and does not limit the scope of the present disclosure. Furthermore, the training method, also partly discussed earlier with respect to FIG. 13, is further elaborated below.

According to the training method 1601, the CTM+ CNN 1610 is trained to determine a curvilinear mask pattern corresponding to the target pattern such that the curvilinear mask pattern includes curvilinear structures (e.g., SRAFs) around the target pattern and polygonal modifications to the edges of the target pattern (e.g., Serifs) so that when the mask is used in the patterning process, the patterning process eventually produces a target pattern on the substrate more accurately compared to that produced by the Manhattan pattern of a mask.

The training method 1601 involves, in a process P1602, obtaining (i) a trained process model PM (e.g., trained process model PM generated by method 900 discussed above) of the patterning process configured to predict a pattern on a substrate, (ii) a trained MRC model 1320 configured to predict manufacturing violation probability (as discussed earlier with respect to FIG. 13), and (iii) a target pattern 1602 (e.g., the target pattern 1102). As mentioned earlier with respect to FIGS. 8 and 9, the trained process model PM may include one or more trained machine learning models (e.g., 8004, 8006, and 8008).

The training method, in process P1604, involves training the CTM+ CNN 1610 configured to predict a curvilinear mask image based on the trained process model. In a first iteration or a first pass of the training method, an initial or untrained CTM+ CNN 1610 may predict a curvilinear mask image from a CTM image corresponding to the target pattern 1602. Since, the CTM+ CNN 1610 may be untrained, the predicted curvilinear mask image may potentially be non-optimal resulting in a relatively high error (e.g., in terms of EPE, overlay, manufacturing violations, etc.) with respect to the target pattern 1602 desired to be printed on the substrate. However, progressively the error will reduce, in an embodiment, be minimized after several iterations of the training process of the CTM+ CNN 1610. The predicted curvilinear mask image is then received by the process model PM (the internal working of PM is discussed earlier with respect to FIGS. 8 and 9), which may predict a resist image or an etch image. Furthermore, contours of the pattern in the predicted resist image or the etch image may be derived to determined parameter (e.g., EPE, overlay, etc.) of the patterning process. The contours may be further used to evaluate the cost function to be reduced.

The curvilinear mask image generate by the CTM+ CNN model may also be passed to the MRC model 1320 to determine probability of violation of manufacturing restrictions/limitations (also referred as MRC violation probability). The MRC violation probability may be a part of the cost function, in addition to the existing EPE based cost function. In other words, the cost function may include at least two conditions i.e., EPE-based (as discussed throughout the present disclosure) and MRC violation probability based.

Furthermore, the training method, in process P1606, may involve determining whether the cost function is reduced, in an embodiment, minimized. If the cost function is not reduced (or minimized), the training of the CTM+ CNN 1610 involves iteratively modifying weights (in process 1604) of the CTM+ CNN 1610 based on a gradient map 1606 such that the cost function is reduced, in an embodiment, minimized. In an embodiment, the cost function may be MRC violation probability predicted by the trained MRC model 1320. Accordingly, the gradient map 1606 may provide guidance to simultaneously reduce the MRC violation probability and the EPE.

In an embodiment, if the cost function is not minimized, a gradient map 1606 may be generated in the process P1606. In an embodiment, the gradient map 1606 may be representation of a partial derivative of the cost function (e.g., EPE and MRC violation probability) with respect to the weights of the CTM+ CNN 1610. The partial derivative may be determined during a back propagation through the MRC model 1320, the process model PM, and/or the CTM+ CNN 1610, in that order. As the models 1320, PM and 1610 are based on CNNs, the partial derivative computation during back propagation may involve taking inverse of the functions representing the different layers of the CNN with respect to the respective weights of the layer, which is easier to compute compared to that involving inverse of physics based functions, as mentioned earlier. The gradient map 1606 may then provide guidance for how to modify the weights of the model 1610, so that the cost function is reduced or minimized. After several iterations, when the cost function is minimized or converges, the model 1610 is considered as the trained model 1620.

Upon several iterations of the training process, the trained CTM+ CNN 1620 (which is an example of the model 1302 discussed earlier) is said to be generated and may be ready to predict the curvilinear mask image directly from a target pattern 1602 to be printed on the substrate.

In an embodiment, the training may be stopped after a predetermined number of iterations (e.g., 50,000 or 100,000 iterations). Such trained model 1620 has unique weights that enable the trained model 1620 to predict curvilinear mask pattern that will satisfies the manufacturing limitations of the curvilinear mask fabrication (e.g., via a multi beam mask writer).

In an embodiment, the trained model 1620 (which is an example of the model 1302 discussed earlier) may be obtained and further used to determine optical proximity corrections directly for a target pattern. Further, a mask may be manufactured including the structures (e.g., SRAFs, Serifs) corresponding to the OPC. Such mask based on the predictions from the machine learning model may be highly accurate, at least in terms of the manufacturability of the curvilinear mask (or yield), since the OPC accounts for several aspects of the patterning process via trained models such as 8004, 8006, 8008, 1602, and 1310. In other words, the mask when used during the patterning process will generate desired patterns on the substrate with minimum defects.

In an embodiment, the cost function 1606 may include one or more conditions that may be simultaneously reduced, in an embodiment, minimized. For example, in addition to the MRC violation probability, the number of defects, EPE, overlay, difference in CD (i.e., ΔCD) or other parameter may be included and all the conditions may be simultaneously reduced (or minimized). Accordingly, one or more gradient map may be generated based such cost function and the weights of the CNN may be modified based on such gradient map. Thus, the resulting pattern on the substrate will not only produce a manufacturable curvilinear mask with high yield (i.e., minimum defects) but also have high accuracy in terms of, for example, EPE or overlay.

Figure 16C:
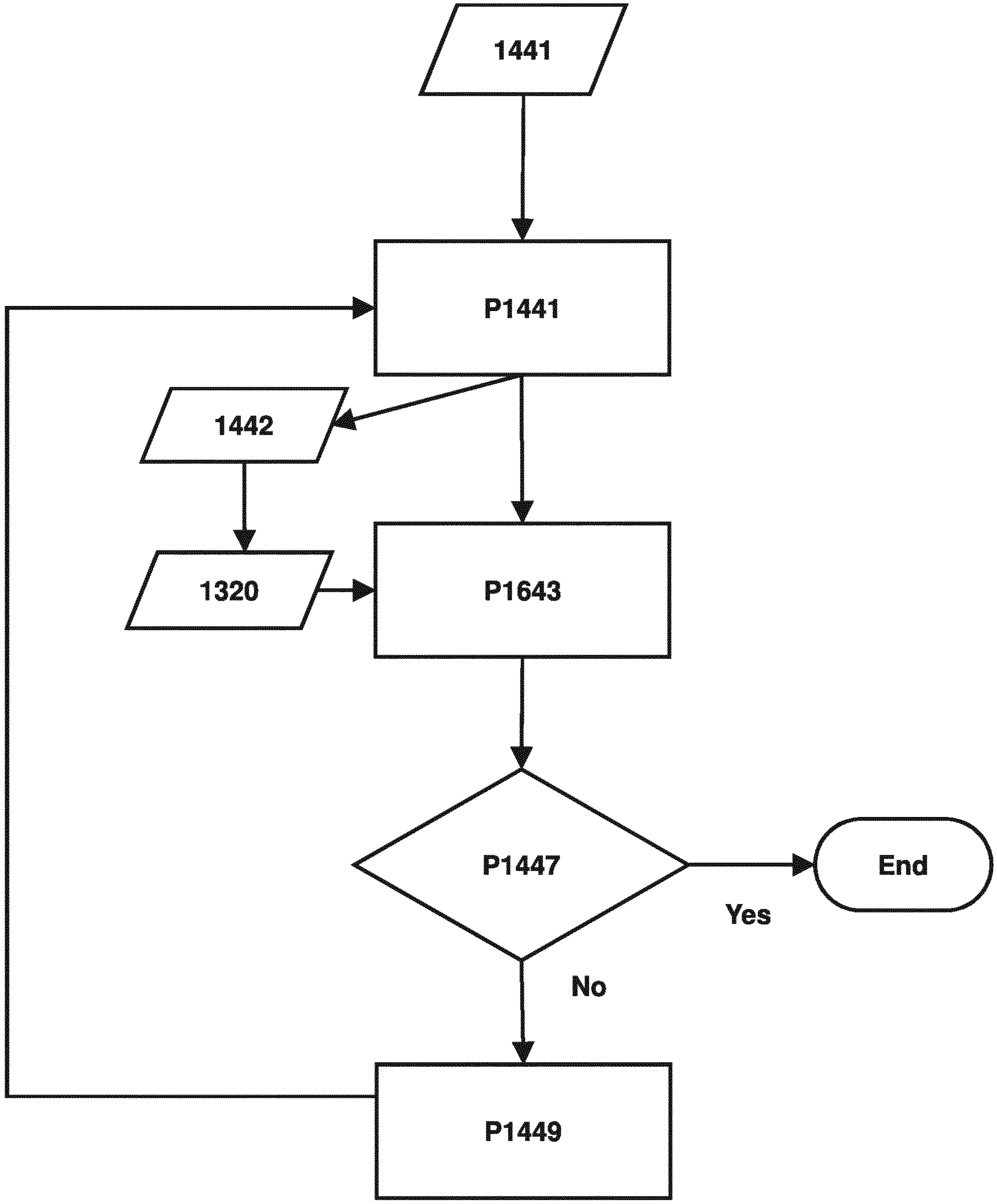
FIG. 16C schematically shows a flow chart of another method for training a machine learning model configured to predict mask pattern based on mask manufacturability, according to an embodiment.

FIG. 16C is flow chart of another method for predicting OPC (or CTM/CTM+ images) based on the MRC model 1320. The method is an iterative process, where a model (which may be a machine learning model or a non-machine learning model) is configured to generate the CTM images (or CTM+ images) based on the MRC related cost function predicted by the MRC model 1320. Similar to the method of FIG. 14C, the inputs to the method may be an initial image 1441 (e.g., a target pattern or mask image i.e., a rendering of the target pattern), which is generate an optimized CTM image (or CTM+ images) or OPC patterns.

The method involves, in process P1441 (as discussed above), generating a CTM image 1442 (or CTM+images) based on the initial image (e.g., a binary mask image or an initial CTM image). In an embodiment, the CTM image 1441 may be generated, for example via simulation of a mask model (e.g., thin-mask or M3D model discussed above). In an embodiment, a CTM+image may be generated from an optimized CTM image based on, for example, level-set function.

Further, in process P1643, the process model may receive the CTM image (or CTM+ image) 1442 and predict a process image (e.g., a resist image). As discussed earlier, the process model may be a combination of an optics model, a resist model and/or a etch model. In an embodiment, the process model may be non-machine learning models (e.g., physics based models). The process image (e.g., the resist image) may be used to determine a cost function (e.g., EPE).

In addition, the CTM image 1442 may also be passed to the MRC model 1320 to determine MRC metric such as a violation probability. Furthermore, the process P1643 may be configured to evaluate a cost function based on the MRC violation probability predicted by the MRC model. For example, the cost function may be defined as a function of EPE and/or MRC violation probability. In an embodiment, if the output of the MRC model 1320 is a violation probability, then the cost function can be an averaged value of a difference between the predicted probability of violation and a corresponding truth value (e.g., the difference can be (predicted MRC probability-truth violation probability)$^2$) for all training samples.

In process P1447, a determination may be made whether the cost function is reduced (in an embodiment, minimized). In an embodiment, if the cost function is not minimized, the value of the cost function may be gradually reduced (in an iterative manner) by using a gradient-based method (similar to that used throughout the disclosure).

For example, in process, P1449, a gradient map may be generated based on the cost function which is further used to determine values to the mask variables corresponding to the initial image (e.g., pixel values of the mask image) such that the cost function is reduced.

Upon several iteration, the cost function may be minimized, and the CTM image (e.g., a modified version of the CTM image 1442 or 1441) generated by the process P1441 may be considered as an optimized CTM image that is also manufacturable.

In an embodiment, the method of FIG. 16C may also include the process P1445 that determines a defect predicted by the LMC model 1310, as discussed earlier. Accordingly, the cost function and the gradient computation may be modified to consider multiple conditions includes defect-based metric, MRC based metric, and EPE.

In an embodiment, the OPC determined using the above methods include structural features such as SRAFs, Serifs, etc. which may be Manhattan type or curvilinear shaped. The mask writer (e.g., e-beam or multi beam mask writer) may receive the OPC related information and further fabricate the mask.

Furthermore, in an embodiment, the predicted mask pattern from different machine learning model discussed above may be further comprising optimized. The optimizing of the predicted mask pattern may involve iteratively modifying mask variables of the predicted mask pattern. Each iteration involves predicting, via simulation of a physics based mask model, a mask transmission image based on the predicted mask pattern, predicting, via simulation of a physics based resist model, a resist image based on the mask transmission image, evaluating the cost function (e.g., EPE, sidelobe, etc.) based on the resist image, and modifying, via simulation, mask variables associated with the predicted mask pattern based on a gradient of the cost function such that the cost function is reduced.

Furthermore, in an embodiment, a method for training a machine learning model configured to predict a resist image (or a resist pattern derived from the resist image) based on etch patterns. The method involves obtaining (i) a physics based or machine learning based process model (e.g., an etch model as discussed earlier in the disclosure) of the patterning process configured to predict an etch image form a resist image, and (ii) an etch target (e.g., in the form of an image). In an embodiment, an etch target may be an etch pattern on a printed substrate after the etching step of the patterning process, a desired etch pattern (e.g., a target pattern), or other benchmark etch patterns.

Further, the method may involve training, by a hardware computer system, the machine learning model configured to predict the resist image based on the etch model and a cost function that determines a difference between the etch image and the etch target.

Figure 17:
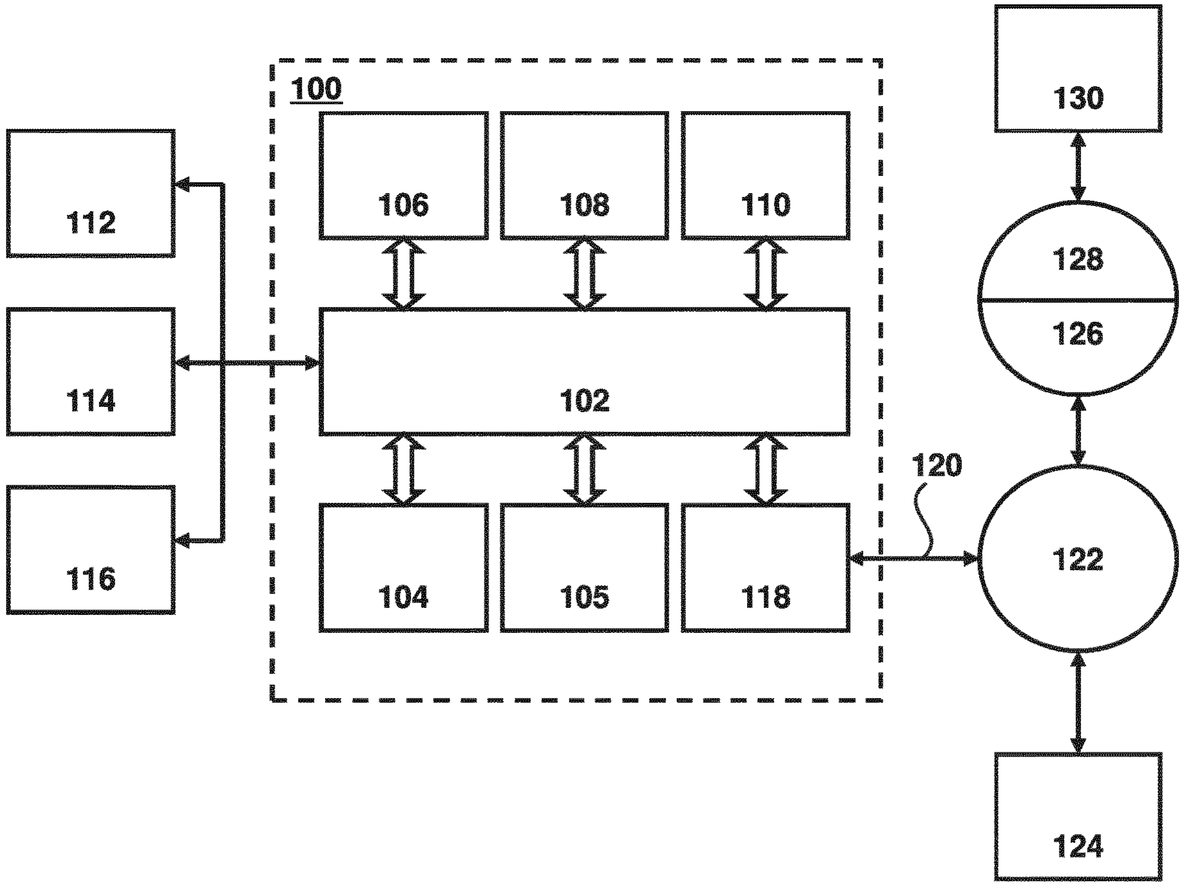
FIG. 17 is a block diagram of an example computer system, according to an embodiment.

FIG. 17 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 18:
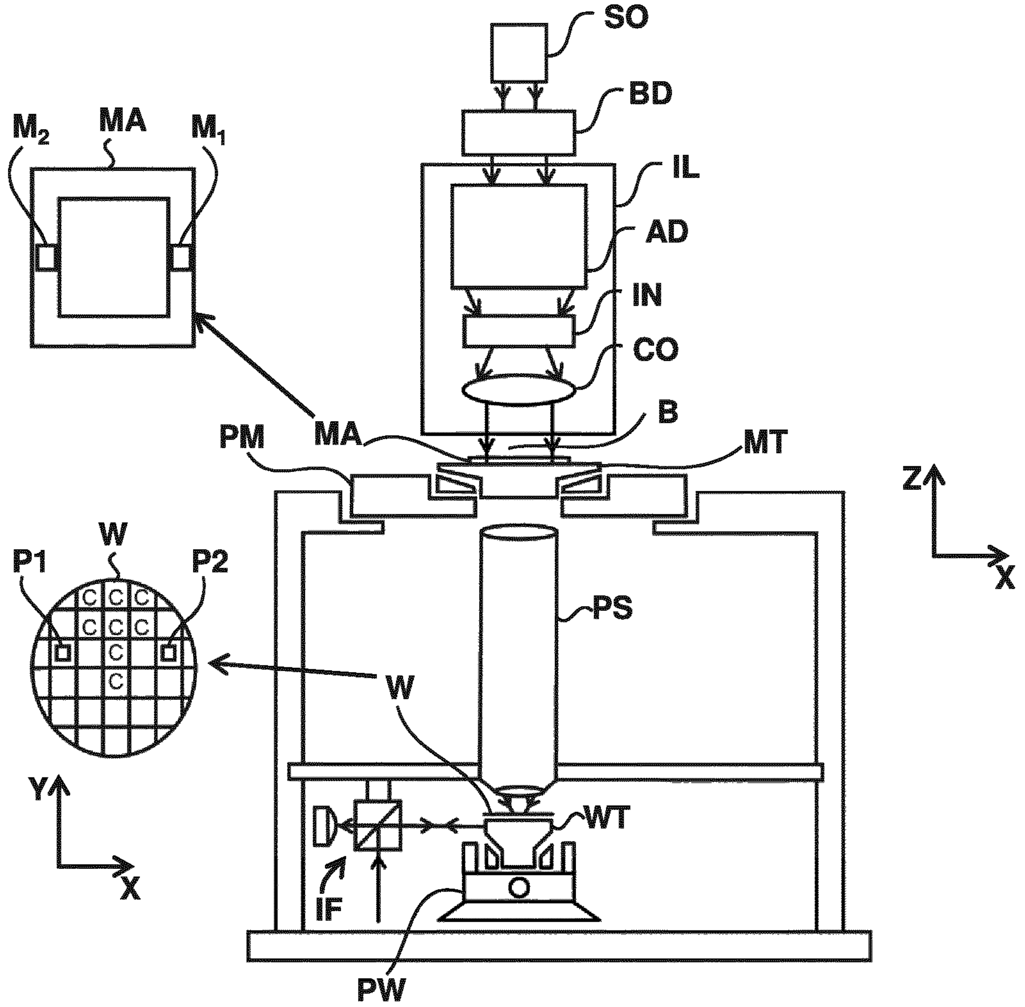
FIG. 18 is a schematic diagram of a lithographic projection apparatus, according to an embodiment.

FIG. 18 schematically depicts an exemplary lithographic projection apparatus in conjunction with the techniques described herein can be utilized. The apparatus comprises:

an illumination system IL, to condition a beam B of radiation. In this particular case, the illumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist-coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 18 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, or $F_2$ lasing).

The beam B subsequently intercepts the patterning device MA, which is held on a patterning device table MT. Having traversed the patterning device MA, the beam B passes through the lens PS, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 18. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PS (typically, M=¼ or ⅕). In this manner, a relatively large target portion C can be exposed, without having to compromise on resolution.

Figure 19:
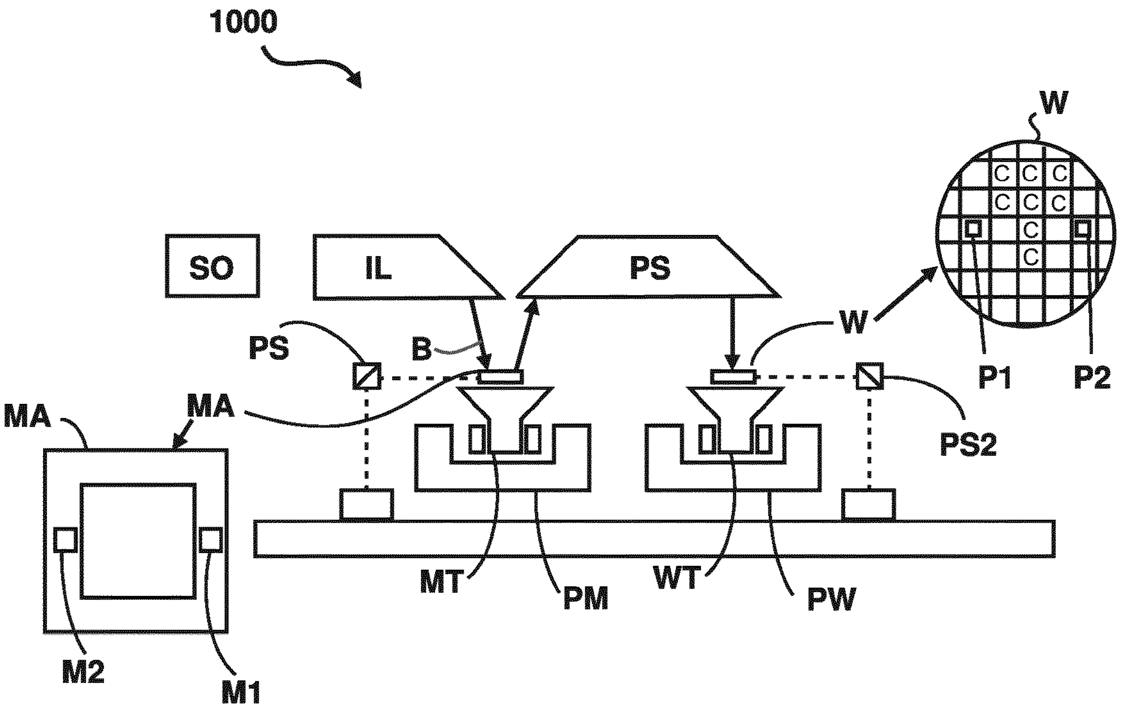
FIG. 19 is a schematic diagram of another lithographic projection apparatus, according to an embodiment.

FIG. 19 schematically depicts another exemplary lithographic projection apparatus 1000 in conjunction with the techniques described herein can be utilized.

The lithographic projection apparatus 1000 comprises:

a source collector module SO an illumination system (illuminator) IL configured to condition a radiation beam B (e.g. EUV radiation).

a support structure (e.g. a patterning device table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 19, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 19, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil minor devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.
2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.
3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable minor array of a type as referred to above.

Figure 20:
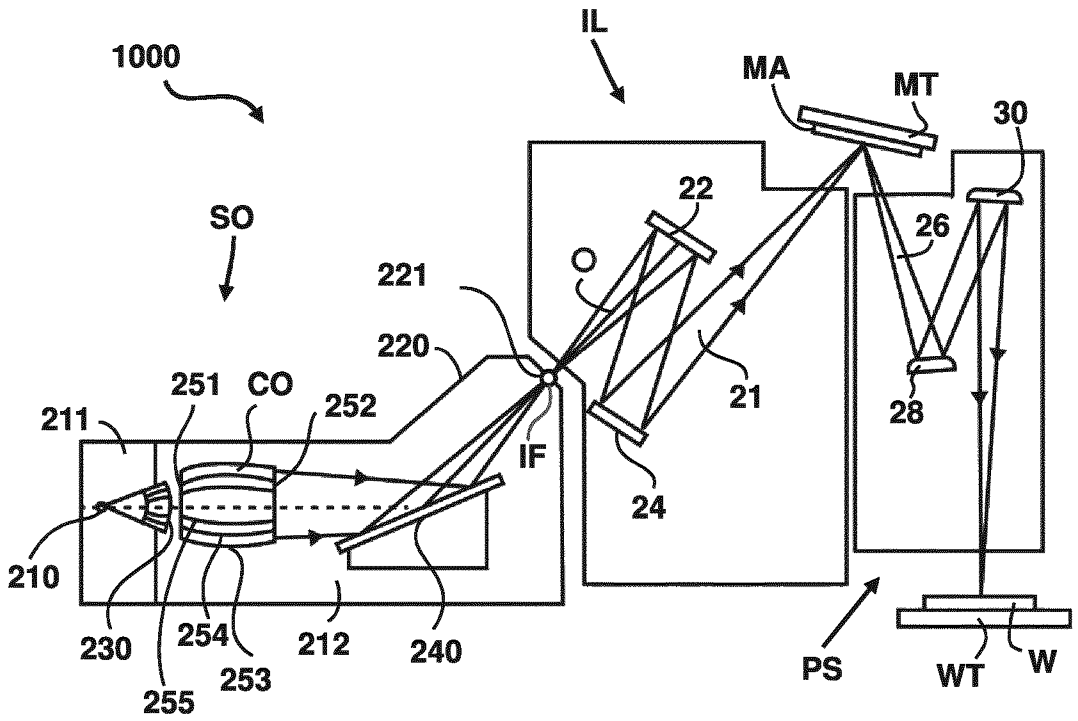
FIG. 20 is a more detailed view of the apparatus in FIG. 18, according to an embodiment.

FIG. 20 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 20.

Collector optic CO, as illustrated in FIG. 20, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 21:
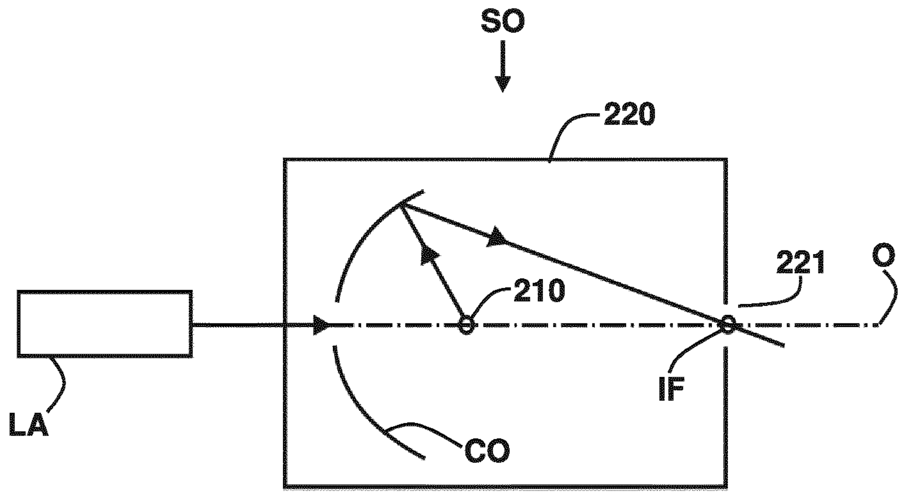
FIG. 21 is a more detailed view of the source collector module SO of the apparatus of FIG. 19 and FIG. 20, according to an embodiment.

Alternatively, the source collector module SO may be part of an LPP radiation system as shown in FIG. 21. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method for training a machine learning model configured to predict a mask pattern, the method comprising:
   obtaining (i) a process model of a patterning process configured to predict a pattern on a substrate, and (ii) a target pattern; and
   training, by a hardware computer system, the machine learning model configured to predict a mask pattern based on the process model and a cost function that determines a difference between the predicted pattern and the target pattern.
2. The method of clause 1, wherein the training the machine learning model configured to predict the mask pattern comprises:
   iteratively modifying parameters of the machine learning model based on a gradient-based method such that the cost function is reduced.
3. The method of any of clauses 1-2, wherein the gradient based method generates a gradient map indicating whether the one or more parameters be modified such that the cost function is reduced.
4. The method of clause 3, wherein the cost function is minimized.
5. The method of any of clauses 1-4, wherein the cost function is an edge placement error between the target pattern and the predicted pattern.
6. The method of any of clauses 1-5, wherein the process model comprises one or more trained machine learning models comprises:
   (i) a first trained machine learning model configured to predict a mask transmission of the patterning process; and/or
   (ii) a second trained machine learning model coupled to the first trained model and configured to predict an optical behavior of an apparatus used in the patterning process; and/or
   (iii) a third trained machine learning model coupled to the second trained model and configured to predict a resist process of the patterning process.
7. The method of clause 6, wherein the first trained machine learning model comprises a machine learning model configured to predict a two dimensional mask transmission effect or a three dimensional mask transmission effect of the patterning process.
8. The method of any of clauses 1-7, wherein the first trained machine learning model receives a mask image corresponding to the target pattern and predicts a mask transmission image, wherein the second trained machine learning model receives the predicted mask transmission image and predicts an aerial image, and
   wherein the third trained machine learning model receives the predicted aerial image and predicts a resist image, wherein the resist image includes the predicted pattern on the substrate.
9. The method of any of clauses 1-8, wherein the machine learning model configured to predict the mask pattern, the first trained model, the second trained model, and/or the third trained model is a convolutional neural network.
10. The method of any of clauses 8-9, wherein the mask pattern comprises optical proximity corrections including assist features.
11. The method of any of clauses 10, wherein the optical proximity corrections are in the form of mask image and the training is based on the mask image or pixel data of the mask image, and image of the target pattern.
12. The method of any of clauses 8-11, wherein the mask image is a continuous transmission mask image.
13. A method for training a process model of a patterning process to predict a pattern on a substrate, the method comprising:
   obtaining (i) a first trained machine learning model to predict a mask transmission of the patterning process, and/or (ii) a second trained machine learning model to predict an optical behavior of an apparatus used in the patterning process, and/or (iii) a third trained machine learning model to predict a resist process of the patterning process, and (iv) a printed pattern;
   connecting the first trained model, the second trained model, and/or the third trained model to generate the process model; and
   training, by a hardware computer system, the process model configured to predict a pattern on a substrate based on a cost function that determines a difference between the predicted pattern and the printed pattern.
14. The method of clause 13, wherein the connecting comprises sequentially connecting the first trained model to the second trained model and the second trained model to the third trained model.
15. The method of clause 14, wherein the sequentially connecting comprises:
   providing a first output of the first trained model as a second input to the second trained model; and
   providing a second output of the second trained model as a third input to the third trained model.
16. The method of clause 15, wherein the first output is a mask transmission image, the second output is an aerial image, and the third output is a resist image.
17. The method of any of clauses 13-16, wherein the training comprises iteratively determining one or more parameters corresponding to the first trained model, the second trained model, and/or the third trained model based on the cost function such that the cost function is reduced.

18. The method of clause 17, wherein the cost function is minimized.

19. The method of any of clauses 13-18, wherein the cost function is a mean square error between the printed pattern and the predicted pattern, an edge placement error, and/or difference in a critical dimension.

20. The method of any of clauses 13-19, wherein the determining of the one or more parameters is based on gradient-based method, wherein a local derivative of the cost function is determined at the third trained model, the second trained model, and/or the first trained model with respect to parameters of the respective models.

21. The method of any of clauses 13-20, wherein the first trained model, the second trained model, and/or the third trained model is a convolutional neural network.

22. A method for determining optical proximity corrections for a target pattern, the method comprising:

obtaining (i) a trained machine learning model configured to predict optical proximity corrections, and (ii) a target pattern to be printed on a substrate via a patterning process; and determining, by a hardware computer system, optical proximity corrections based on the trained machine learning model configured to predict optical proximity corrections corresponding to the target pattern.

23. The method of clause 22, further comprising incorporating structural features corresponding to the optical proximity corrections in data representing a mask.

24. The method of any of clauses 23, wherein the optical proximity corrections comprise a placement of assist features and/or contour modification.

25. A computer program product comprising a non-transitory computer readable medium having instructions recorded thereon, the instructions when executed by a computer implementing a method of any of clauses 1-24.

26. A method for training a machine learning model configured to predict a mask pattern based on defects, the method comprising:

obtaining (i) a process model of a patterning process configured to predict a pattern on a substrate, wherein the process model comprises one or more trained machine learning models, (ii) a trained manufacturability model configured to predict defects based on a predicted pattern on the substrate, and (iii) a target pattern; and training, by a hardware computer system, the machine learning model configured to predict the mask pattern based on the process model, the trained manufacturability model, and a cost function, wherein the cost function is a difference between the target pattern and the predicted pattern.

27. The method of clauses 26, wherein the cost function comprises a number of defects predicted by the manufacturability model and an edge placement error between the target pattern and the predicted pattern.

28. The method of any of clauses 26-27, wherein the defects comprises a necking defect, a footing defect, a buckling defect, and/or a bridging defect.

29. The method of clause 26, wherein the training the machine learning model configured to predict the mask pattern comprises:

iteratively modifying one or more parameters of the machine learning model based on a gradient-based method such that the cost function comprising the total number of defects and/or the edge placement error are reduced.

30. The method of clause 29, wherein the total number of defects and the edge placement error are simultaneously reduced.

31. The method of any of clauses 29-30, wherein the gradient based method generates a gradient map indicating whether the one or more parameters be modified such that the cost function is reduced.

32. The method of clause 31, wherein the cost function is minimized.

33. A method for training a machine learning model configured to predict a mask pattern based on manufacturing violation probability of a mask, the method comprising:

obtaining (i) a process model of a patterning process configured to predict a pattern on a substrate, wherein the process model comprises one or more trained machine learning models, (ii) a trained mask rule check model configured to predict a manufacturing violation probability of a mask pattern, and (iii) a target pattern; and training, by a hardware computer system, the machine learning model configured to predict the mask pattern based on the process model, the trained mask rule check model, and a cost function based on the manufacturing violation probability predicted by the mask rule check model.

34. The method of clause 33, wherein the mask is a curvilinear mask comprising a curvilinear mask pattern.

35. The method of clause 33, wherein the training the machine learning model configured to predict the mask pattern comprises:

iteratively modifying parameters of the machine learning model based on a gradient-based method such that the cost function comprising a predicted manufacturing violation probability and/or an edge placement error are reduced.

36. The method of any of clauses 33-35, wherein the predicted manufacturing violation probability and the edge placement error are simultaneously reduced.

37. The method of any of clauses 35-36, wherein the gradient based method generates a gradient map indicating whether the one or more parameters be modified such that the cost function is reduced.

38. The method of clause 37, wherein the cost function is minimized.

39. A method for determining optical proximity corrections corresponding to a target pattern, the method comprising:

obtaining (i) a trained machine learning model configured to predict optical proximity corrections based on manufacturing violation probability of a mask, an edge placement error, and/or defects on a substrate, and (ii) the target pattern to be printed on a substrate via a patterning process; and determining, by a hardware computer system, optical proximity corrections based on the trained machine learning model and the target pattern.

40. The method of clause 39, further comprising incorporating structural features corresponding to the optical proximity corrections in data representing a mask.

41. The method of any of clauses 38-40, wherein the optical proximity corrections comprise a placement of assist features and/or contour modification.
42. The method of any of clauses 38-41, wherein the optical proximity corrections include curvilinear shaped structural features.
43. A method for training a machine learning model configured to predict defects on a substrate, the method comprising:
obtaining (i) a resist image or an etch image, and/or (ii) a target pattern; and
training, by a hardware computer system, the machine learning model configured to predict a defect metric based on the resist image or the etch image, the target pattern, and a cost function, wherein the cost function is a difference between the predicted defect metric and a truth defect metric.
44. The method of clause 43, wherein the defect metric is a number of defects, a defect size, a binary variable indicating defect free or not, and/or a defect type.
45. A method for training a machine learning model configured to predict mask rule check violations of a mask pattern, the method comprising:
obtaining (i) a set of mask rule check, (ii) a set of mask patterns; and
training, by a hardware computer system, the machine learning model configured to predict mask rule check violations based on the set of mask rule check, the set of mask patterns, and a cost function based on a mask rule check metric, wherein the cost function is a difference between the predicted mask rule check metric and a truth mask rule check metric.
46. The method of clause 45, wherein the mask rule check metric comprising a probability of violation of the mask rule check, wherein the probability of violation is determined based on total number of violations for a particular feature of the mask pattern.
47. The method of any clauses 45-46, wherein the set of mask patterns are in the form of a continuous transmission mask image.
48. A method for determining a mask pattern, the method comprising:
obtaining (i) an initial image corresponding to a target pattern, (ii) a process model of a patterning process configured to predict a pattern on a substrate and (ii) a trained defect model configured to predict defects based on the pattern predicted by the process model; and
determining, by a hardware computer system, a mask pattern from the initial image based on the process model, the trained defect model, and a cost function comprising a defect metric.
49. The method of clause 48, wherein the determining the mask pattern is an iterative process, an iteration comprising:
predicting, via simulation of the process model, the pattern on the substrate from an input image;
predicting, via simulation of the trained defect model, defects in the predicted pattern;
evaluating the cost function based on the predicted defects; and
modifying values of pixels of the initial image based on a gradient of the cost function.
50. The method of clause 49, wherein the input image to the process model is the initial image for a first iteration and the input image is the modified initial image for subsequent iteration.
51. The method of any of clauses 48-50, wherein the defect metric is a number of defects, a defect size, a binary variable indicating defect free or not and/or a defect type.
52. The method of any of clauses 48-51, wherein the cost function further comprises an edge placement error.
53. The method of any of clauses 48-52, further comprising:
obtaining a trained mask rule check model configured to predict a probability of violation of a set of mask rule checks;
predicting, by a hardware computer system, the probability of violation based on the mask pattern; and
modifying, by the hardware computer system, the mask pattern based on the cost function comprising the predicted probability of violation.
54. A method for training a machine learning model configured to predict a mask pattern, the method comprising:
obtaining (i) a target pattern, (ii) an initial mask pattern corresponding to the target pattern, (iii) a resist image corresponding to the initial mask pattern, and (iv) a set of benchmark images; and
training, by a hardware computer system, the machine learning model configured to predict the mask pattern based on the target pattern, the initial mask pattern, the resist image, the set of benchmark images, and a cost function that determines a difference between the predicted mask pattern and the benchmark image.
55. The method of clause 54, wherein the initial mask pattern is a continuous transmission mask image obtained from simulation of a trained machine learning model configured to predict the initial mask pattern.
56. The method of any of clauses 54-55, wherein the cost function is a mean squared error between intensities of the pixels of the predicted mask pattern and the set of benchmark images.
57. The method of any of clauses 1-12, clauses 26-32, 48-53, or clauses 54-56, further comprising optimizing the predicted mask pattern, predicted by the trained machine learning model, by iteratively modifying mask variables of the predicted mask pattern, an iteration comprising:
predicting, via simulation of a physics based or a machine learning based mask model, a mask transmission image based on the predicted mask pattern;
predicting, via simulation of a physics based or a machine learning based optical model, an optical image based on the mask transmission image;
predicting, via simulation of a physics based or a machine learning based resist model, a resist image based on the optical image;
evaluating the cost function based on the resist image; and
modifying, via simulation, mask variables associated with the predicted mask pattern based on a gradient of the cost function such that the cost function is reduced.
58. A method for training a machine learning model configured to predict a resist image, the method comprising:
obtaining (i) an process model of a patterning process configured to predict an etch image form a resist image, and (ii) an etch target; and
training, by a hardware computer system, the machine learning model configured to predict a resist image based on the etch model and a cost function that determines a difference between the etch image and the etch target.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

What is claimed is:

1. A method comprising:

obtaining (i) a trained process machine learning model configured to predict an integrated circuit pattern on a substrate as produced using a semiconductor patterning process, and (ii) a target pattern;

and training, by a hardware computer system, a mask pattern machine learning model configured to predict a mask pattern that is configured to interact with radiation to create an image from the radiation to expose a resist layer on the substrate using the semiconductor patterning process, wherein the training includes:

predicting, by the mask pattern machine learning model, the mask pattern from the target pattern, processing the mask pattern using the trained process machine learning model to generate a predicted integrated circuit pattern, evaluating a cost function that determines a difference between the predicted integrated circuit pattern and the target pattern, updating parameters of the mask pattern machine learning model such that the cost function is reduced, and repeating the predicting, processing, evaluating and updating until the cost function is reduced relative to an earlier iteration, thereby reducing the difference between the predicted integrated circuit pattern and the target pattern, wherein the mask pattern machine learning model provides optical proximity correction and/or source mask optimization of the mask pattern.

2. The method of claim 1, wherein the training the mask pattern machine learning model comprises iteratively modifying one or more parameters of the mask pattern machine learning model based on a gradient-based method such that the cost function is reduced.

3. The method of claim 2, wherein the gradient based method generates a gradient map indicating whether the one or more parameters be modified such that the cost function is reduced.

4. The method of claim 3, wherein the cost function is minimized.

5. The method of claim 1, wherein the cost function represents an edge placement error between the target pattern and the predicted integrated circuit pattern.

6. The method of claim 1, wherein the cost function represents a mean square error between the target pattern and the predicted integrated circuit pattern and/or difference in a critical dimension.

7. The method of claim 1, wherein the trained process machine learning model comprises:

(i) a first trained machine learning model configured to predict a mask transmission of the patterning process; and/or (ii) a second trained machine learning model configured to be coupled to the first trained model and configured to predict an optical behavior of an apparatus used in the patterning process; and/or (iii) a third trained machine learning model configured to be coupled to the second trained model and configured to predict a resist process of the patterning process.

8. The method of claim 7, wherein the trained process machine learning model comprises the first trained machine learning model and the first trained machine learning model comprises a machine learning model configured to predict a two dimensional mask transmission effect or a three dimensional mask transmission effect of the patterning process.

9. The method of claim 7, wherein the trained process machine learning model comprises the first, second and third trained machine learning models, wherein the first trained machine learning model receives a mask image corresponding to the target pattern and predicts a mask transmission image, wherein the second trained machine learning model receives the predicted mask transmission image and predicts an aerial image, and wherein the third trained machine learning model receives the predicted aerial image and predicts a resist image, wherein the resist image includes the predicted integrated circuit pattern on the substrate.

10. The method of claim 1, wherein the mask pattern machine learning model is a convolutional neural network.

11. The method of claim 1, wherein the mask pattern comprises optical proximity corrections including assist features.

12. The method of claim 11, wherein the optical proximity corrections are in the form of a mask image and the training is based on the mask image or pixel data of the mask image, and an image of the target pattern.

13. The method of claim 12, wherein the mask image is a continuous transmission mask image.

14. The method of claim 1, further comprising optimizing a predicted mask pattern, predicted by the trained mask pattern machine learning model, by iteratively modifying one or more mask variables of the predicted mask pattern, an iteration comprising:

predicting, via simulation of a physics based or a machine learning based mask model, a mask transmission image based on the predicted mask pattern;

predicting, via simulation of a physics based or a machine learning based optical model, an optical image based on the mask transmission image;

predicting, via simulation of a physics based or a machine learning based resist model, a resist image based on the optical image;

evaluating the cost function based on the resist image; and modifying, via simulation, one or more mask variables associated with the predicted mask pattern based on a gradient of the cost function such that the cost function is reduced.

15. A computer program product comprising a non-transitory computer-readable medium having instructions therein, the instructions, upon execution by a computer system, configured to cause the computer system to at least:

obtain (i) a trained process machine learning model configured to predict an integrated circuit pattern on a substrate as produced using a semiconductor patterning process, and (ii) a target pattern;

train a mask pattern machine learning model configured to predict a mask pattern that is configured to interact with radiation to create an image from the radiation to expose a resist layer on the substrate using the semiconductor patterning process, wherein the training includes:

predicting, by the mask pattern machine learning model, the mask pattern from the target pattern, processing the mask pattern using the trained process machine learning model to generate a predicted integrated circuit pattern, evaluating a cost function that determines a difference between the predicted integrated circuit pattern and the target pattern, updating parameters of the mask pattern machine learning model such that the cost function is reduced, and repeating the predicting, processing, evaluating and updating until the cost function is reduced relative to an earlier iteration, thereby reducing the difference between the predicted integrated circuit pattern and the target pattern, wherein the mask pattern machine learning model provides optical proximity correction and/or source mask optimization of the mask pattern.

16. The computer program product of claim 15, wherein the instructions configured to cause the computer system to train the mask pattern machine learning model are further configured to iteratively modify one or more parameters of the machine learning model based on a gradient-based method such that the cost function is reduced.

17. The computer program product of claim 16, wherein the gradient based method generates a gradient map indicating whether the one or more parameters be modified such that the cost function is reduced.

18. The computer program product of claim 15, wherein the cost function represents an edge placement error between the target pattern and the predicted integrated circuit pattern, a mean square error between the target pattern and the predicted integrated circuit pattern and/or a difference in a critical dimension.

19. The computer program product of claim 15, wherein the trained process machine learning model comprises:

(i) a first trained machine learning model configured to predict a mask transmission of the patterning process; and/or (ii) a second trained machine learning model configured to be coupled to the first trained model and configured to predict an optical behavior of an apparatus used in the patterning process; and/or (iii) a third trained machine learning model configured to be coupled to the second trained model and configured to predict a resist process of the patterning process.

20. The computer program product of claim 15, wherein the mask pattern machine learning model is a convolutional neural network.

* * * * *